US008967874B2

(12) United States Patent
Burgess et al.

(10) Patent No.: US 8,967,874 B2
(45) Date of Patent: Mar. 3, 2015

(54) LUBRICANT RETAINER FOR PUMP SHAFT BEARING ASSEMBLY

(75) Inventors: Kevin Edward Burgess, Carlingford (AU); Michael Christopher Foreman, Northmead (AU)

(73) Assignee: Weir Minerals Australia Ltd. (AU)

( * ) Notice: Subject to any disclaimer, the term of this patent is extended or adjusted under 35 U.S.C. 154(b) by 564 days.

(21) Appl. No.: 12/737,165

(22) PCT Filed: Jun. 12, 2009

(86) PCT No.: PCT/AU2009/000745

§ 371 (c)(1), (2), (4) Date: Mar. 2, 2011

(87) PCT Pub. No.: WO2009/149514

PCT Pub. Date: Dec. 17, 2009

(65) Prior Publication Data

US 2011/0164841 A1 Jul. 7, 2011

(30) Foreign Application Priority Data

| | | |
|---|---|---|
| Jun. 13, 2008 | (AU) | 2008903030 |
| Aug. 14, 2008 | (AU) | 2008904162 |
| Aug. 14, 2008 | (AU) | 2008904165 |
| Aug. 14, 2008 | (AU) | 2008904166 |
| Aug. 14, 2008 | (AU) | 2008904167 |
| Aug. 14, 2008 | (AU) | 2008904168 |

(51) Int. Cl.
*F16C 33/66* (2006.01)
*F04D 29/10* (2006.01)
(Continued)

(52) U.S. Cl.
CPC .......... *F04D 29/102* (2013.01); *F04D 29/4286* (2013.01); *F04D 29/628* (2013.01);
(Continued)

(58) Field of Classification Search
CPC ..... F04D 29/10; F04D 29/102; F04D 29/106; F04D 29/167; F04D 29/426; F04D 29/607; F16C 33/6622; F16C 33/6659
USPC ................. 384/473–475, 477, 489, 399, 403; 415/111–113, 229; 417/423.11–423.13; 277/343, 370, 277/637, 638; 184/6.14, 7.1, 13.1
See application file for complete search history.

(56) References Cited

U.S. PATENT DOCUMENTS

| | | | |
|---|---|---|---|
| 3,046,063 | A | 7/1962 | La Bour |
| 3,190,705 | A | 6/1965 | Keller et al. |

(Continued)

FOREIGN PATENT DOCUMENTS

| | | | |
|---|---|---|---|
| EP | 0191377 | A1 | 8/1986 |
| EP | 091377 | B1 | 5/1989 |
| GB | 2435497 | A | 8/2007 |

*Primary Examiner* — Richard W Ridley
*Assistant Examiner* — Richard Urbanski
(74) *Attorney, Agent, or Firm* — Morriss O'Bryant Compagni

(57) ABSTRACT

A lubricant retainer for use in a pump bearing assembly, the bearing assembly which in a first operating configuration is lubricated by a relatively highly viscous lubricant, and which in a second operating configuration is lubricated by a less-viscous lubricant, the bearing assembly comprising a bearing housing having a bore extending therethrough for receiving a pump drive shaft, spaced-apart bearing mounting zones within said bore with a chamber therebetween, each bearing mounting zone arranged for the in use receipt of a bearing therein. Each zone has associated therewith one lubricant retainer, the lubricant retainer being adapted to be mounted within the bore adjacent the bearing mounting zone with which it is associated so as to form a barrier between the bearing mounting zone and the chamber when the pump bearing assembly is in the first operating configuration, the retainer being removed when the pump bearing assembly is in the second operating configuration.

7 Claims, 53 Drawing Sheets

(51) Int. Cl.

| | |
|---|---|
| ***F04D 29/42*** | (2006.01) |
| ***F04D 29/62*** | (2006.01) |
| ***F04D 7/04*** | (2006.01) |
| ***F04D 29/16*** | (2006.01) |
| ***B66C 1/44*** | (2006.01) |

(52) U.S. Cl.

CPC ............... *F04D 7/04* (2013.01); *F04D 29/167* (2013.01); *F04D 29/426* (2013.01); *B66C 1/44* (2013.01); *F04D 7/045* (2013.01); *F04D 29/622* (2013.01); *F04D 29/106* (2013.01)

USPC ........................................... 384/473; 277/370

(56) References Cited

U.S. PATENT DOCUMENTS

| | | | | |
|---|---|---|---|---|
| 3,295,898 | A | 1/1967 | Finzel | |
| 4,099,890 | A | 7/1978 | Murakami et al. | |
| 4,521,151 | A | 6/1985 | Frater et al. | |
| 5,480,161 | A * | 1/1996 | Borowski | 277/419 |
| 6,190,121 | B1 | 2/2001 | Hayward et al. | |
| 2008/0008577 | A1 | 1/2008 | Cohen | |

* cited by examiner

SECTION A-A

Performance Comparison of the new WBH to an existing AH pump

LUBRICANT RETAINER FOR PUMP SHAFT BEARING ASSEMBLY

BACKGROUND OF THE INVENTION

1. Technical Field

This disclosure relates to generally to bearing assemblies for drive shafts for pumps and more specifically to a lubricant retainer for a pump shaft bearing assembly.

2. Background Art

Centrifugal pumps are typically comprised of a pump housing having an axially positioned pump inlet, a discharge outlet and an opening into the pump housing for positioning a pump shaft. An impeller is positioned to rotate within the pump chamber and the impeller is connected to an end of the drive shaft for rotation.

The drive shaft extends from the impeller, housed within the pump housing, to a drive motor that is located usually to the rear of the pump housing. The drive shaft is typically supported by two bearing assemblies to balance the considerable weight of the drive shaft. The bearing assemblies may each include a bearing housing that operates to provide means for cooling and/or lubricating the bearings highly viscous materials such as grease, or lower viscous materials such as oil or other suitable fluid. The different viscosities of these lubricants provide different problems in distribution through the bearing housing.

In many pump assemblies, the pump shaft and bearing assemblies are supported on a pedestal, frame or support and the pump housing is cantilevered from the pedestal or frame. The pedestal or frame is located between the pump housing and the drive motor.

SUMMARY OF THE DISCLOSURE

In a first aspect, embodiments are disclosed of a lubricant retainer for use in a pump bearing assembly, the bearing assembly which in a first operating configuration is lubricated by a relatively highly viscous lubricant, and which in a second operating configuration is lubricated by a less-viscous lubricant, the bearing assembly comprising a bearing housing having a bore extending therethrough for receiving a pump drive shaft, spaced-apart bearing mounting zones within said bore with a chamber therebetween, each bearing mounting zone arranged for the in use receipt of a bearing therein, each zone having associated therewith one lubricant retainer, said lubricant retainer being adapted to be mounted within said bore adjacent the bearing mounting zone with which it is associated so as to form a barrier between the bearing mounting zone and the chamber when the pump bearing assembly is in the first operating configuration, the retainer being removed when the pump bearing assembly is in the second operating configuration.

In some embodiments, the lubricant retainer comprises an annular barrier wall which abuts in use against an inner surface of the bore.

In some embodiments, the pump bearing assembly comprises a sump arranged in the chamber, a drainage slot in each bearing mounting zone, and a drainage channel between each drainage slot and the sump and the lubricant retainer further includes a barrier flange extending laterally from the annular barrier wall and being adapted to provide a barrier between the drainage slot and drainage channel.

In some embodiments, the annular barrier wall is ring-shaped. In some embodiments, the ring-shaped barrier wall has an outer peripheral edge which is securable within a slot in the bore of the bearing housing.

In some embodiments, the barrier flange has a free edge which abuts against the bearing when fitted. In some embodiments, the barrier wall is deformable so that it can be snap-fitted into the slot. In some embodiments, the barrier flange extends laterally from each side of the annular barrier wall.

In a second aspect, embodiments are disclosed of a pump bearing assembly which in a first operating configuration is lubricated by a relatively highly viscous lubricant, and which in a second operating configuration is lubricated by a less-viscous lubricant, the bearing assembly comprising a bearing housing having a bore extending therethrough for receiving a pump drive shaft, spaced-apart bearing mounting zones within said bore with a chamber therebetween, each bearing mounting zone arranged for the in use receipt of a bearing therein, each zone having associated therewith one lubricant retainer, said lubricant retainer being adapted to be mounted within said bore adjacent the bearing mounting zone with which it is associated so as to form a barrier between the bearing mounting zone and the chamber when the pump bearing assembly is in the first operating configuration, the retainer being removed when the pump bearing assembly is in the second operating configuration, the lubricant retainer being in accordance with the first aspect described above.

In some embodiments, the bearing assembly is secured to or integral with a pump housing support.

BRIEF DESCRIPTION OF THE DRAWINGS

Notwithstanding any other forms which may fall within the scope of the methods and apparatus as set forth in the Summary, specific embodiments will now be described, by way of example, and with reference to the accompanying drawings in which.

DETAILED DESCRIPTION OF SPECIFIC EMBODIMENTS

Figure 1:
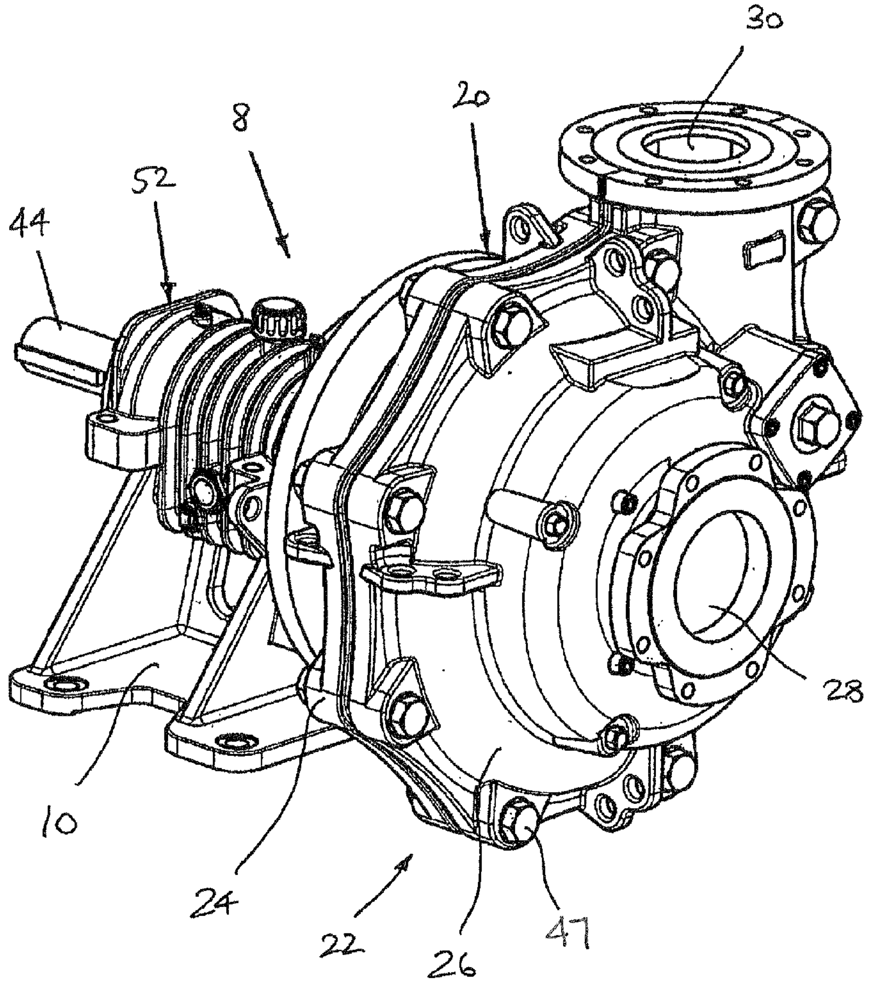
FIG. 1 is an exemplary perspective illustration of a pump assembly comprising a pump housing and a pump housing support in accordance with one embodiment.
Figure 2:
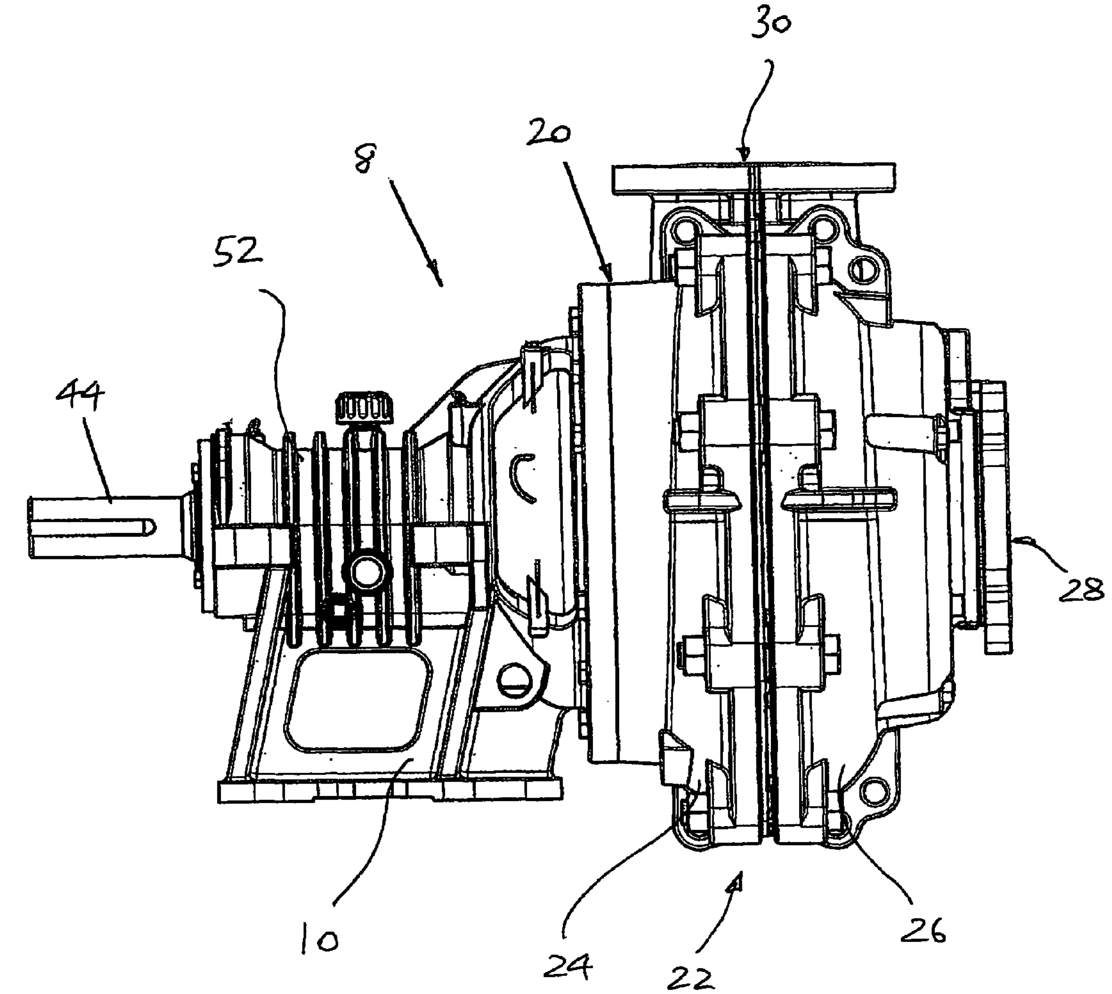
FIG. 2 illustrates a side view in elevation of the pump assembly shown in FIG. 1.

Referring to the drawings, FIGS. 1 and 2 generally depict a pump 8 having a pump housing support in the form of a pedestal or base 10 to which is attached a pump housing 20. Pedestals may also sometimes be known in the pump industry as frames. The pump housing 20 generally comprises an outer casing 22 that is formed from two side casing parts or halves 24, 26 (sometimes also known as the frame plate and the cover plate) which are joined together about the periphery of the two side casings parts 24, 26. The pump housing 20 is formed with an inlet hole 28 and a discharge outlet hole 30 and, when in use in a process plant, the pump is connected by piping to the inlet hole 28 and to the outlet hole 30, for example to facilitate pumping of a mineral slurry.

As shown for example in FIGS. 3, 4, 16 and 17 the pump housing 20 further comprises a pump housing inner liner 32 arranged within the outer casing 22 and which includes a main liner (or volute) 34 and two side liners 36, 38. The side liner (or back liner) 36 is located nearer the rear end of the pump housing 20 (that is, nearest to the pedestal or base 10), and the other side liner (or front liner) 38 is located nearer the front end of the pump housing 20.

As shown in FIGS. 1 and 2 the two side casing parts 24, 26 of the outer casing 22 are joined together by bolts 47 located about the periphery of the casing parts 24, 26 when the pump is assembled for use. In addition, and as shown in FIGS. 36 to 40B, the two side casing halves 24, 26 are spigoted together with a tongue and groove joint arrangement so that, when assembled, the two casing halves 24, 26 are concentrically aligned. In some embodiments the main liner (or volute) can also be comprised of two separate halves (made of such material as rubber or elastomer) which are assembled within each of the side casing parts 24, 26 and brought together to form a single main liner, although in the example shown in FIGS. 3 and 4 the main liner (or volute) 34 is made in one-piece, shaped similar to a car tyre (and made of metal material).

When the pump 8 is assembled, the side openings in the volute 34 are filled by the two side liners 36, 38 to form a continuously-lined chamber disposed within the pump outer casing 22. A seal chamber housing encloses the side liner (or back liner) 36 and is arranged to seal the space between the shaft 42 and the pedestal or base 10 to prevent leakage from the back area of the outer casing 22. The seal chamber housing takes the form of a circular disc with a central bore, and is known in one arrangement as a stuffing box 70. The stuffing box 70 is arranged adjacent to the side liner 36 and extends between the pedestal 10 and the shaft sleeve and packing that surrounds the shaft 42.

An impeller 40 is positioned within the volute 34 and is mounted to the drive shaft 42 which has a rotation axis. A motor drive (not shown) is normally attached by pulleys to the exposed end 44 of the shaft 42, in the region behind the pedestal or base 10. The rotation of the impeller 40 causes the fluid (or solid-liquid mixture) being pumped to pass from the pipe which is connected to the inlet hole 28, through the chamber which is defined by the volute 34 and the side liners 36, 38, and then out of the pump 8 via the outlet hole 30.

Figure 3:
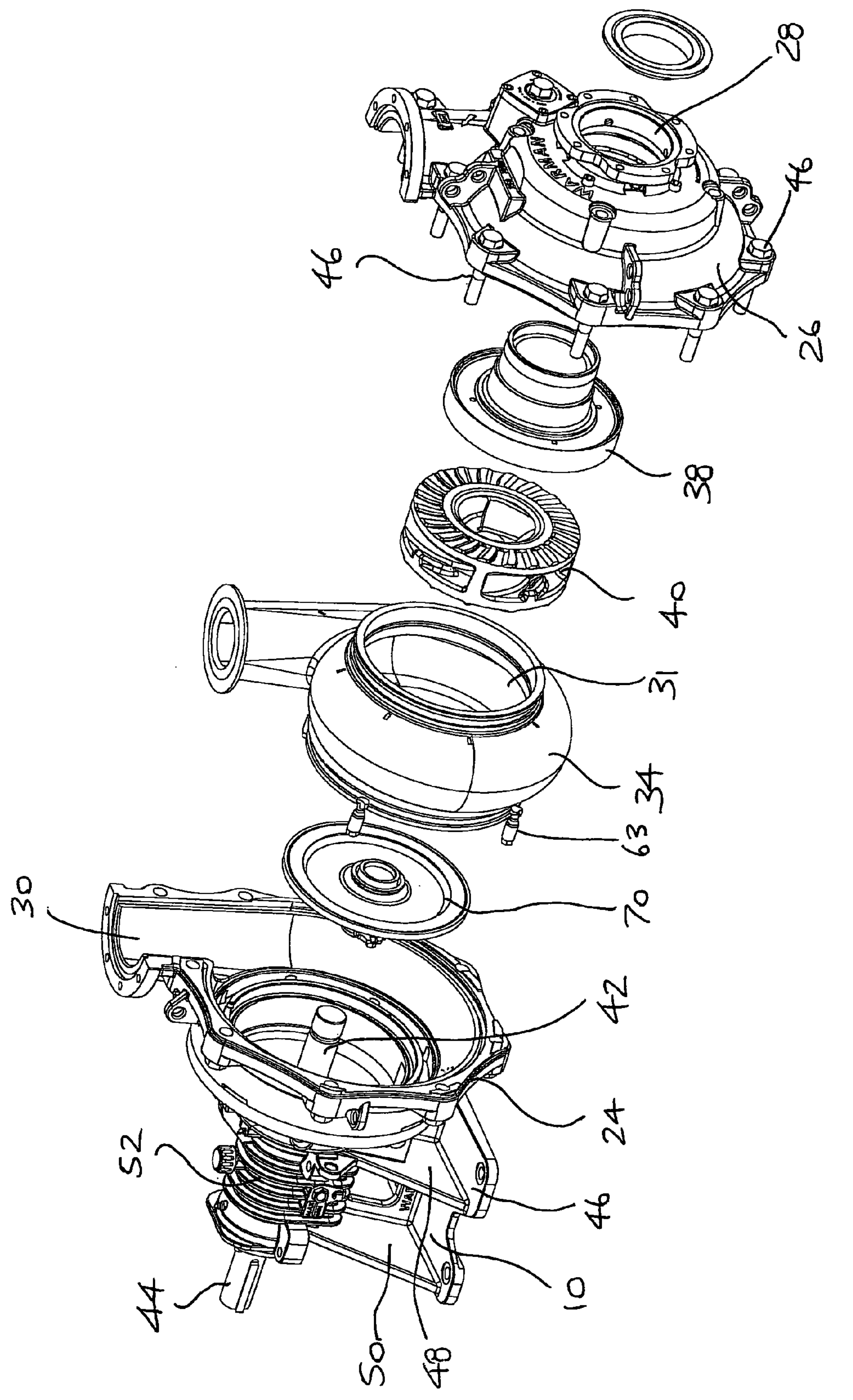
FIG. 3 illustrates a perspective, exploded view of the pump housing and a perspective view of the pump housing support of the pump assembly shown in FIG. 1.
Figure 4:
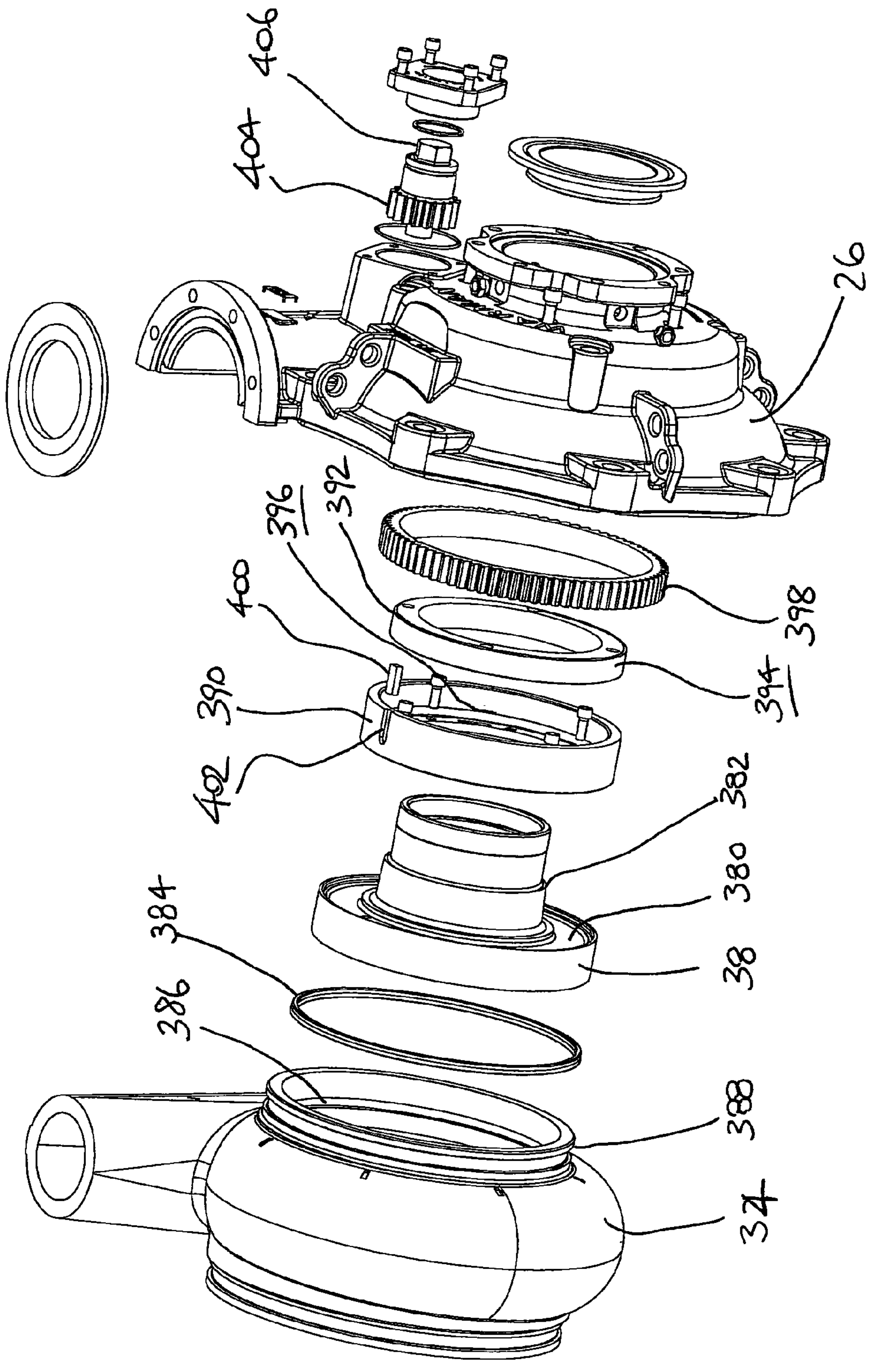
FIG. 4 illustrates a further perspective, exploded view of a portion of the pump housing shown in FIG. 1.

Referring to FIGS. 6 to 10 and to FIGS. 16 and 17, the details of the mounting arrangement of the pump housing 20 to the pedestal or base 10 will now be described. FIGS. 6 to 10 illustrate the pump pedestal or base 10 with the pump housing 20 removed to provide a better view of the elements of the base 10. As shown in FIG. 3, the pedestal or base 10 comprises a baseplate 46 having spaced apart legs 48, 50 that support a main body 52. The main body 52 includes a bearing assembly mounting portion for receiving at least one bearing assembly for the pump drive shaft 42, which extends therethrough. The main body 52 has a series of bores 55 extending therethrough to receive the drive shaft 42. At one end 54 of the main body 52 there is formed a pump housing mounting member for mounting and securing the pump housing 20 thereto. The mounting member is illustrated as having a ring-shaped body portion 56 that is integrally formed or cast with the main body 52 so that the pump housing support is an integral, one-piece component. However, in other embodiments the ring-shaped body and main body may be separately formed or cast or secured together by any suitable means.

The ring-shaped body 56 comprises a radially-extending mounting flange 58 and an axially-extending, annular locating collar (or spigot) 60 extending therefrom, the mounting flange 58 and the spigot 60 serving to locate and secure various elements of the pump housing 20 to the pedestal or base 10, as is described more fully below. While the mounting flange 58 and annular locating collar or spigot 60 are shown in the drawings as continuous ring-like members, in other embodiments the mounting member need not always include a ring-shaped body 56 in the form of a continuous, solid ring which is attached to, or formed integrally with the main body 52, and in fact the flange 58 and/or the spigot 60 may be formed in a broken or non-continuous ring form.

The pedestal 10 includes four apertures 62 that are formed through the mounting flange 58, and spaced thereabout, for receiving liner locating and fixing pins 63 for locating the main liner or volute 34 and the pump outer casing 22 relative to one another. There are four of these apertures 62 arranged circumferentially around the ring-shaped body 56 and positioned in between the plurality of screw-receiving apertures 64 which are also positioned through the mounting flange 58. The screw-receiving apertures 64 are arranged for receipt of securing members for securing the side casing part 24 of the pump casing 22 to the mounting flange 58 of the pedestal 10. The screw receiving apertures 64 co-operate with threaded apertures located in the side casing part 24 of the pump casing 22 to receive mounting screws.

The annular locating collar or spigot 60 is formed with a second locating surface 66 corresponding to the outer circumference of the annular locating collar 60 and a first locating surface 68 corresponding to the inner circumference of the annular locating collar 60, facing inwardly towards the shaft 42 rotation axis. These respective inner and outer locating surfaces 66, 68 are parallel to one another and parallel to the rotation axis of the drive shaft 42. This feature is best seen in FIG. 16. Referring to FIGS. 16 and 17 a part of the main liner 34 abuts against the outer locating surface 66, and parts of the side liner 36 and stuffing box 70 abut against the inner locating surface 68 when the pump 8 is in an assembled position. The locating surfaces 66 and 68 can be machined at the same time as the bore 55 which extends through the main body 52 is machined, with the part set-up in the machine in one set-up operation. Such a technique to finish the manufacturing of the product can ensure true parallel surfaces 66, 68 and alignment with the bore 55 for the drive shaft.

Figure 16:
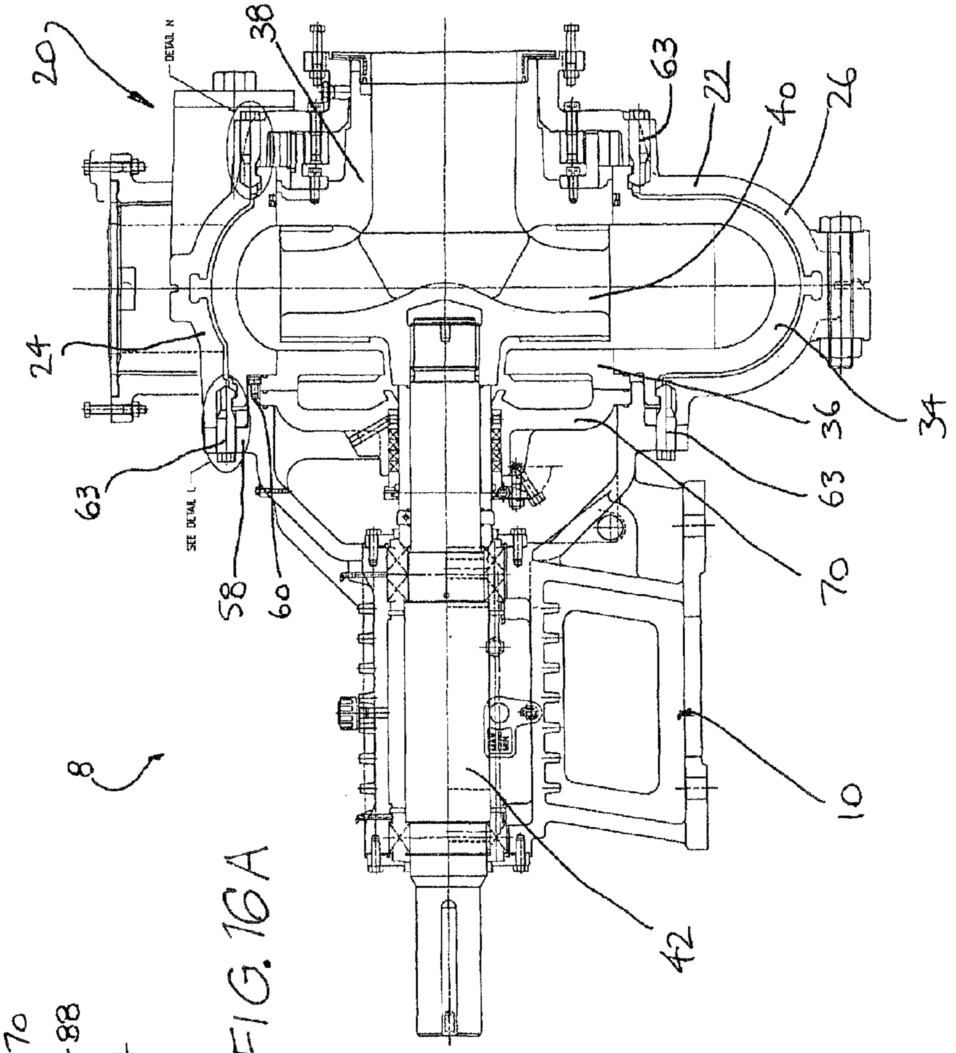
FIG. 16 illustrates a view in cross-section of the pump assembly shown in FIGS. 1 and 2.
Figure 17:
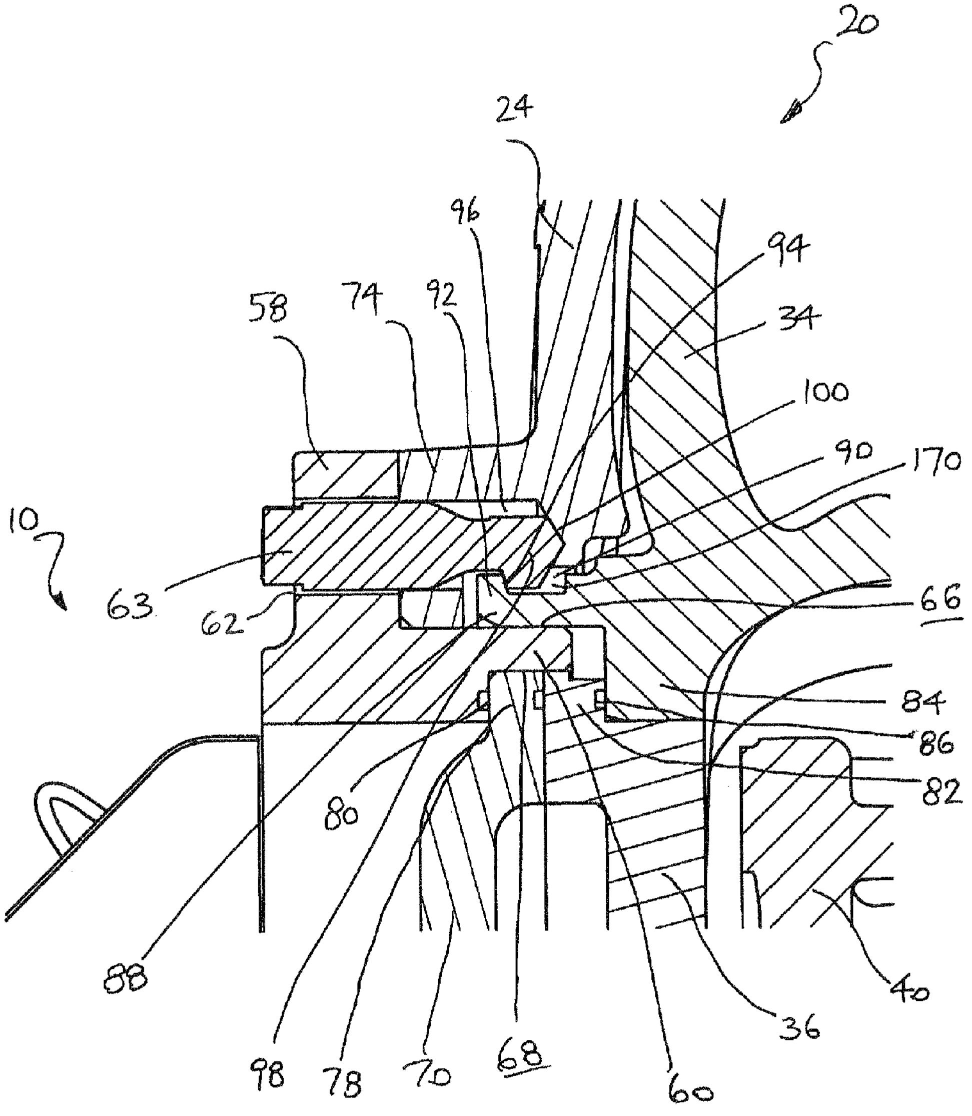
FIG. 17 is an enlarged view of a portion of FIG. 16 illustrating a detailed sectional view of the attachment of the pump housing inner liner to the pump housing support.
Figure 18:
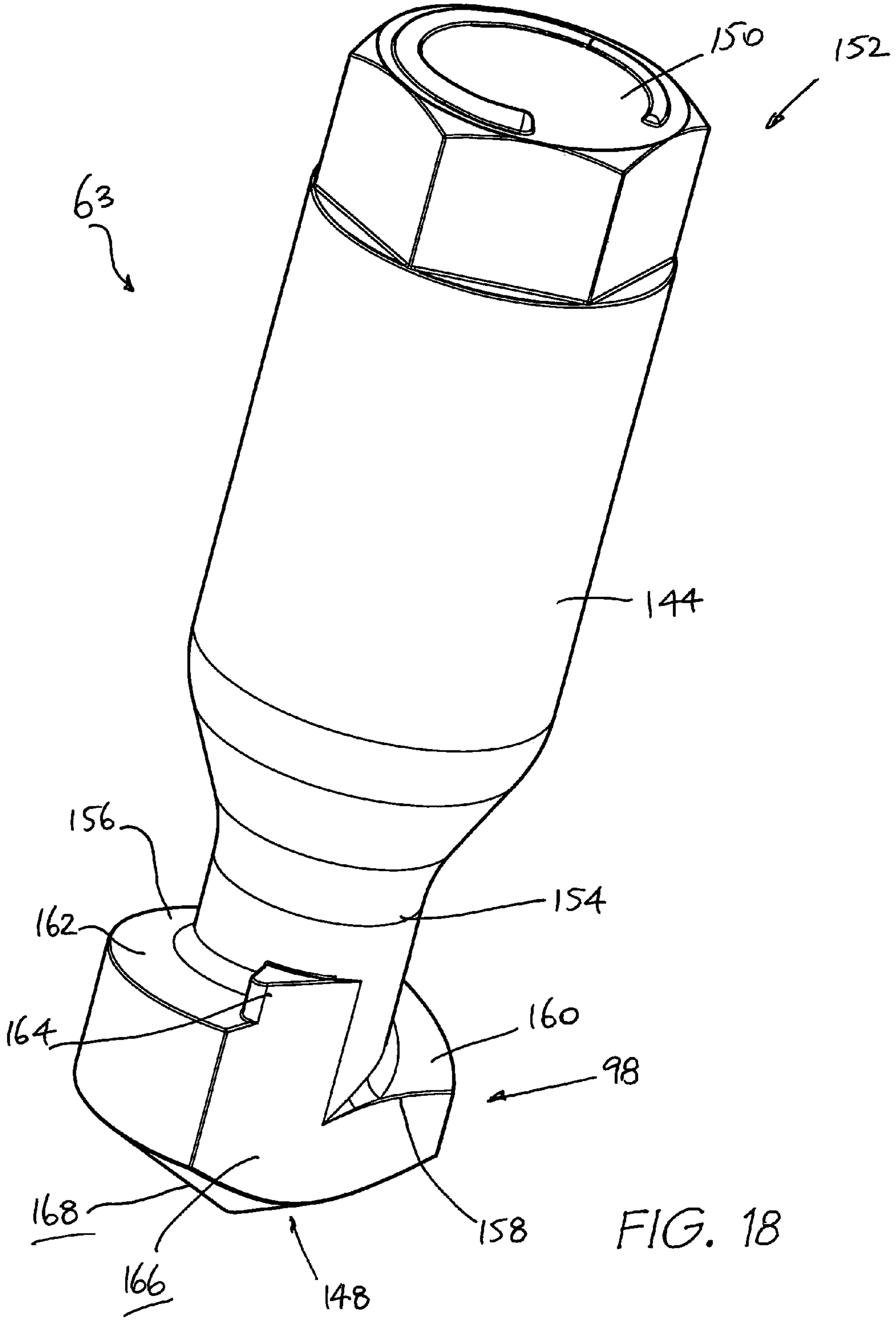
FIG. 18 illustrates a front, perspective view of a coupling pin as previously shown in FIGS. 16, 16B, 16C and 17, when employed as part of the attachment of the pump housing inner liner to the pump housing support.
Figure 19:
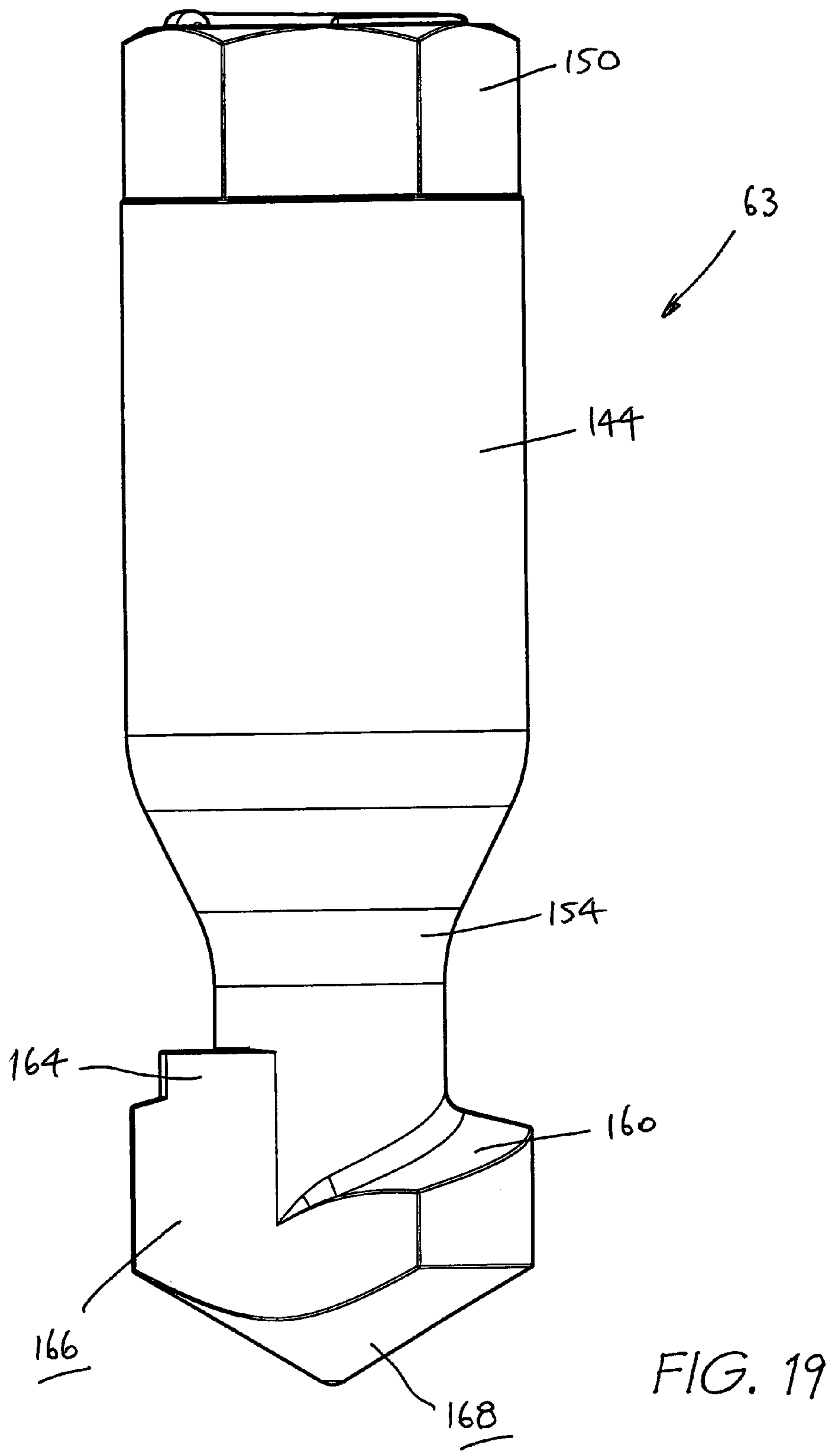
FIG. 19 illustrates a side view in elevation of the coupling pin shown in FIG. 18.
Figure 20:
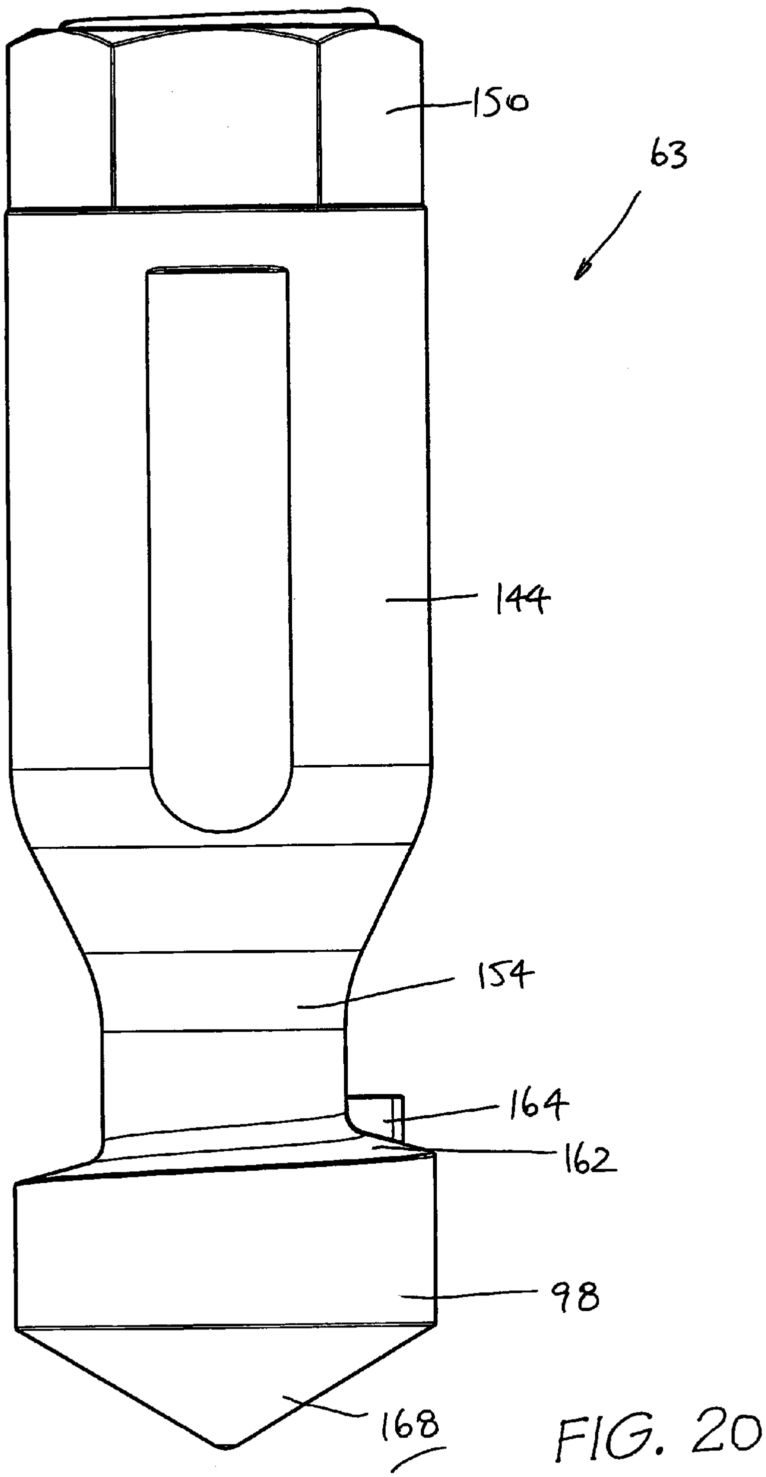
FIG. 20 illustrates a side view in elevation of the coupling pin shown in FIG. 19 rotated 180°.
Figure 21:
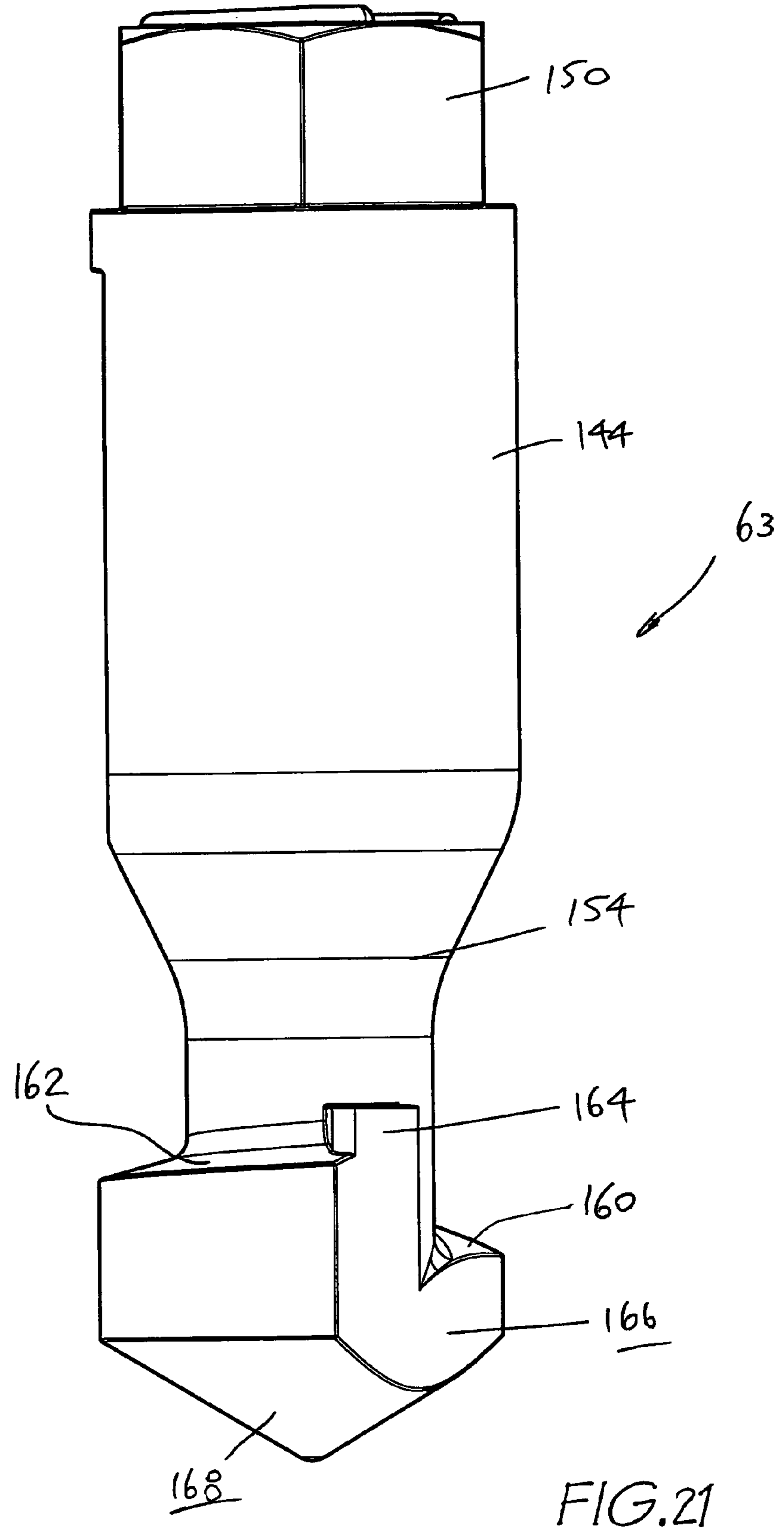
FIG. 21 illustrates a side view in elevation of the coupling pin shown in FIG. 20 when rotated 45° to the right.
Figure 22:
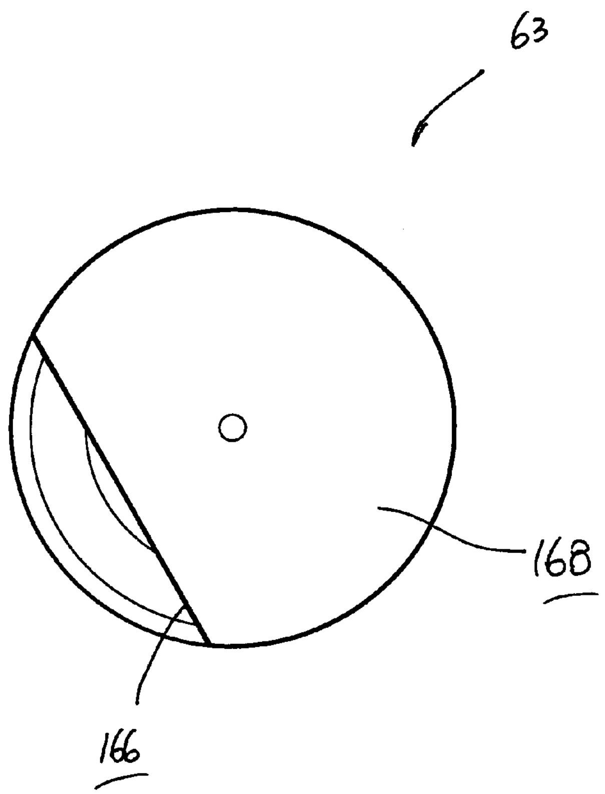
FIG. 22 illustrates a bottom, end view of the coupling pin of FIGS. 18 to 21.

Reference is made to FIGS. 16 and 17 which illustrates how the pump pedestal 10 functions to align and attach various elements of the pump and the pump housing 20 to the pump pedestal 10 during assembly of the pump. The pump housing 20 shown in FIG. 16 comprises two side casings 24, 26 as previously described. The two side casings 24, 26 are joined about their peripheries and are secured with a plurality of securement devices, such as bolts 46. The side casing part 26 is on the suction side of the pump 8 and is provided with the inlet hole 28. The side casing part 24 is on the drive (or motor) side of the pump 8 and is securely attached to the mounting flange 58 of the pump housing support 10 by screws or threaded mounting bolts positioned through the screw-receiving or threaded apertures 64 formed in the mounting flange 58.

The pump casing 22 is provided with an inner main liner 34, which may be a single piece (typical of metal liners) as shown in FIGS. 3 and 16 or two pieces (typical of elastomer liners). The inner main liner 34 further defines a pump chamber 72 in which the impeller 40 is positioned for rotation. The impeller 40 is attached to a drive shaft 42 that extends through the pedestal or base 10 and is supported by a first bearing assembly 75 and a second bearing assembly 77 housed within the first annular space 73 and second annular space 79, respectively, of the pedestal 10.

The stuffing box 70 is shown in FIGS. 23 to 28 and is positioned about the drive shaft 42, and provides a shaft seal assembly about the drive shaft 42. The inner main liner 34, stuffing box 70, and casing side liner 36 are all properly aligned by contact with one of the locating surfaces 66, 68 of the annular locating collar or spigot 60, as best illustrated in FIG. 17.

Figure 16A:
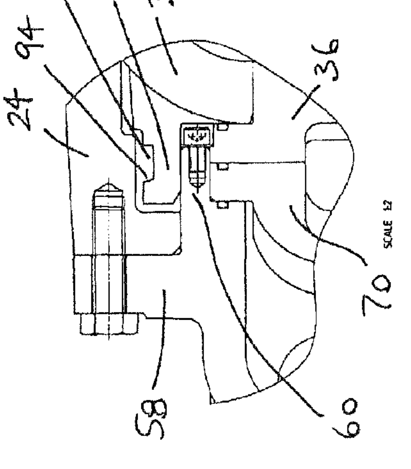
FIG. 16A is an enlarged view of a portion of FIG. 16 illustrating a detailed sectional view of the attachment of the pump housing to the pump housing support.
Figure 16B:
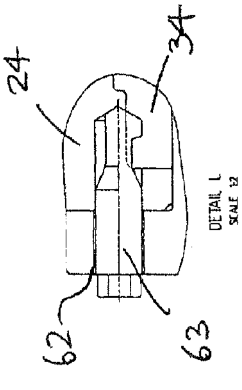
FIG. 16B is an enlarged view of a portion of FIG. 16 illustrating a detailed sectional view of the attachment of the pump housing inner liner to the pump housing support.

FIGS. 16A and 17 depict an enlarged section of the pump assembly shown in FIG. 16. In particular, a portion of the mounting member 56 of the pump pedestal or base 10 is illustrated depicting attachment of elements of the pump. As shown, the side casing part 24 is formed with an axially extending annular flange 74 that is sized in diameter to fit about the second, outward-facing locating surface 66 of the annular locating collar or spigot 60 of the pump pedestal 10. The annular flange 74 of the side casing part 24 also registers against the mounting flange 58 and is structured with apertures 76 which are positioned to align with the bores 64 in the mounting flange 58 of the pump base 10. The annular flange 74 of the side casing part 24 is also formed with bores that align with the apertures 62 of the mounting flange 58 for positioning securement devices therethrough as previously described.

The stuffing box 70 has a radially-extending portion 78 that registers against an inner shoulder 80 of the locating collar or spigot 60 of the pedestal 10 and against the first locating surface 68 of the spigot 60. The casing side liner (or back liner) 36 is also structured with a radially-extending portion 82 that is positioned adjacent the extending portion 78 of the stuffing box 70 and registers against the first locating surface 68 of the collar or spigot 60. The inner main liner 34 has a radially-inwardly extending annular portion 84 that registers against the extending portion 82 of the casing side liner 36 and is aligned in place accordingly. Thus a portion of the casing side liner 36 is disposed between the stuffing box 70 and the inner main liner 34. In the case of metal parts, gaskets or o-rings 86 are used to seal the spaces between the respective parts.

The inner main liner 34 is configured with an axially-extending annular flange or follower 88 that is sized in diameter to be received about the outer circumference or second locating surface 66 of the annular locating collar or flange 60. The annular follower 88 is also sized in circumference to be received within an annular space 90 formed in the annular flange 74 of the side casing part 24. The follower 88 is formed with a radially-extending lip 92 that has a face 94 that is oriented away from the mounting flange 58 of the pump base 10. The face 94 of the lip 92 is angled from a plane that is perpendicular to the rotational axis of the pump 8.

A liner locating and fixing pin 63 is received through the bore 62 in the mounting flange 58 and into the aperture 96 of the side casing part 24 to engage the lip 92 of the inner main liner 34. A head 98 of the fixing pin 63 may be configured to engage the lip 92 of the follower 88. The head 98 of the fixing pin 63 may also be formed with a configured terminal end 168 locating section that seats against the side casing part 24 in a blind end cavity 100 such that rotation of the fixing pin 63 exerts a thrust force that provides movement of the inner main liner 34 relative to the side casing part 24 and locks the fixing pin 63 in place.

The arrangement of the pump pedestal 10 and the pump elements is such that mounting member 56 and its associated mounting flange 58 and annular locating collar or flange 60, having the first locating surface 68 and second locating surface 66, provide for proper alignment of the pump casing part 24, inner main liner 34, casing side liner 36 and stuffing box 70. The arrangement also properly aligns the drive shaft 42 and impeller 40 relative to the pump housing 20. These interfitting parts become properly concentrically aligned when at least one of the components is in contact with a respective one of the first locating surface 68 and the second locating surface 66. For example, of primary importance is the alignment of the annular follower 88 of the inner main liner 34 with the second locating surface 66 (to position the main liner in concentric alignment in relation to the pedestal 10), as well as the alignment of the stuffing box 70 with the first locating surface 68 (to provide good concentric alignment of the stuffing box bore with the shaft 42). Many of the alignment advantages of the pump apparatus can be achieved if these two components are located at the respective locating surfaces of the spigot or collar 60. In other embodiments if there is at least one component positioned on either side of the annular locating collar or flange 60, then it is envisaged that other shapes and arrangements of components parts can be developed to interfit with one another and maintain the advantages of concentricity offered by the arrangement shown in the embodiment shown in the drawings.

The use of the annular locating collar or flange 60 allows the pump casing 22 and casing side liner 36 to be aligned accurately with the stuffing box 70 and the drive shaft 42. Consequently, the impeller 40 can rotate accurately within the pump chamber 72 and the inner main liner 34 to thereby allow much closer operating tolerances between the interior of the inner main liner 34 and the impeller 40, especially at the front side of the pump 8 as will shortly be described.

Furthermore, the arrangement is an improvement on conventional pump housing arrangements because both the stuffing box 70 and the pump liner 34 are positioned relative to the pump pedestal 10 directly, thus improving the concentricity of the pump in operation. In prior art arrangements, the shaft turns in a shaft housing which is itself attached to a pump housing support. The pump housing support is associated with the casing of the pump. Finally, the stuffing box is linked to the pump casing. Therefore the link between the shaft housing and the stuffing box in prior art arrangements is indirect, leading to a stacking of tolerances which often is a source of problems such as leakage, necessitating the use of complicated packing, and so on.

In summary, without limitation the embodiment of the pump base or pedestal 10 described herein has at least the following advantages:

1. a single spigot to attach and align both the pump casing, pump liners and the stuffing box to the pump shaft axis without relying on the alignment of these through a number of associated parts, which invariably cause misalignment due to the normal stack-up of tolerances.

2. a spigot which can be machined in the same operation with the part set-up in the machine in the one operation as the bore for the shaft, and so has true parallel outer and inner diameters.
3. a unitary (one piece) pump pedestal or base, which is easier to cast and then machine finish.
4. a pump with overall improved concentricity—if a metal liner is used, it in turn aligns the pump front entry liner 38 (sometimes referred to as the throatbush) to the pump shaft. That is, the shaft 42 is aligned concentrically with the pedestal 10 and with the flange 58 and spigot 60, which in turn means that the casing 24 and the main liner 34 are aligned directly with the shaft 42, which in turn means that the front casing 28 and the main liner 34 are aligned with the shaft 42, so that the front liner 38 and shaft 42 (and impeller 40) are in better alignment. As a result, the gap between the pump impeller 40 and the front liner 38 at the inlet of the pump can therefore be maintained concentric and parallel—that is, the front side liner inner wall is parallel to the front rotating face of the impeller, which results in improved pump performance and reduced incidence of erosive wear. The improvement in concentricity therefore extends across the whole pump.

In the arrangement shown, the shaft 42 is fixed in position (i.e., to prevent sliding toward or away from the pump housing 20). The slurry pump industry standard conventionally provides a shaft position that is slidingly adjustable in an axial direction to adjust the pump clearance (between the impeller and front liner), however this method increases the number of parts, and the impeller cannot be adjusted while the pump is operating. Also, in industry practice, adjusting the shaft position affects the drive alignment which should also be realigned, but is seldom realigned because of the extra maintenance time required to make the adjustments. The configuration shown herein provides a non-sliding shaft, offers fewer parts and less maintenance. Further, the bearings used can take thrust in either direction depending on the pump application, and no special thrust bearing is required.

During assembly of a pump for the first time, the stuffing box 70 and then the casing side liner 36 are positioned on the first locating surface 68 and in contact with one another, and fitting of the outer casing 24 by screwing to the mounting flange 58 can occur before, in between, or after those two steps. Thereafter the main liner 34 can be positioned by sliding along the second locating surface 66 towards the pedestal 10 until the extending annular portion 84 of the inner main liner (which is arranged beyond the free end of the annual locating collar 60) registers against the extending portion 82 of the casing side liner 36 and is aligned in place accordingly, so that the casing side liner 36 is located in close interfitting relation between the stuffing box 70 and the inner main liner 34. This same procedure can be followed in reverse during maintenance or retrofitting of new pump components onto the pedestal or base 10.

Referring to FIGS. 6 to 15, the details of the features of the pump pedestal or base 10 will now be described. FIGS. 6 to 15 illustrate the pump pedestal or base 10 with the pump housing 20 removed to provide a better view of the elements of the base 10. As already described in relation to FIG. 3, the pedestal or base 10 comprises a main body 52 which includes a bearing assembly mounting portion for receiving at least one bearing assembly for the pump drive shaft 42, which extends therethrough. The main body 52 has a series of bores 55 extending therethough to receive the drive shaft 42.

Figure 5:
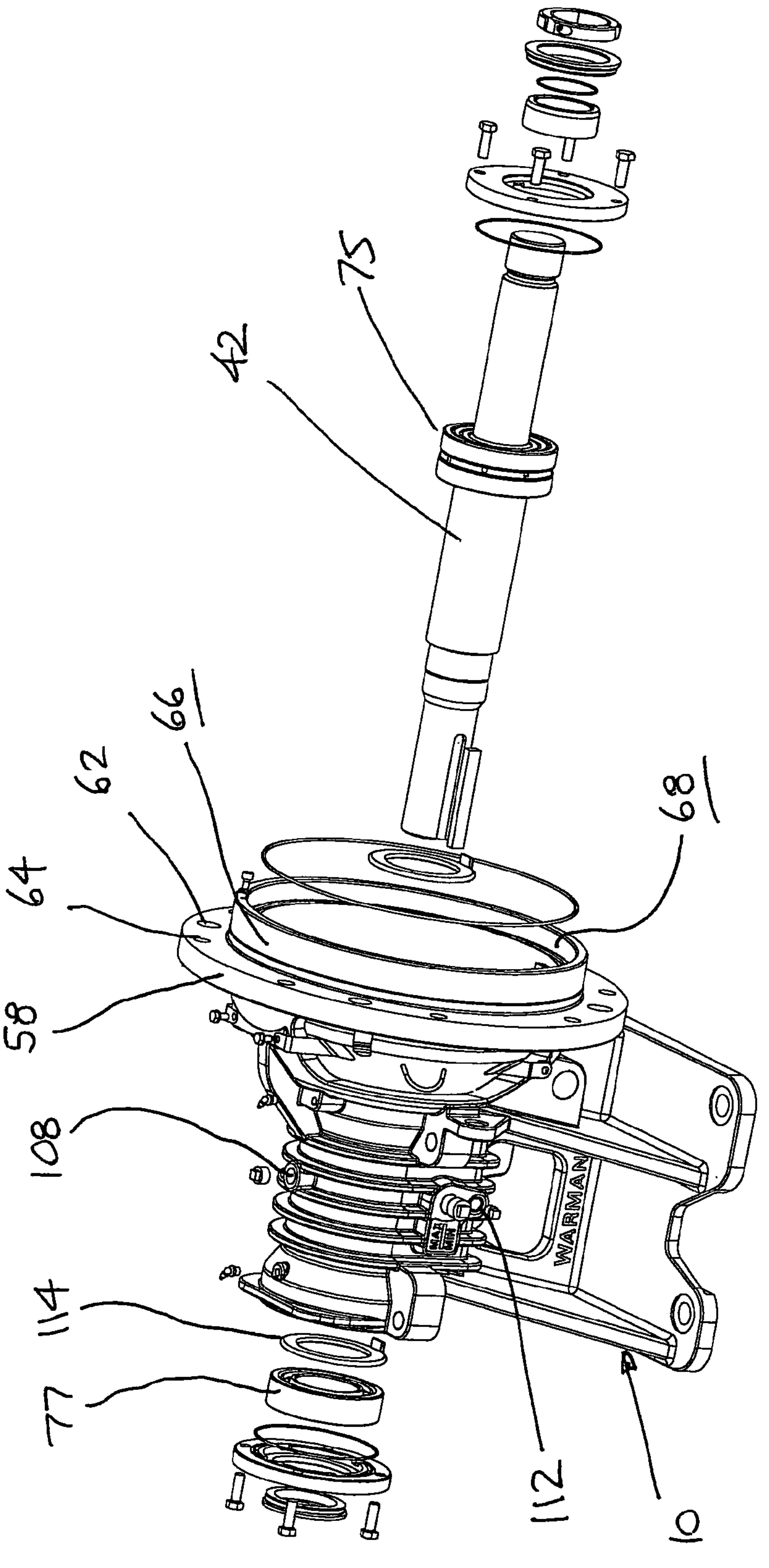
FIG. 5 illustrates a perspective, exploded view of the pump housing support shown in FIG. 1.
Figure 6:
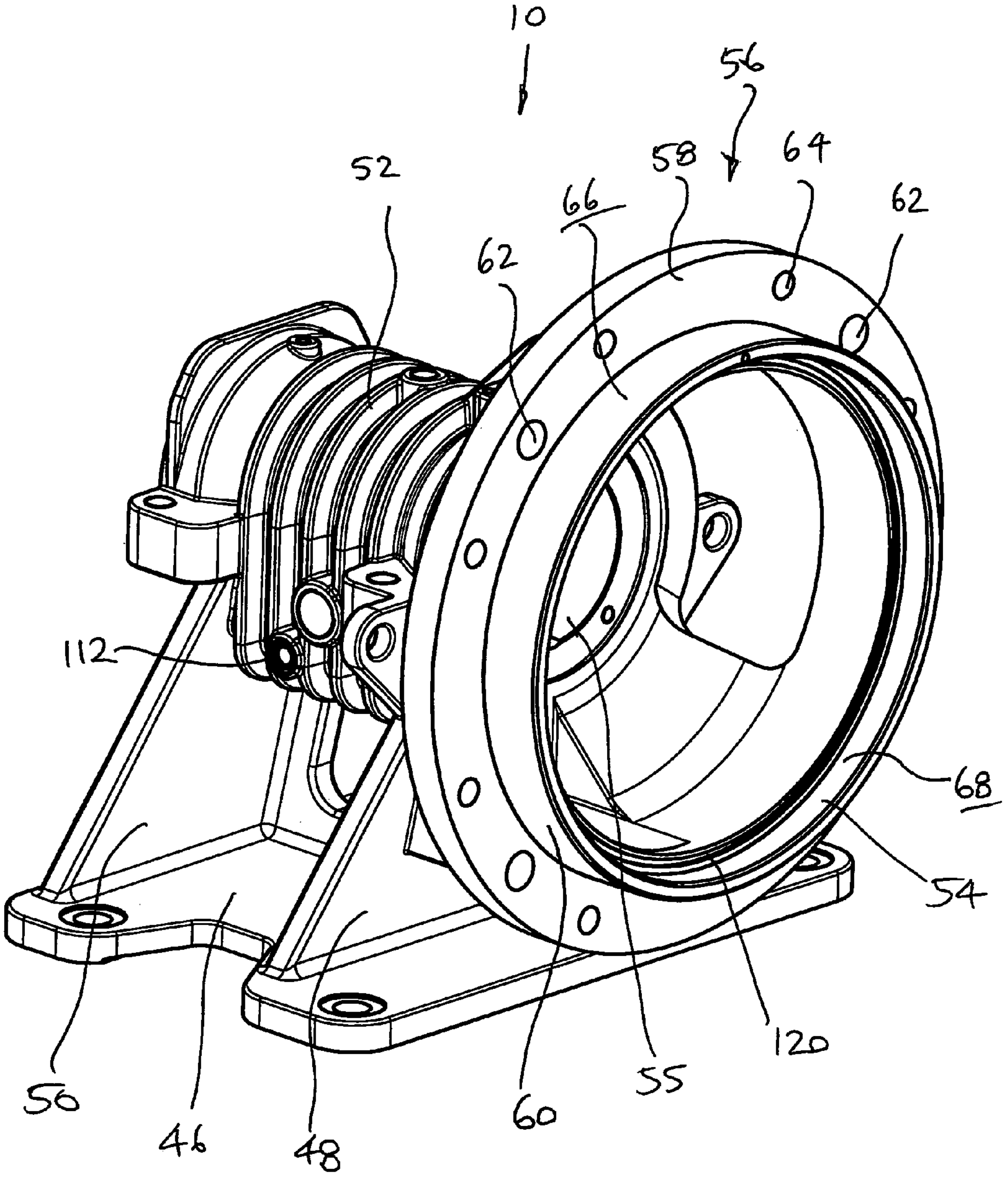
FIG. 6 illustrates a perspective view of the pump housing support shown in FIG. 1.
Figure 7:
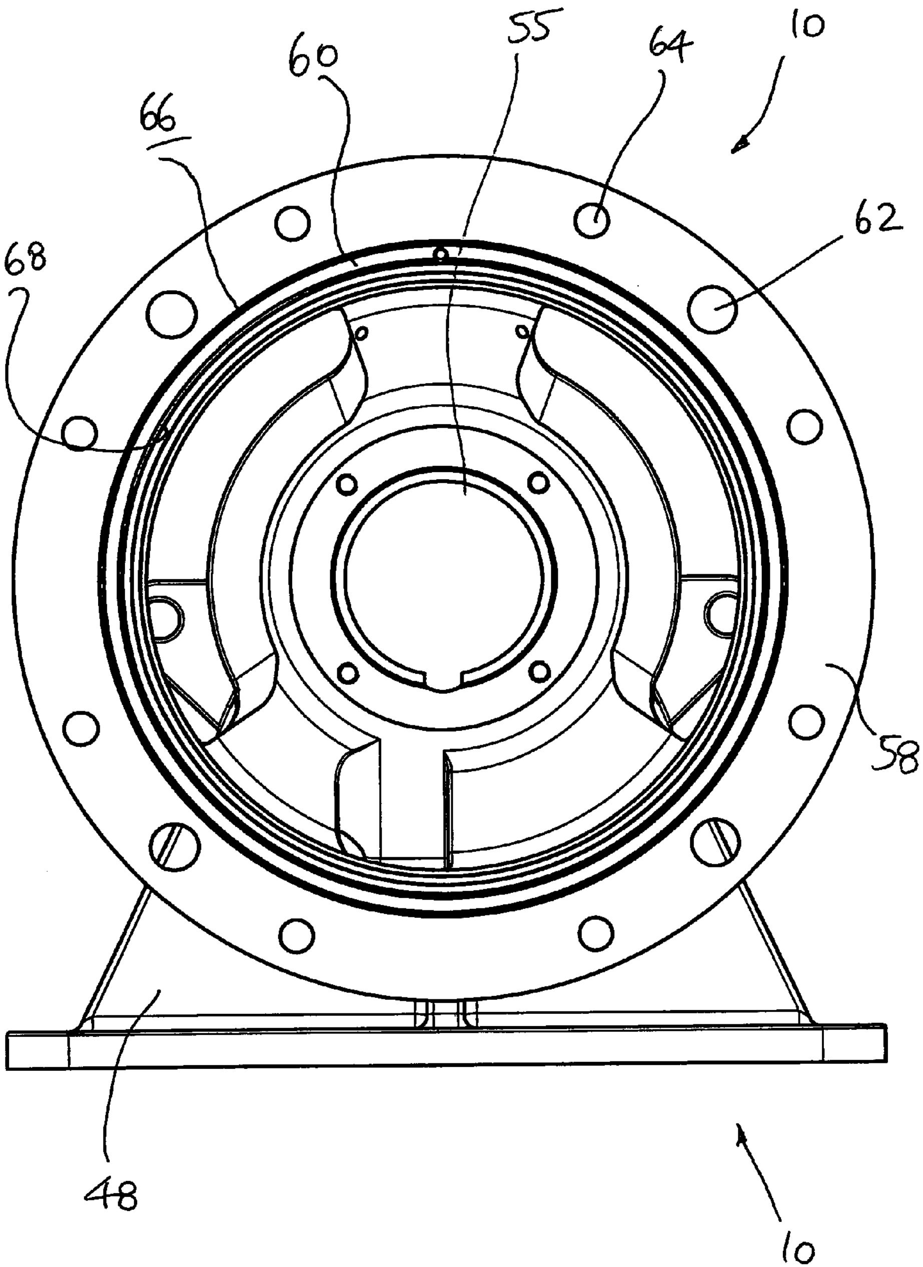
FIG. 7 illustrates a view in elevation of the pump housing attachment end of the pump housing support of FIG. 6.
Figure 8:
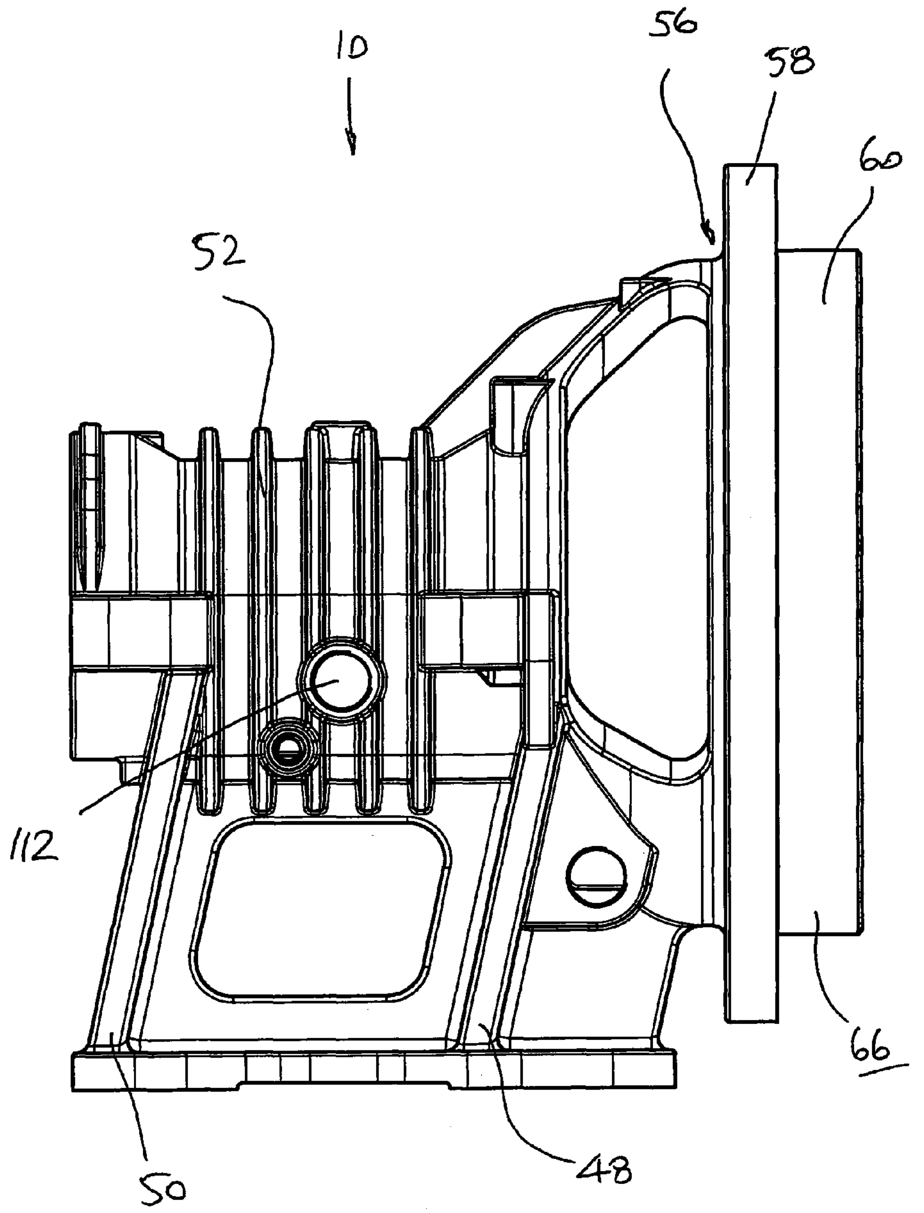
FIG. 8 illustrates a side view in elevation of the pump housing support shown in FIG. 7, rotated 90° to the right.
Figure 9:
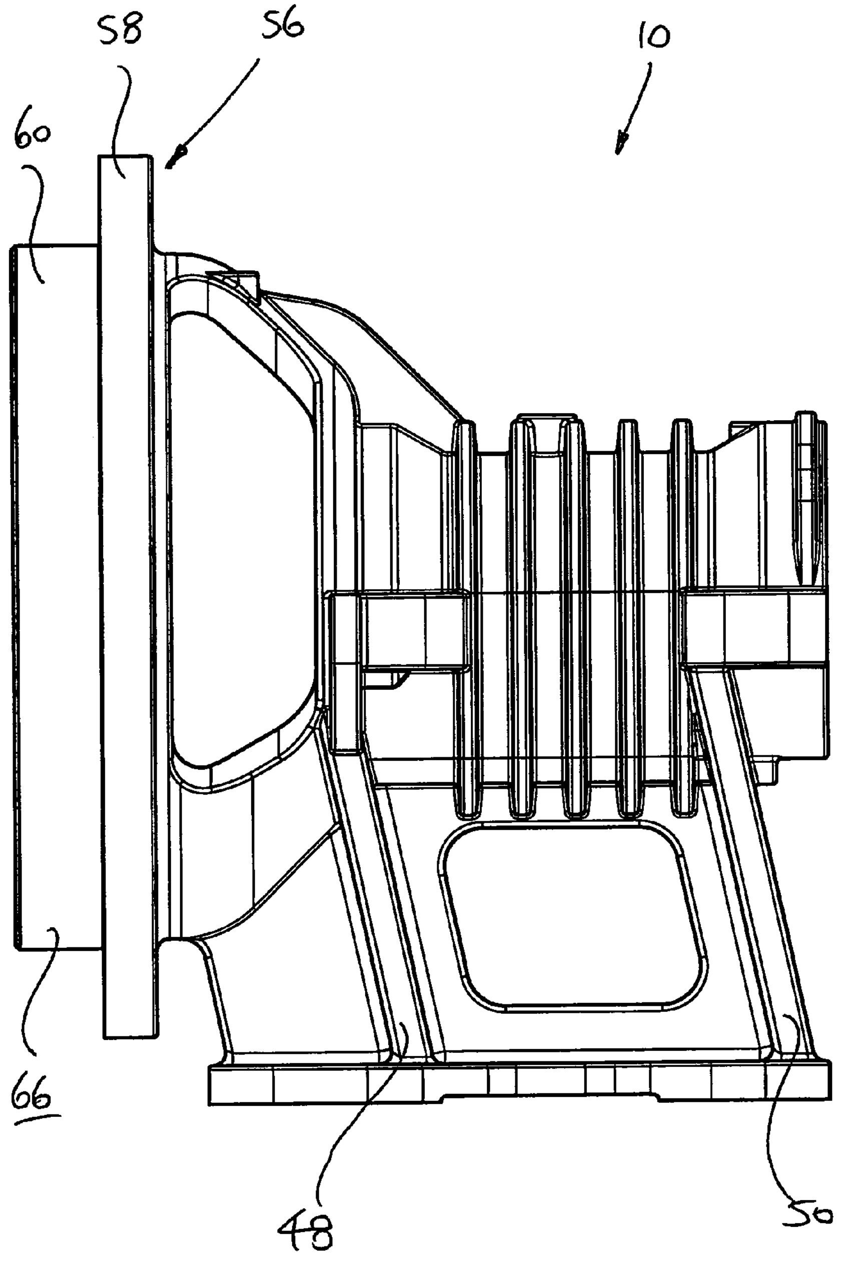
FIG. 9 illustrates a side view in elevation of the pump housing support shown in FIG. 7, rotated 90° to the left.
Figure 10:
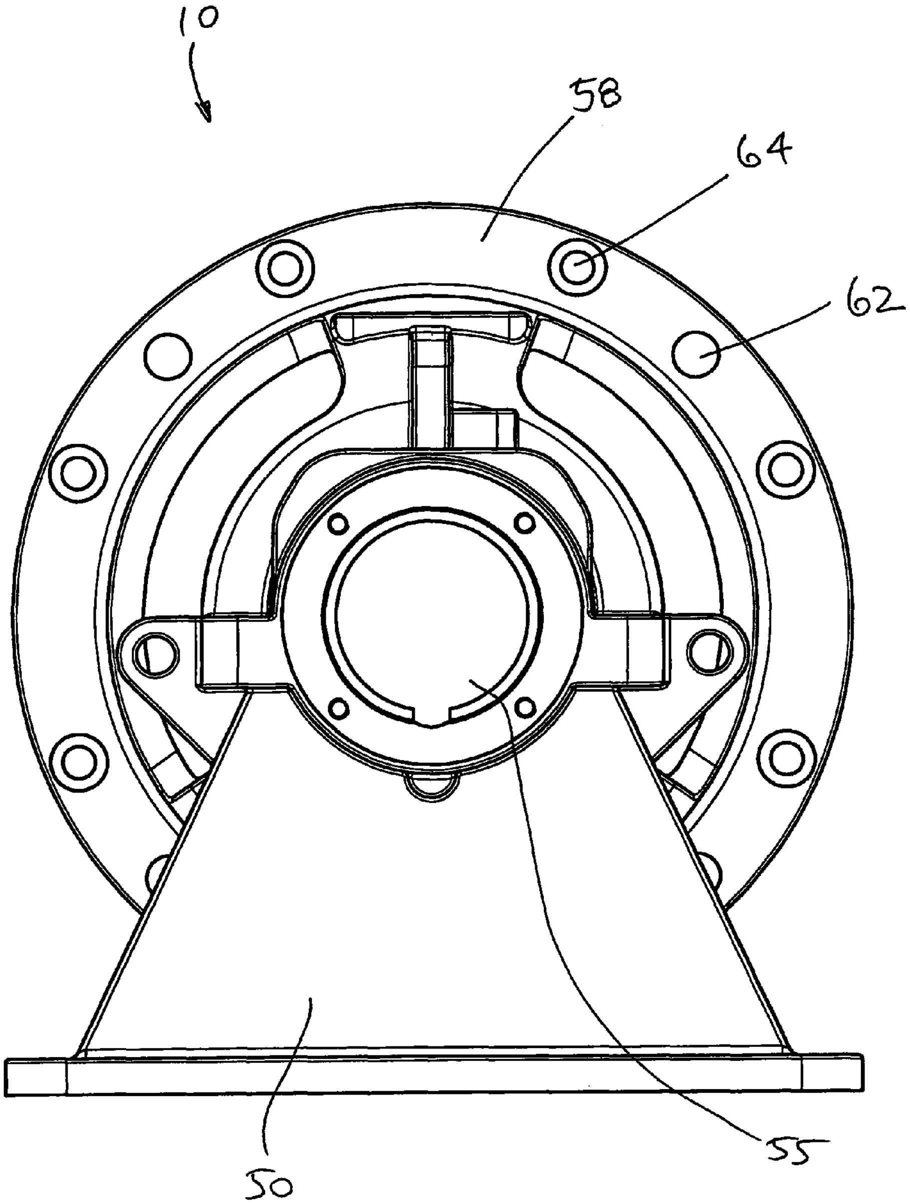
FIG. 10 illustrates a view in elevation of the pump housing support shown in FIG. 7, rotated 180° to the left to show the drive end.
Figure 11:
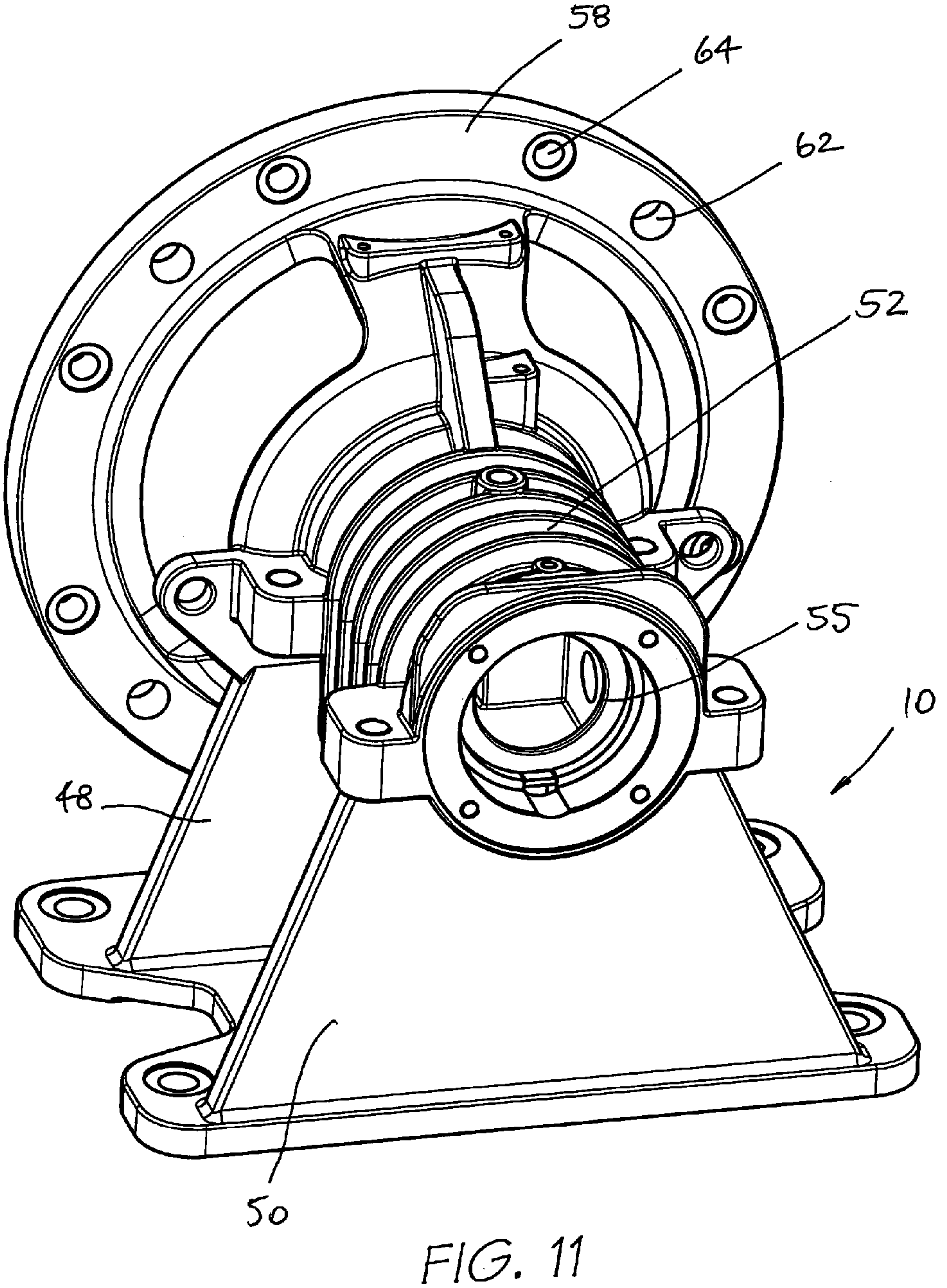
FIG. 11 illustrates a perspective view of the drive end and rear of the pump housing support shown in FIG. 10.
Figure 12:
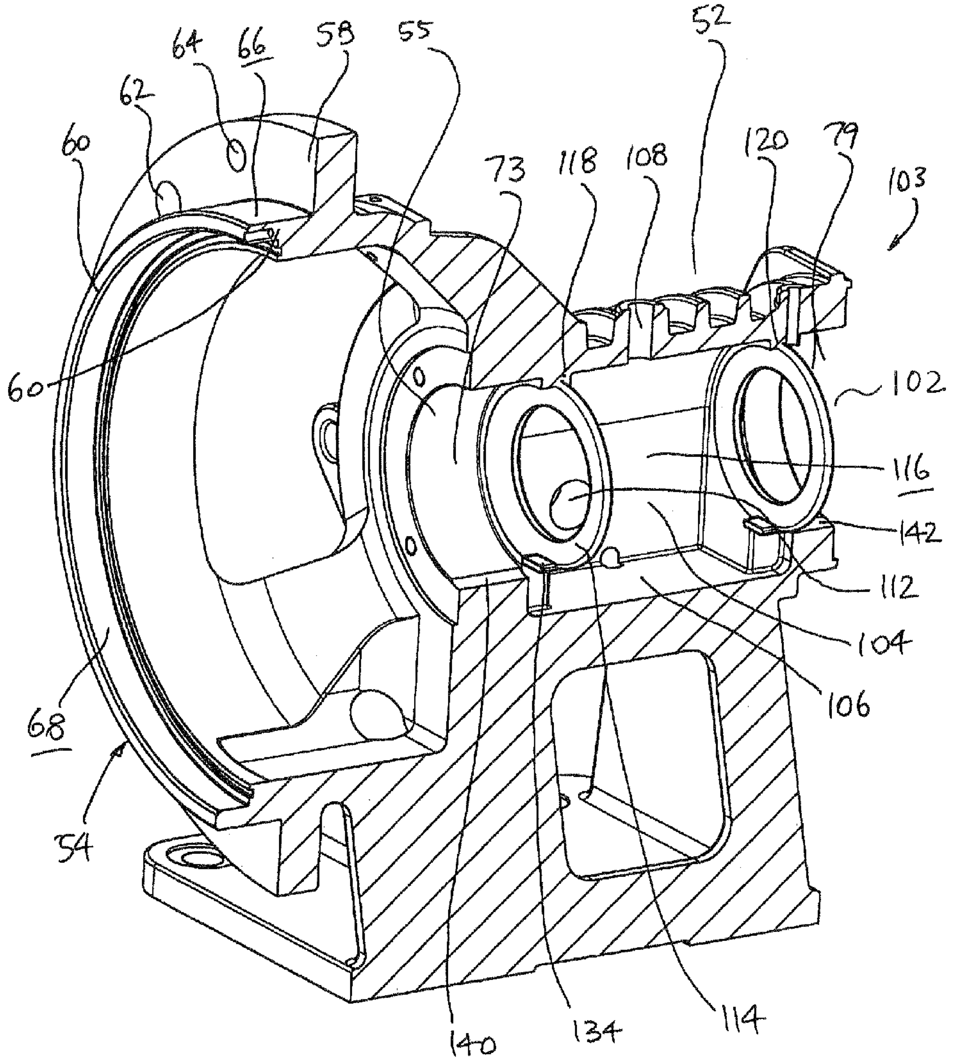
FIG. 12 illustrates a perspective view in cross-section of the pump housing support shown in FIG. 11, the pedestal being rotated 90° to the left.

As best seen in FIG. 12, the main body 52 of the pump pedestal or base 10 is hollow, having a first opening 55 oriented toward the first end 54 of the pump base 10 and a second opening 102 at the second end 103 of the pump base 10. A rear flange 122 is provided at the second end 103. The rear flange 122 provides means for attaching an end cap of a bearing assembly 124 as shown in FIG. 5, as is known in the art. A barrel-like chamber 104 having a generally cylindrical interior wall 116 is formed between the first opening 55 and second opening 102. The drive shaft (not shown) of the pump 8 extends through the second opening 102, through the chamber 104 and through the first opening 55 as described further below. A first annular space 73 is formed in the main body 52 toward the first end 54 of pump base 10, and a second annular space 79 is formed toward the second end 102 of the pump base 10. The first annular space 73 and second annular space 79 are structured as receiving zones to each receive a respective ball or roller bearing assembly therein (first bearing assembly 75 and a second bearing assembly 77 shown in FIG. 5) housed therein and through which the drive shaft extends. The bearing assemblies 75, 77 carry the drive shaft 42.

Figure 13:
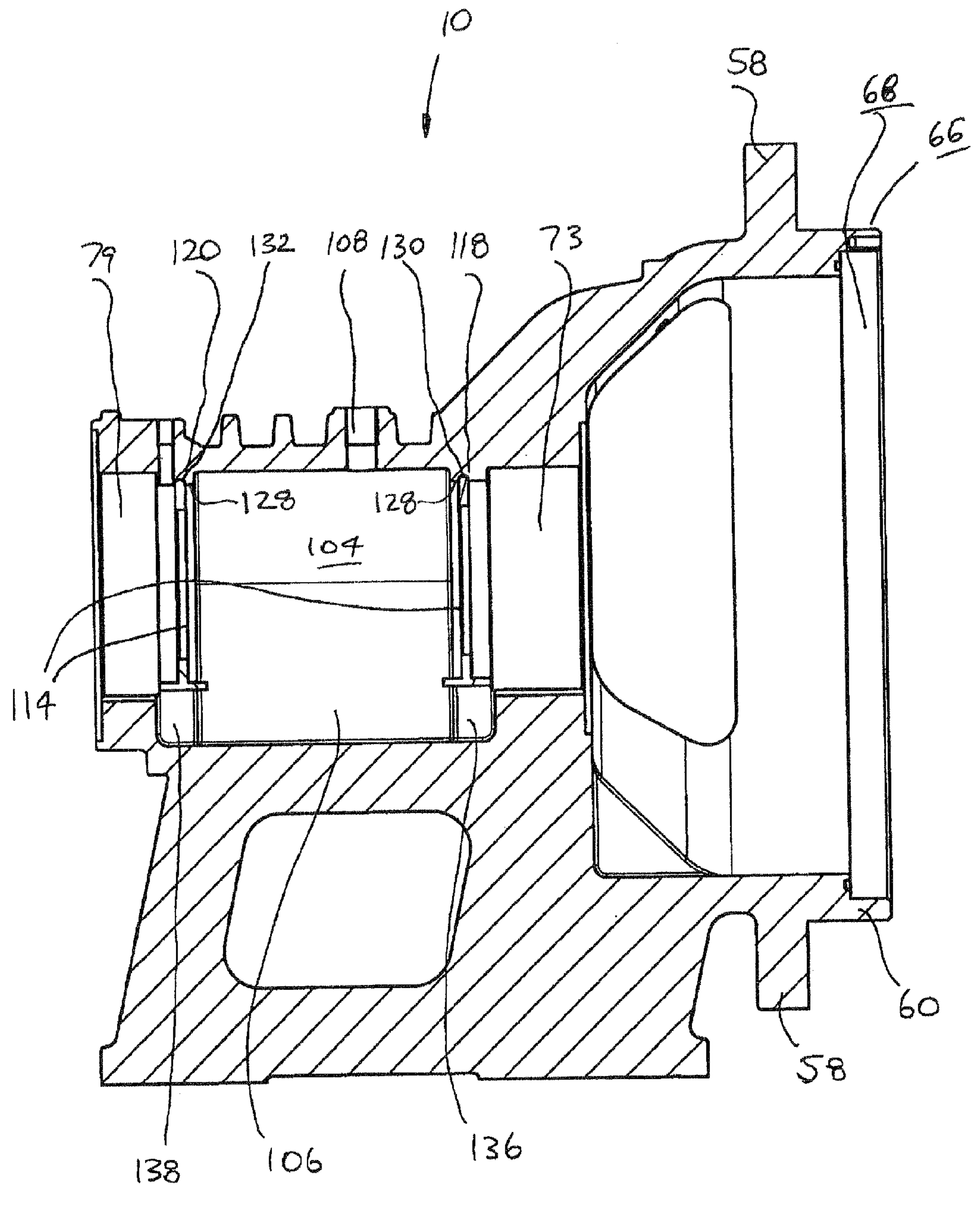
FIG. 13 illustrates a side view in cross-sectional elevation of the pedestal shown in FIG. 11.

The chamber 104 of the main body 52 is arranged to provide a retainer for a lubricant to lubricate the bearing assemblies 75, 77. A sump 106 is provided at the bottom of the chamber 104. As best seen in FIGS. 12 and 13, the main body 52 may be formed with a venting port 108 through which a lubricant may be introduced into the chamber 104, or through which pressure in the chamber 104 may be vented. The main body 52 may also be structured with a drain port 110 for draining lubricant from the main body 52. Further, the main body 52 may be structured with a window 112 or similar device for checking or determining the level of lubricant in the chamber 104.

The pump pedestal or base 10 may be adapted to retain different types of lubricants. That is, the chamber 104 and the sump 106 may accommodate the use of fluid lubricants, such as oil. Alternatively, more viscous lubricants such as grease may be used to lubricate the bearings and, to that end, lubricant retaining devices 114 may be positioned within the main body 52, adjacent the first annular space 73 and second annular space 79 to assure proper contact between a more viscous lubricant and the bearing assemblies 75, 77 housed within the respective annular spaces 73, 79 by forming a partial barrier between the bearing assemblies 75, 77 located in the respective annular spaces 73, 79 and the sump 106, as will now be described.

The first annular space 73 is demarcated from the chamber 104 by a first wall shoulder portion 118 that extends from the interior wall 116 toward the axial centreline of the base or pump pedestal 10. The second annular space 79 is demarcated from the chamber 104 by a second wall shoulder portion 120 that also extends from the interior wall 116 toward the centreline of the base or pump pedestal 10.

Figure 14:
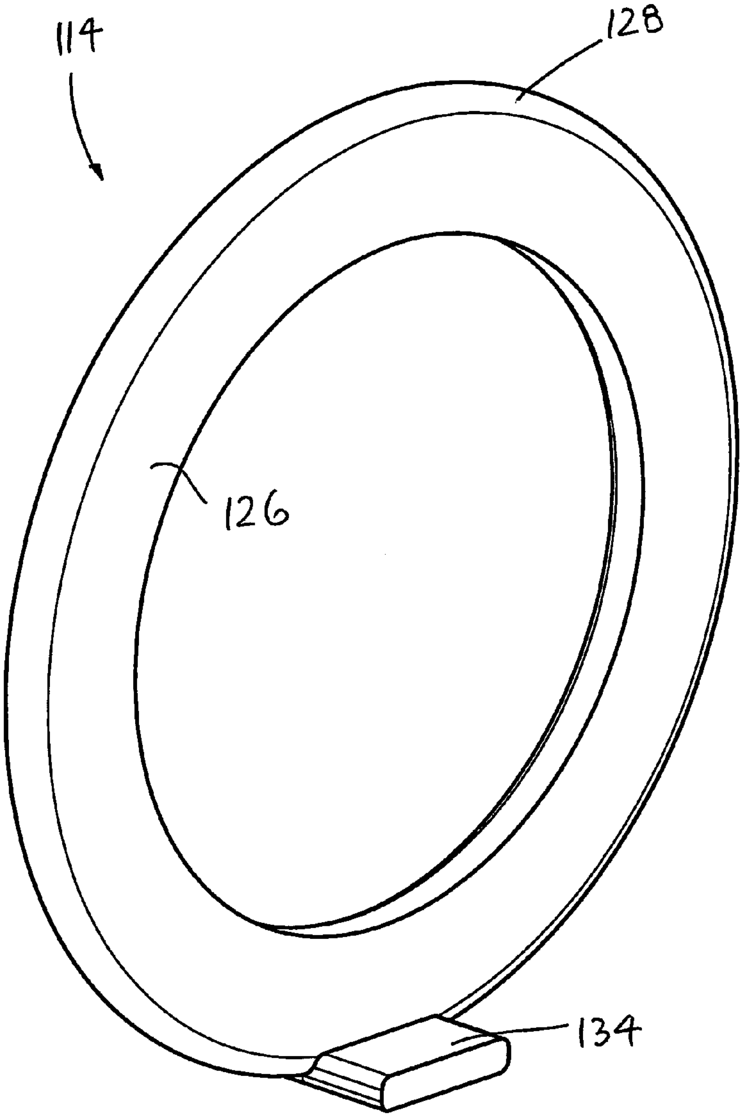
FIG. 14 illustrates a perspective view of a barrier element shown in FIGS. 12 and 13.
Figure 15:
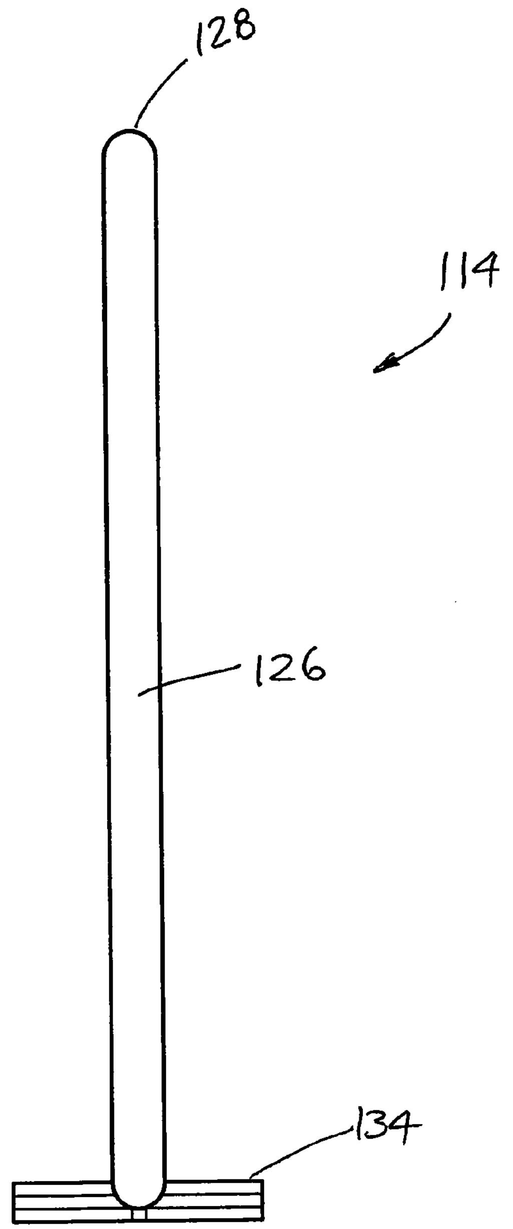
FIG. 15 illustrates a side view in elevation of the barrier element shown in FIG. 14.

Each lubricant retaining device comprises an annular barrier wall in the form of a ring portion 126, as best shown in FIGS. 14 and 15, that has an outer circumferential edge 128. As shown in FIG. 13, the outer circumferential edge 128 of the lubricant retaining device 114 is sized to be received within a groove 130, 132 formed, respectively, in the first wall portion 118 and second wall portion 120. The lubricant retaining device 114 is made of a material that imparts substantial stiffness to the ring portion 126. In a particularly suitable embodiment, the lubricant retaining device 114 is made of a material that while sufficiently rigid, has a sufficient modulus of elasticity to render the ring portion 126 sufficiently flexible so that the circumferential edge 128 can be eased into and out of position within the groove 130, 132.

Each lubricant retaining device 114 is also formed with a basal flange 134 which extends laterally from the ring portion

126 and which, as best illustrated in FIGS. 12 and 13, when in use is sized to extend over (or overlie) a respective first channel 136 and second channel 138 adjacent the sump 106 to regulate the movement of lubricant out of a first drain slot 140 (in the base of the first annular space 73) and out of a second drain slot 142 (in the base of the second annular space 79) leading into the sump 106. In use a free outer edge of the basal flange 134 abuts a respective bearing assemblies 75, 77.

In operation it is desirable that a relatively more highly viscous lubricant material such as grease is maintained in circulation in the area of the bearing assemblies 75, 77 and does not collect in the sump 106 of the base or pedestal 10. Lubricant that is in contact with the bearing assembly 75 housed within the first annular space 73 normally travels, by gravity, toward the first drain slot 140 and then travels into a first channel 136 that is in fluid communication with the sump 106. Likewise, lubricant that is in contact with the bearing assembly housed within the second annular space 79 normally travels, by gravity, towards the second drain slot 142 and then travels into a second channel 138 that is in fluid communication with the sump 106. When in position the lubricant retaining devices 114 are designed to retain lubricant in contact with the respective bearing assemblies 75, 77 in the first and second annular spaces 73, 79. That is, the ring portion 126 of the lubricant retaining devices 114 acts to retain grease in contact with the bearing assembly so that the grease is not displaced into the sump 106. The basal flange 134 restricts the flow of fluid entering into the first 136 or second 138 channels. Consequently, the bearings are properly lubricated by assuring sufficient contact time and retention between the bearing assembly and the grease (or grease-like substance).

Alternatively, if a flowable fluid, such as oil, is used as the lubricant, the lubricant retaining devices 114 are removed entirely to allow a flowable fluid, such as oil, to be used as the lubricant for lubrication of the bearing assemblies 75, 77. This enables oil or another flowable lubricant to be in free contact with the bearing assemblies 75, 77, which may be appropriate and desirable in certain applications.

The present arrangement of removable lubricant retainers 114 means that the same bearings can be lubricated either with grease or with oil. In order to achieve this, because the volume inside the frame is typically large and grease lubrication would be too easily lost from the bearings (which could lead to reduced bearing life), the snap-in lubricant retainers 114 (also known as grease retainers) are positioned to contain the grease in close proximity to the respective bearing assemblies 75, 77. Oil on the other hand, requires space to flow and to form a bath that will partially submerge a bearing in use. In such instances, the grease retainers 114 are not required at all and, if present, could cause the oil to bank up in the region of the bearing, thus causing excess churning and heating. Both of these conditions would reduce the bearing life.

Figure 57:
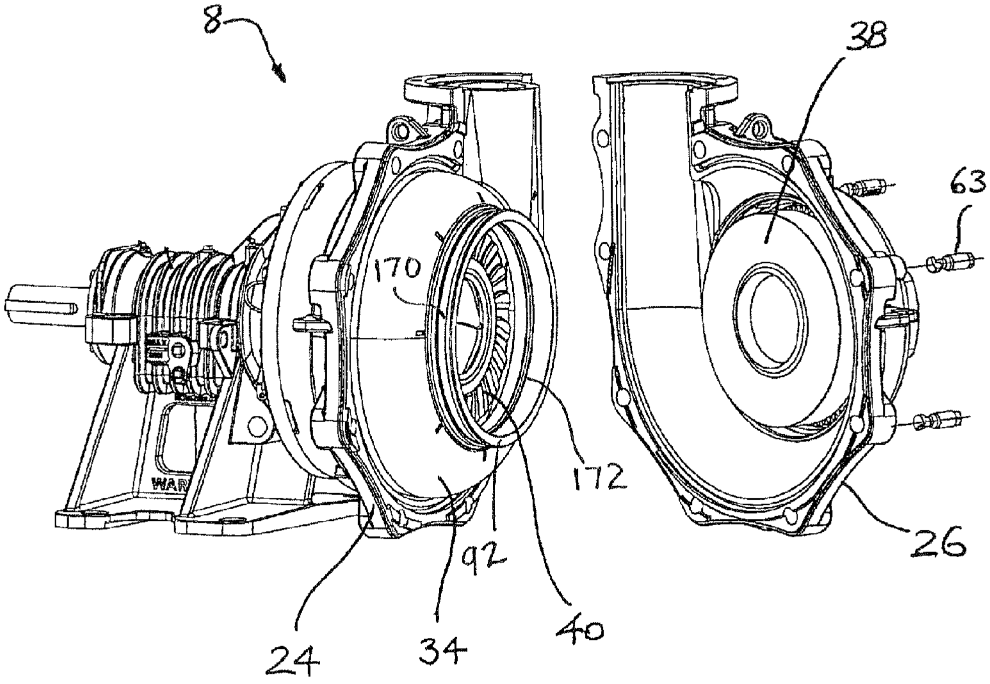
FIG. 57 illustrates a perspective, exploded view of the pump housing and a perspective view of the pump housing support of the pump assembly shown in FIGS. 1 and 2.
Figure 58:
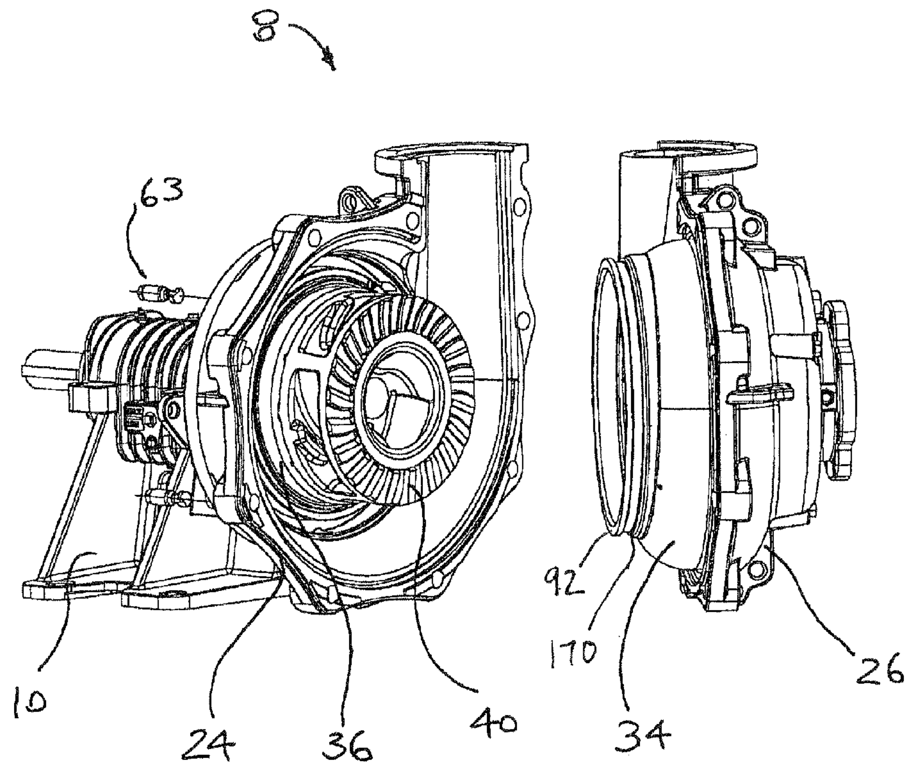
FIG. 58 illustrates a further perspective, exploded view of the pump housing and a perspective view of the pump housing support of the pump assembly shown in FIGS. 1 and 2.

Referring to the drawings, further details of the features of the pump inner main liner 34 and the details of the fixing pin 63 will now be described. FIGS. 18 to 22 illustrate the fixing pin 63, and FIGS. 16 and 17 illustrate the position of the fixing pin 63 in use with the pump assembly. FIGS. 3, 16, 17, 55 and 56 illustrate the pump main liner 34. FIGS. 57 and 58 illustrate a perspective, exploded view of the pump housing showing two possible configurations of the positioning of the inner main liner 34 during maintenance of the pump.

As previously described, to locate the inner main liner 34 in relation to the pedestal 10 as well as to the side casing part 24, four separate locating and fixing pins 63 are provided. In other embodiments it is envisaged that more or less than four fixing pins 63 can be used. As shown in the drawings the inner main liner 34 is positioned within the pump casing 22 and generally lines the central chamber of the pump 8 in which an impeller 40 is positioned for rotation, as is known in the art. The inner main liner 34 may be made of a number of different materials that impart wear-resistance. An especially commonly used material is an elastomer material.

As has already been described, the annular follower 88 is formed with a radially-extending lip 92 that has a face 94 that is oriented away from the mounting flange 58 of the pedestal 10. The face 94 of the lip 92 is angled from a plane that is perpendicular to the rotational axis of the pump 8. As shown in FIG. 17, a coupling and fixing pin 63 is positioned through the bore 62 in the mounting flange 58 of the pedestal 10 and into the aperture 96 of the side casing part 24 to engage the lip 92 of the inner main liner 34.

The structural configuration of the fixing pin 63 is shown in FIGS. 18 to 22. The fixing pin 63 includes a shank 144 having a head 98 at one end 148 and a tool operable element 150 at the other end 152. The shank 144 includes a neck section 154 and the head 98 includes a cammed surface 156 thereon. The cammed surface 156 includes a leading edge 158, a first section 160 and a second section 162 which terminates at a shoulder 164. The head 98 has a flat surface section 166 adjacent the leading edge 158 of the cammed surface 156, and also adjoining the shoulder 164. As can be seen in the drawings, the first section 160 of the cammed surface 156 is of greater inclination compared to the second section 162. The cammed surface 156 is generally spirally, screwingly or helically shaped in a direction away from the one end 148. The head 98 further includes a profiled locating free end 168 at the other end 152.

As shown in FIGS. 16 and 17 the fixing pin 63 is received within the aperture or opening 96 in the side casing part 24, the aperture 96 having a configured terminal end (or blind end) cavity 100 with a profiled section which co-operates with the profiled free end or terminal end locating section 168 of the head 98 of the fixing pin 63. The cammed surface is adapted to engage against the follower 88 portion of the inner main liner 34. The follower 88 takes the form of an annular flange which extends axially from the side of the inner main liner 34, and which comprises an annular circumferential groove 170 defined by the radially extending lip 92, where the face 94 of the lip 92 is angled from a plane that is perpendicular to the rotational axis of the pump.

When deployed in use, the fixing pin 63 is inserted through the aperture 62 of the mounting flange 58, and the flat surface section 166 is dimensioned to allow the head 98 to pass over the outer rim of the radially extending lip 92 on the side of the inner main liner 34 when the fixing pin 63 is in the correct orientation. The fixing pin 63 has a profiled locating free end 168 which is conical in shape which corresponds to the conical bottom of the blind end 100 of the aperture 92. When the fixing pin 63 is inserted, its terminal end 168 registers against and seats in the bottom of the blind end 100, and the fixing pin 63 can then be turned with a spanner or similar tool. The contact between the free end 168 of the fixing pin 63 and the blind end 100 assures proper positioning of the cammed surface 156 relative to the lip 92 of the inner main liner 34, and provides a locating device for the fixing pin 63.

As the fixing pin 63 is rotated, the helically-shape cammed surface 156 engages with the outer end of the groove 170 on the side flange of the inner main liner 34. Because the groove 170 has a sloping inside face 94, as the fixing pin 63 is rotated, the helically-shaped cammed surface 156 commences to make contact on, and bear against, the inner main liner 34 causing movement relative to the side casing part 24 (to draw the inner main liner 34 closer toward the side casing part 24 in an axial displacement). The resulting thrust also forces the end of the fixing pin 63 into contact with the bottom of the blind end 100 in the aperture 92 of the pump casing part 24 and to rotate. Consequently the fixing pin 63 becomes locked in place as the shoulder 164 of the head 98 contacts the lip 92 to stop its rotation. The groove 170 and the head end 98 of the fixing pin 63 are dimensioned such that the fixing pin 63 locks, after only around 180 degrees of rotation. The slower pitch on the end portion 162 of the cammed surface 156 assists with locking the fixing pin 63, and also prevents loosening.

The fixing pin 63 is self-locking and does not loosen until released by counter-rotation of the fixing pin 63 by use of a tool. For the purpose of rotation of the fixing pin 63, the tool-receiving end 66 may be configured to receive a tool, and as illustrated, the tool-receiving end 66 may be formed as a hex-head to receive a spanner or wrench. The tool-receiving end 66 may be configured with any other suitable shape, dimension or device for receiving a tool that can rotate the fixing pin 63.

Figure 16C:
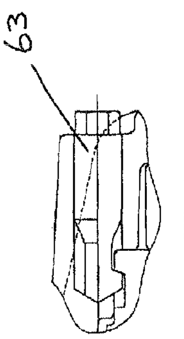
FIG. 16C is an enlarged view of a portion of FIG. 16 illustrating a detailed sectional view of the attachment of the pump housing to a pump housing inner liner.

A plurality of apertures or openings 62 are formed about the mounting flange 58 of the pedestal 10, and a plurality of apertures 96 are formed in the pump side casing part 24 to accommodate a plurality of fixing pins 63 being positioned therethrough to secure the inner main liner 34 in place as described. While the fixing pin 63 is described and illustrated herein with respect to securing the inner main liner 34 on the drive side of the pump casing part 24, the fixing pin 63 and cooperating elements are also adapted to secure the opposite side of the inner main liner 34 to the pump casing part 26, as shown in FIGS. 16, 16C and 58. This is because the liner 34 has a similar follower 88 and groove 170 arrangement on its opposing side, as will now be described.

The inner main liner 34 shown in FIG. 3 is arranged with openings 31 and 32 in opposed sides thereof, one of which 31 provides for an inlet opening for the introduction of a flow of material into the main pumping chamber 34. The other opening 32 provides for the introduction of the drive shaft 42 used for rotatably driving the impeller 40 which is disposed within the inner main liner 34. The inner main liner 34 is of volute shape with a discharge outlet hole 30 and a main body that is shaped generally like a car tyre.

Each of the side openings 31 and 32 of the main liner 34 are surrounded by like, continuous, circumferential, outwardly projecting flanges which each have a radially extending lip 92 and a groove 170 defined by the lip 92. The grooves 170 have an inclined side face 94 which can act as a follower 88 and the inclined side face is adapted to cooperate with a fixing pin 63 as illustrated in FIG. 17, used to fit the main liner 34 to another component of the pump assembly. It is the angled face 94 of the lip 92 which allows engagement of the inner main liner 34 to other components.

FIGS. 57 and 58 illustrate a perspective, exploded view of the pump housing showing two possible configurations of securing the inner main liner 34 during maintenance of the pump. The continuous, circumferential, outwardly projecting flanges which each have a radially extending lip 92 and a groove 170 are shown on both sides of the volute liner 34—in FIG. 57 the volute liner 34 is held by fixing pins 63 to the casing side part 24 (frame plate), and in FIG. 58 the volute liner 34 is held by fixing pins 63 to the casing side part 26 (cover plate). In both cases it is the engagement of the fixing pin 63 with the radially extending lip 92 which permits these configurations, with the advantage during maintenance of being able to access the front liner 38 as shown in FIG. 57 and being able to freely access the impeller 40 and the back liner 36 in the configuration shown in FIG. 58, without the need to disassemble the whole pump. The volute liner 34 can be easily released and removed from one of the side parts 24, 26, and held or retained on one or the other of the respective side parts 24, 26.

As shown in FIGS. 3, 50, 51, 52 and 57 there is a further peripheral groove 172 which extends around the inner circumferential surface of the outwardly projecting volute side flanges, on the side of the flanges opposite to the side having the lip 92 and groove 170. This groove 172 is adapted to receive a seal therein as illustrated in the Figures and as described herein.

Referring to the drawings, further details of the features of the pump seal chamber housing will now be described. In one form of this, FIGS. 23 to 34 illustrate the stuffing box 70 which is positioned in use about the drive shaft 42, and provides a shaft seal assembly about the drive shaft 42. The stuffing box is also shown in FIG. 3.

Figure 23:
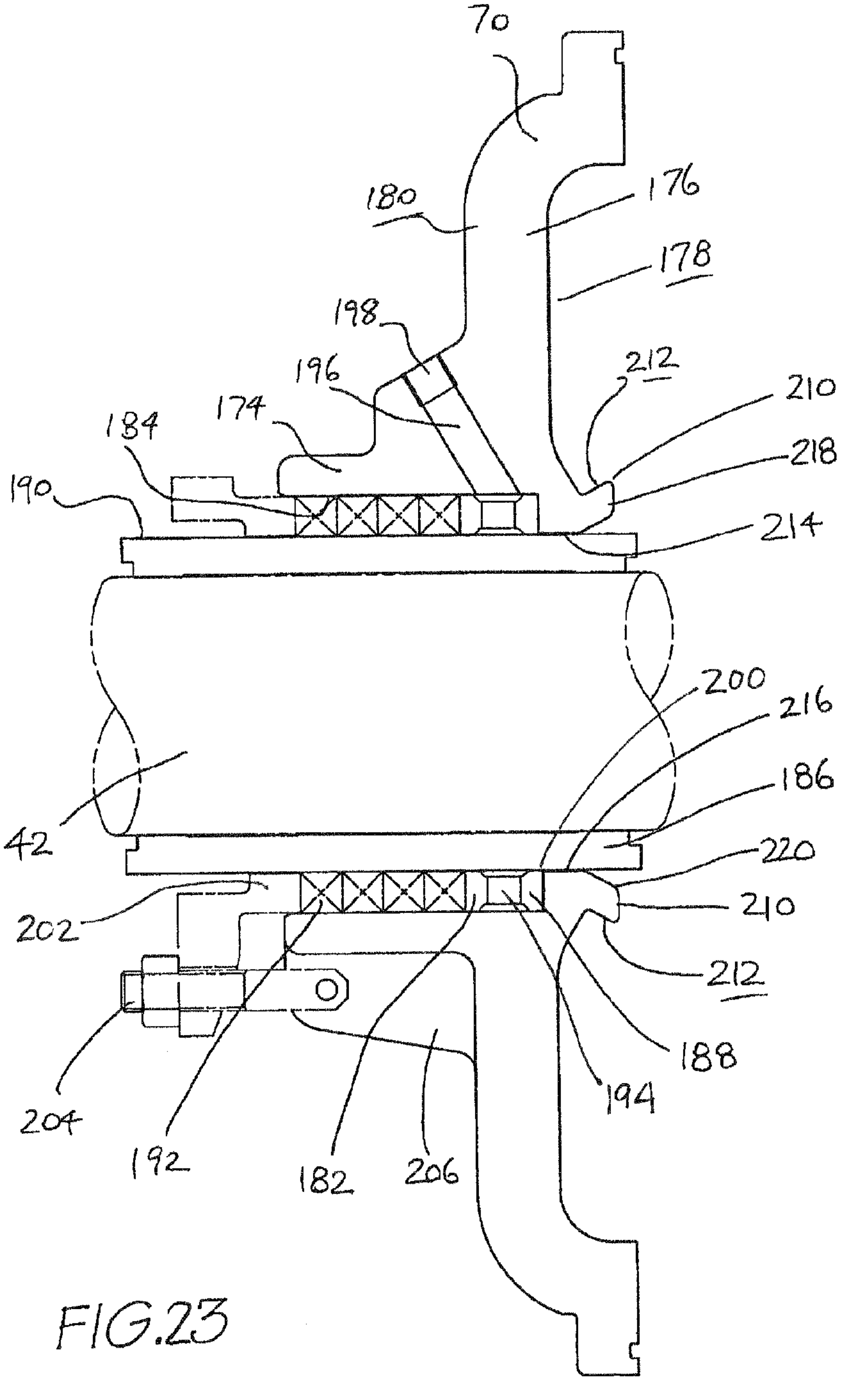
FIG. 23 illustrates a schematic view in radial cross-section of a seal assembly housing as previously shown in FIGS. 3 and 16, when in position about a pump shaft which extends from the pump housing support to the pump housing.

FIG. 23 illustrates a seal assembly which comprises a stuffing box 70 having a central section 174 and generally radially extending wall section 176. The wall section 176 has a first side 178, which is generally oriented toward the pumping chamber of the pump when the pump is assembled, and a second side 180, which is generally oriented toward the drive side of the pump when the pump is assembled.

Figure 24:
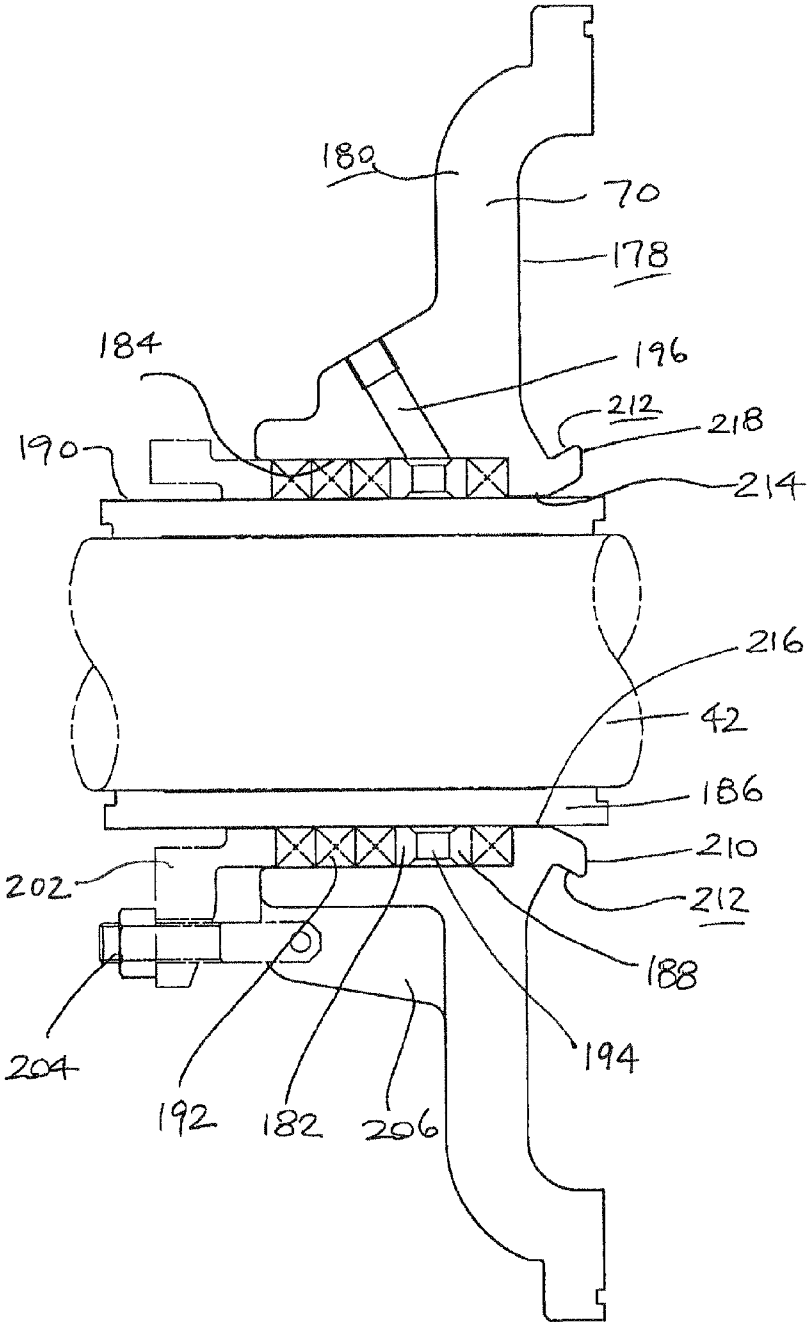
FIG. 24 illustrates a schematic view in radial cross-section of a seal assembly housing according to an alternative embodiment, when in position about a pump shaft.

A centralised bore 182 extends through the central section 174 of the stuffing box 70 and has an axially-extending inner surface 184 (also shown in FIG. 24). The bore 182 is adapted to receive a drive shaft 42 therethrough. A shaft sleeve 186 may optionally be positioned about the drive shaft 42, as shown in FIGS. 1 and 2.

Figure 25:
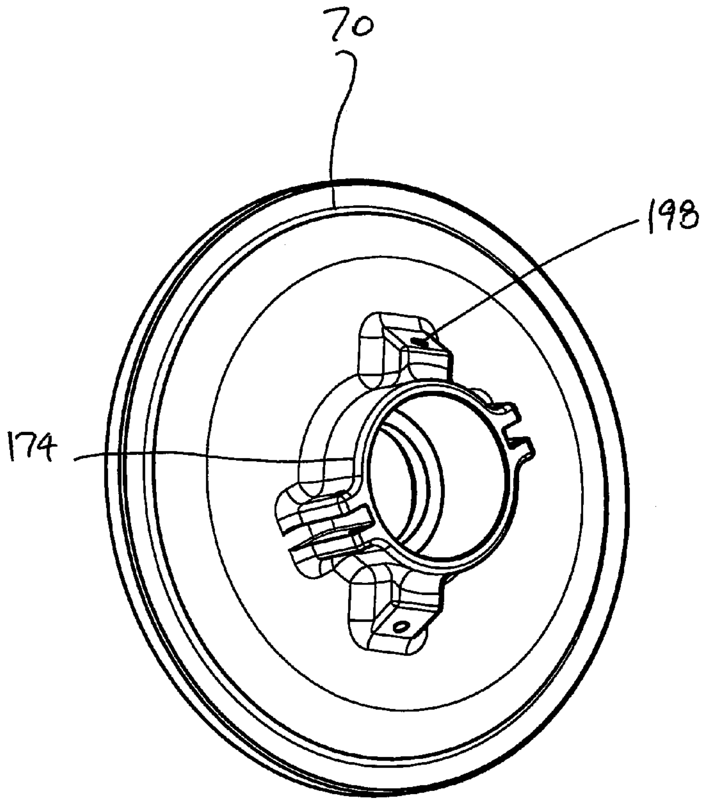
FIG. 25 illustrates a perspective view of the seal assembly housing depicting the rear side (or the in use 'drive side') of the housing arranged in use to be closest to the pump housing support.
Figure 26:
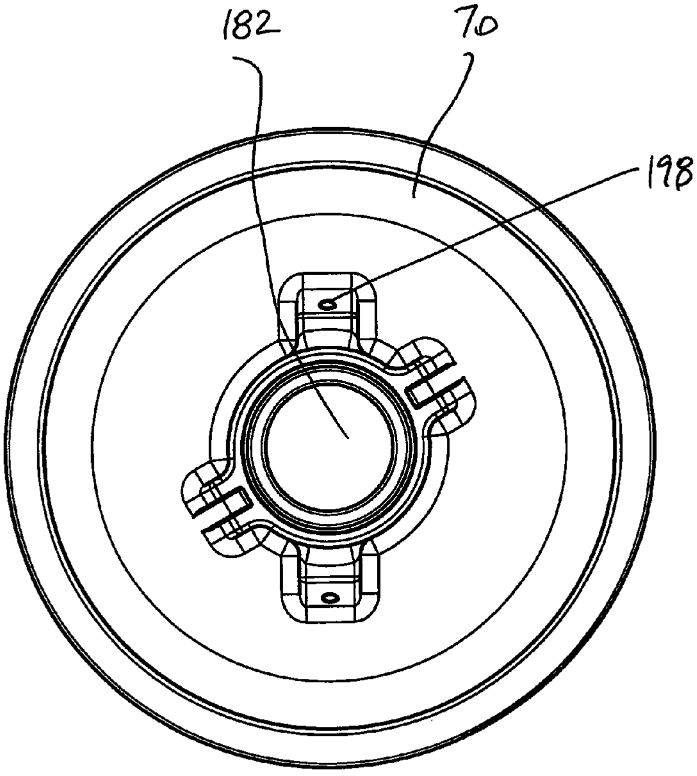
FIG. 26 illustrates a side view in elevation of the seal assembly housing shown in FIG. 25.

An annular space 188 is provided between the outer surface 190 of the shaft sleeve 186 and the inner surface 184 of the bore 182. The annular space 188 is adapted to receive packing material, shown here as packing rings 192 as just one exemplar packing material. A lantern ring 194 is also positioned in the annular space 188. At least one fluid channel 196 is formed in the stuffing box 70, having an external opening 198 positioned near the central section 174, as best illustrated in FIGS. 25 and 26, and an internal opening 200 which terminates in alignment with the lantern ring 194. This arrangement facilitates the injection of water via the fluid channel 196 into the region of the packing rings 192.

FIG. 23 depicts a first embodiment of the stuffing box 70 wherein the lantern ring 194 is positioned toward the one end of the annular space 188. FIG. 24 depicts a second embodiment of the seal housing wherein the lantern ring 194 is positioned inbetween the packing rings 192. This arrangement may provide fluid flushing capabilities that are more suitable to some applications.

A packing gland 202 is disposed at the outer end of the bore 182 and is adapted to contact the packing material 192 to compress the packing material within the annular space 188. The packing gland 202 is secured in place relative to the annular space 188 and packing material 192 by adjustable bolts 204 that engage the packing gland 202 and attach to saddle brackets 206 that are formed on the central section 174 of the stuffing box 70, as best seen in FIGS. 25 and 26. The axial position of the packing gland 202 is selectively adjustable by adjustment of the bolts 204.

Figure 27:
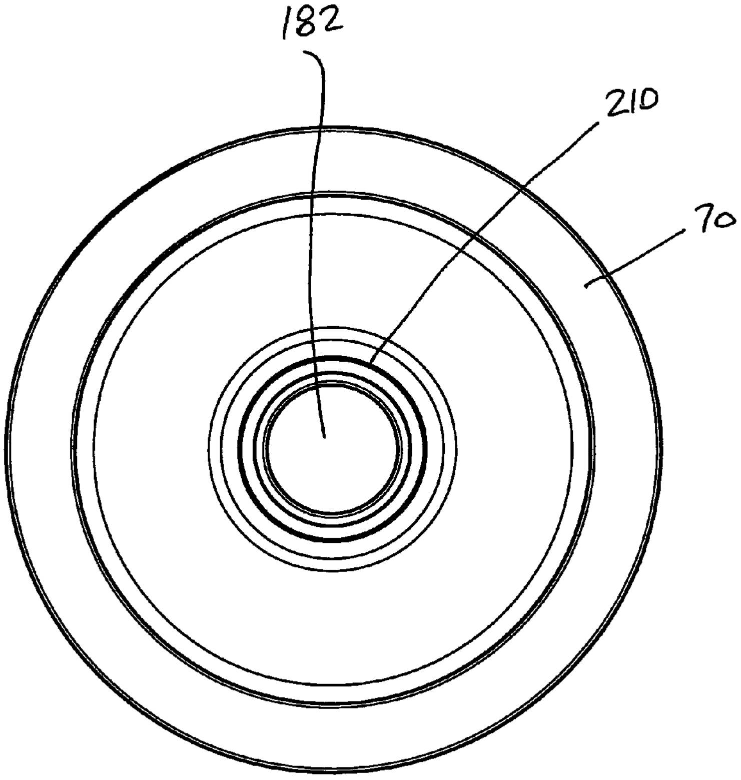
FIG. 27 illustrates a side view in elevation of the seal assembly housing shown in FIG. 26 rotated 180° and depicting the first side of the housing, which is oriented toward the pumping chamber of a pump.
Figure 28:
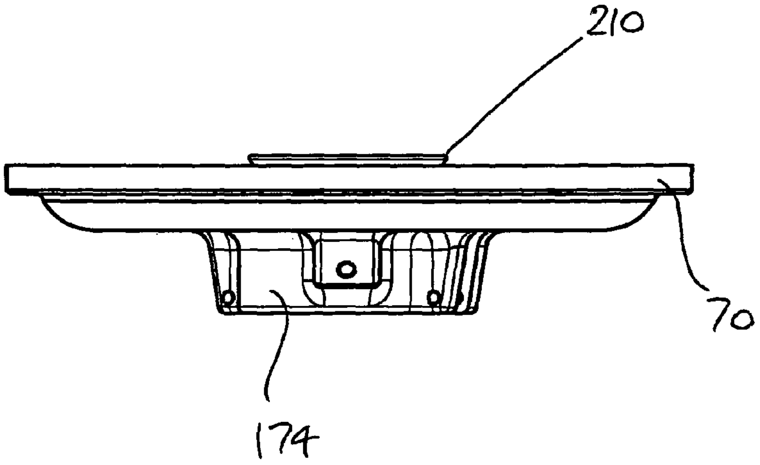
FIG. 28 illustrates a side view in elevation of the seal assembly housing shown in FIG. 27 rotated 90°.

The stuffing box 70 is configured with means for lifting and transporting it into position about the drive shaft 42 when the pump 8 is being assembled or disassembled. The stuffing box 70 is structured with a holding member 208 that encircles the centralised bore 182, as shown in FIGS. 27 and 28. The holding member 208 is generally a ring formation 210 that may either be integrally formed with the stuffing box 70, such as by casting or molding, or may be a separate piece that is secured to the stuffing box 70 in any suitable manner about the centralised bore 182.

As shown in FIG. 23, the ring formation 210 is configured with an outwardly extending and angled lip that flares away from the bore 182. The lip provides a bearing surface 212 or inclined bearing face against which a lifting element may be positioned for grasping the stuffing box 70, as explained more fully below. The lip extends outwardly from an axially-extending wall 214 of the bore 182. The wall 214 forms an annulus 216 the diameter of which is sized to contact the drive shaft 42 or shaft sleeve 186, as depicted in FIG. 23.

It is further noted in FIGS. 23 and 24 that a radially-extending shoulder 218 is located adjacent the axially-extending wall 214 and forms an inward end of the annular space 188. The shoulder 218 and wall 214 form a restrictor or throttling bush 220 for the annular space 188 such that fluid introduced into the annular space 188 via the fluid channel 196 and lantern ring 194 is restricted from entering into the pumping chamber. Because of the improved concentricity of the pump components brought about by the various interfitting arrangements already described to reduce the incidence of tolerance stacking, the throttling bush 220 is able to be positioned in a close-facing relationship with the exterior of the drive shaft 42 or shaft sleeve 186, to restrict the water entering into the pumping chamber.

It is envisaged that the same type of holding member that encircles the centralised bore in a general ring formation can also be applied to other forms of seal housing, for example in an expeller ring, and can also be applied to facilitate the lifting and movement of the back liner 36.

FIGS. 29 to 34 illustrate a lifting device 222 that is designed for attaching to the seal assembly by means of the holding member 208 formation, for lifting, transporting and aligning the seal assembly. The lifting device 222 comprises two angle beams 224 that are secured together in spaced apart arrangement forming an elongated main body portion 226 of the lifting device 222. A first mounting arm 228 and second mounting arm 230 are secured to the main body 226 and provide a means by which the lifting device 222 may be attached to a crane or other suitable apparatus for facilitating movement and positioning thereof. The two angle beams 224 may, most suitably, be secured to the mounting arms 228, 230, by such means as welding, bolts, rivets or other suitable means.

Figure 29:
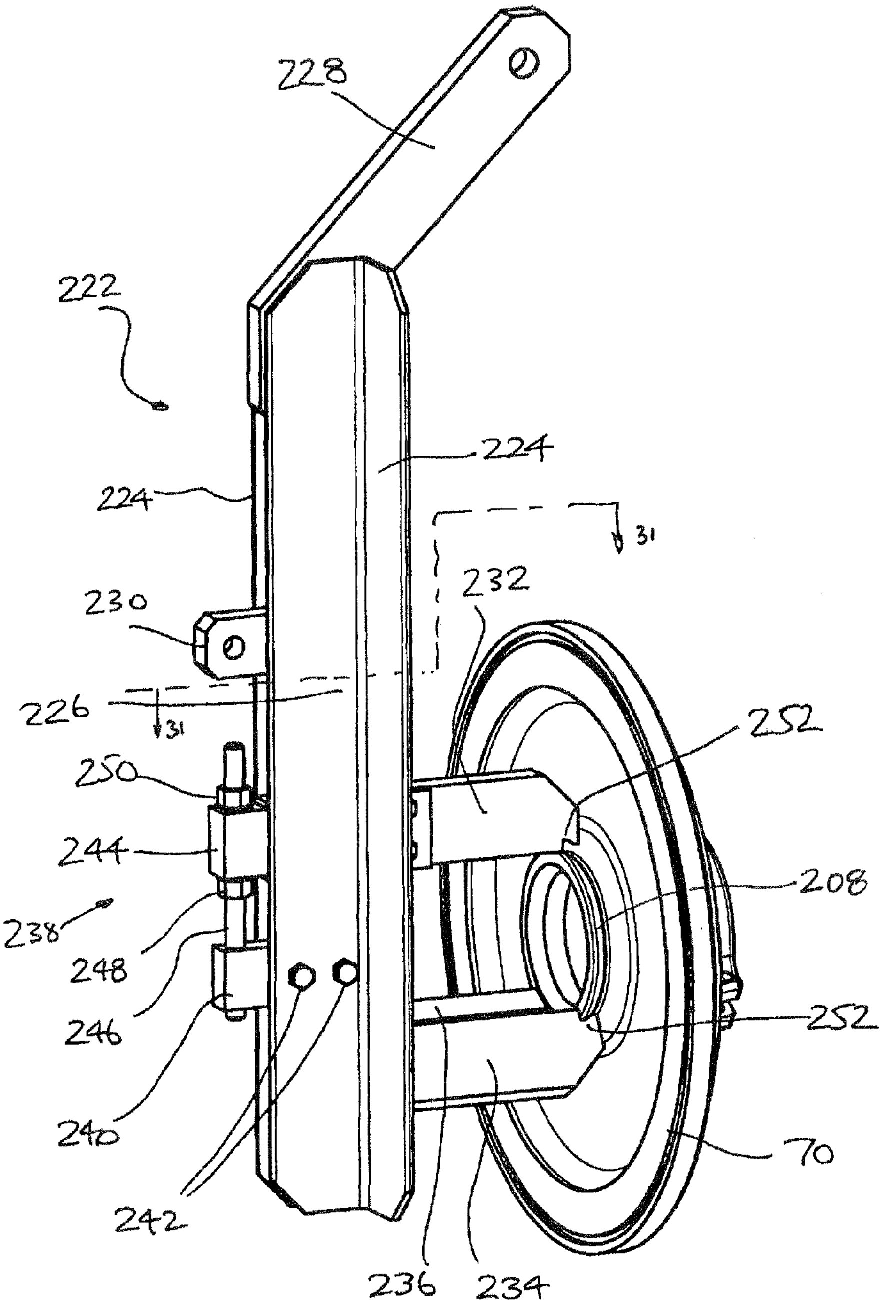
FIG. 29 illustrates a perspective view of a lifting device in accordance with one embodiment, shown in almost complete engagement with the seal assembly housing.
Figure 30:
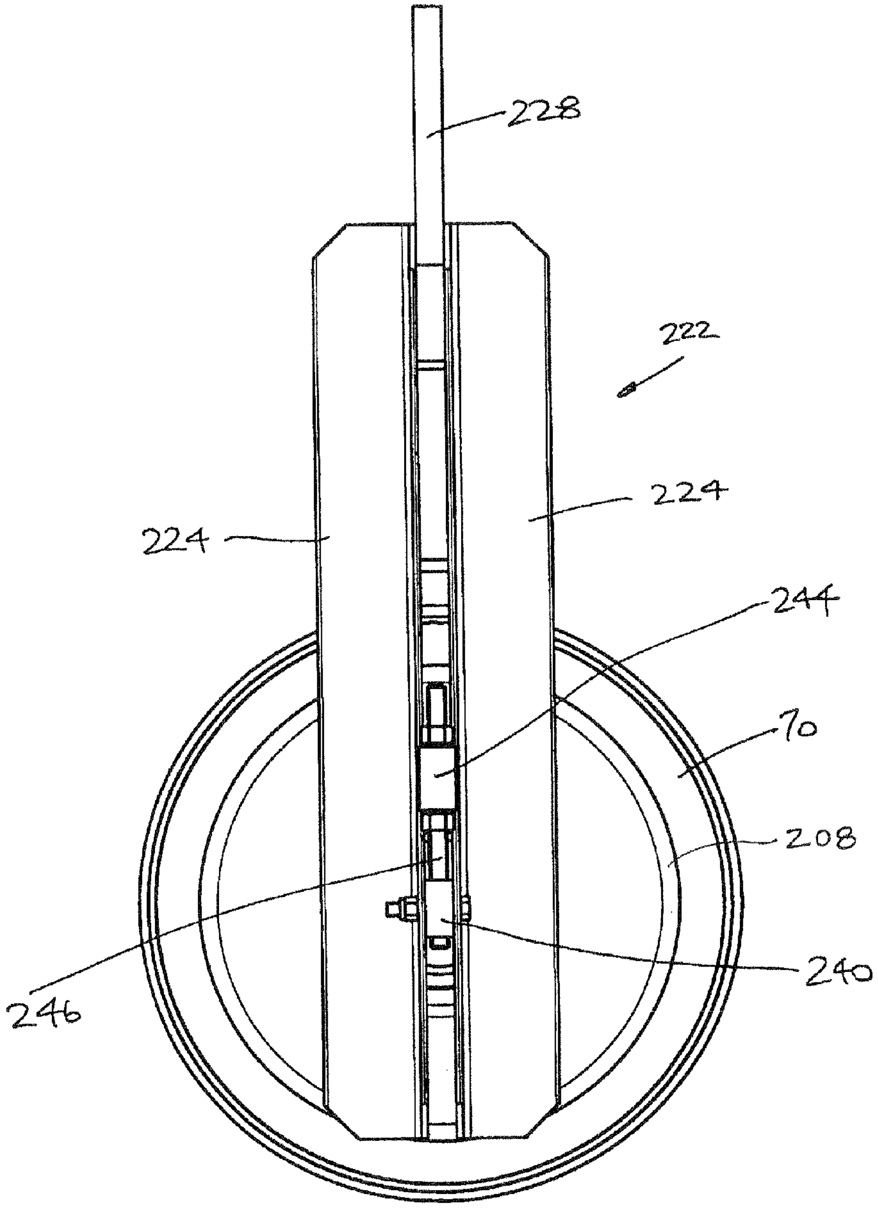
FIG. 30 illustrates a side view in elevation of the lifting device shown in FIG. 29, rotated 45° to the left.
Figure 31:
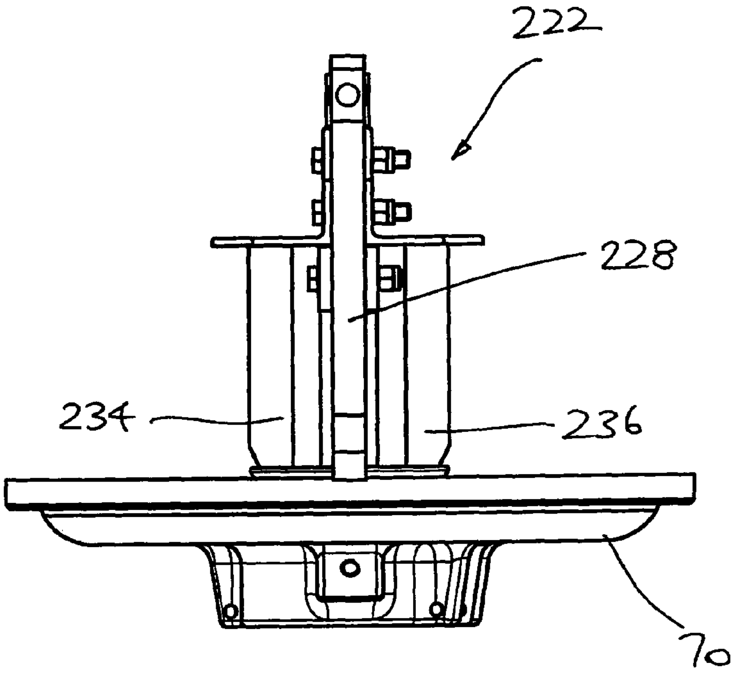
FIG. 31 illustrates a plan view of the lifting device and seal assembly housing shown in FIG. 29, taken at line 31-31 in FIG. 29.

Three clamping arms or jaws 232, 234, 236 are operatively mounted to and extend outwardly from the main body 226. The lowermost clamping jaws 234 and 236 are fixedly secured to respective angle beams 224 of the main body 226, as shown in FIG. 31, and the uppermost clamping jaw 232 is adjustable relative to the longitudinal length of the main body 226. Adjustment of the clamping jaw 232 is accomplished by an adjusting apparatus 238 on the lifting device 222 that comprises a stationary bracket 240 secured to the main body 226 by bolts 242, and a slidable bracket 244 that is positioned between the two angle beams 224 and is movable therebetween. The slidable bracket 244 is connected to the stationary bracket 240 by a threaded rod 246 that extends through both the slidable bracket 244 and the stationary bracket 240 as shown in FIGS. 29 and 30. The slidable bracket 244 is moved relative to the stationary bracket 240 by turning nuts 248 and 250 in an appropriate direction to effect movement of the slidable bracket 244, and hence the clamping jaw 232.

Figure 32:
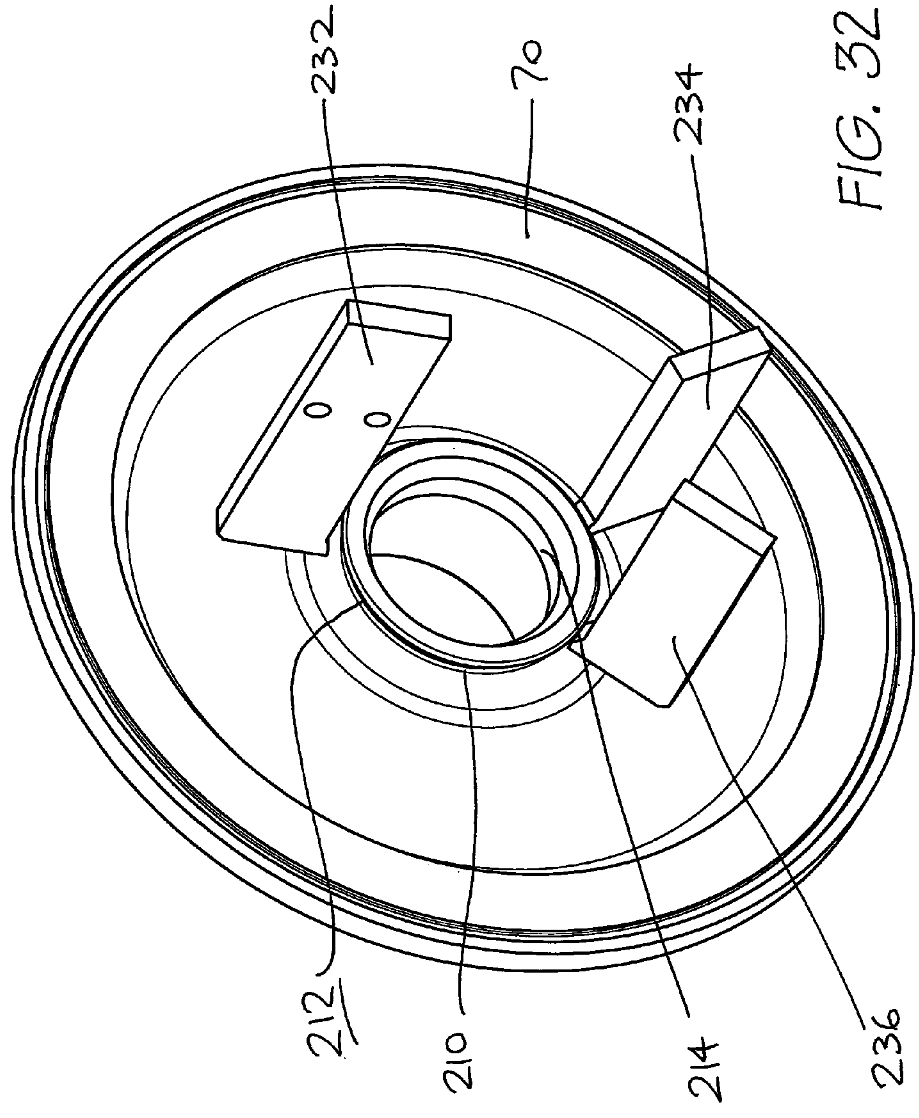
FIG. 32 illustrates a perspective view of the seal assembly housing showing attachment of the lifting arms of the lifting device, the remaining portions of the lifting device being removed for ease of illustration.
Figure 34:
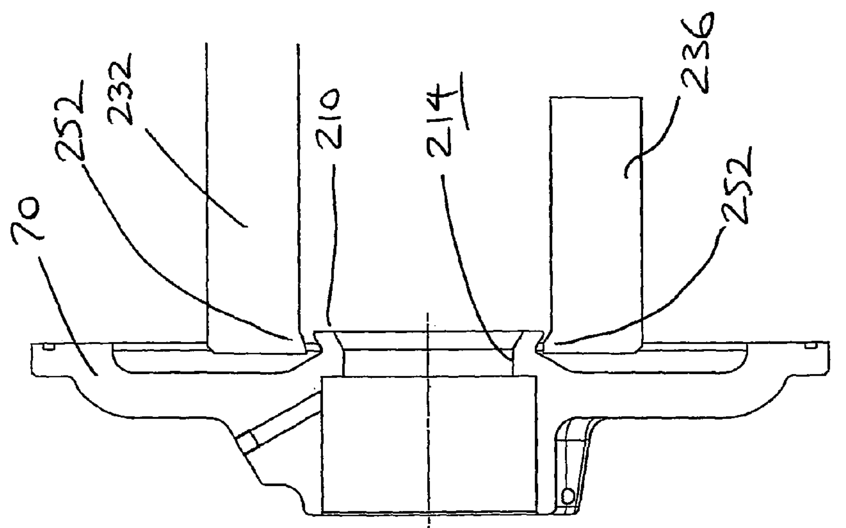
FIG. 34 illustrates a side view in elevation of the seal assembly housing and lifting arms shown in FIG. 32 taken at line A-A in FIG. 33.
Figure 33:
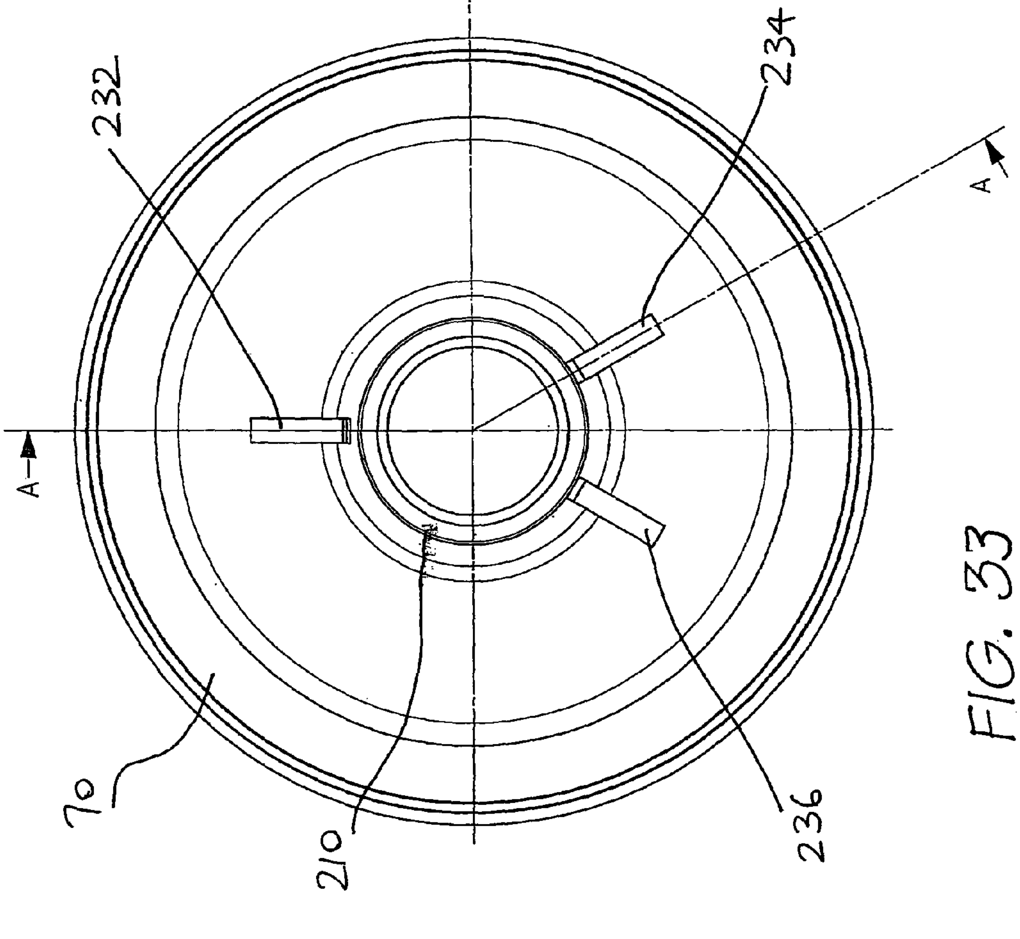
FIG. 33 illustrates a front elevational view of the seal assembly housing and lifting arms shown in FIG. 32.

It can be seen from FIGS. 29, 32 and 34 that each of the clamping jaws 232, 234, 236 is structured with a hook-like end 252 that is configured to engage the lip of the ring formation 210 of the holding member 208 on the seal housing. Notably, FIGS. 32 to 34 show only the clamping jaws 232, 234, 236 in position relative to the holding member 208, the other components of the lifting device 222 having been removed for ease of viewing and explanation. In particular, it can be seen that the hook-like end 252 of each clamping member 232, 234, 236 is structured to contact the bearing surface 212 of the lip.

It can further be seen from FIGS. 29, 32 and 33 that the clamping jaws 232, 234 and 236 are generally arranged to engage the holding member 208 at three points about the circumference of the holding member 208 to assure stable securement by the lifting device 222. The stuffing box 70 is secured to the lifting device 222 by first moving clamping arm 232, by operation of slidable bracket 244, to be spaced apart from the other two clamping jaws 234 and 236. The holding member 208 is then engaged by the hook-like ends of clamping jaws 234 and 236. While maintaining the stuffing box 70 in parallel alignment with the main body 226 of the lifting device 222, the clamping jaw 232 is slidably moved by operation of slidable bracket 244 to effect engagement of its hook-like end with the lip of the holding member 208. The secure engagement of the holding member 208 by the clamping jaws 232, 234, 236 is assured by tightening the nuts 248, 250. The stuffing box 70 can then be moved into position about a drive shaft 42 and secured in place relative to the other components of the pump casing 22 as is known in the art. Disengagement of the lifting device 222 from the holding member 208 is effected by reversing the recited steps.

Referring to the drawings, further features of the pump outer casing 22 will now be described. In one form of this, FIGS. 35 to 39 and 40A and 40B illustrate a pump housing 20 generally comprising an outer casing 22 that is formed from two side casing parts or halves 24, 26 (sometimes also known as the frame plate and the cover plate) which are joined together about the periphery of the two side casings parts 24, 26.

As previously mentioned in relation to FIGS. 1 and 2, the two side casing parts 24, 26 of the outer casing 22 are joined together by bolts 46 located about the periphery of the casing parts 24, 26 when the pump is assembled for use. In addition, and as shown in FIGS. 36 to 40A and 40B, the two side casing halves 24, 26 are spigoted together with a tongue and groove joint arrangement so that, when assembled, the two casing halves 24, 26 are concentrically aligned.

The first side casing 24 is configured with an outer peripheral edge 254 having a radial face 256, and the second side casing 26 is also configured with an outer peripheral edge 258 having a radial face 260. When the first side casing 24 and second side casing 26 are joined, the respective peripheral edges 254, 258 are brought into proximity and the respective faces 256, 258 are brought into registration and abutment.

Figure 35:
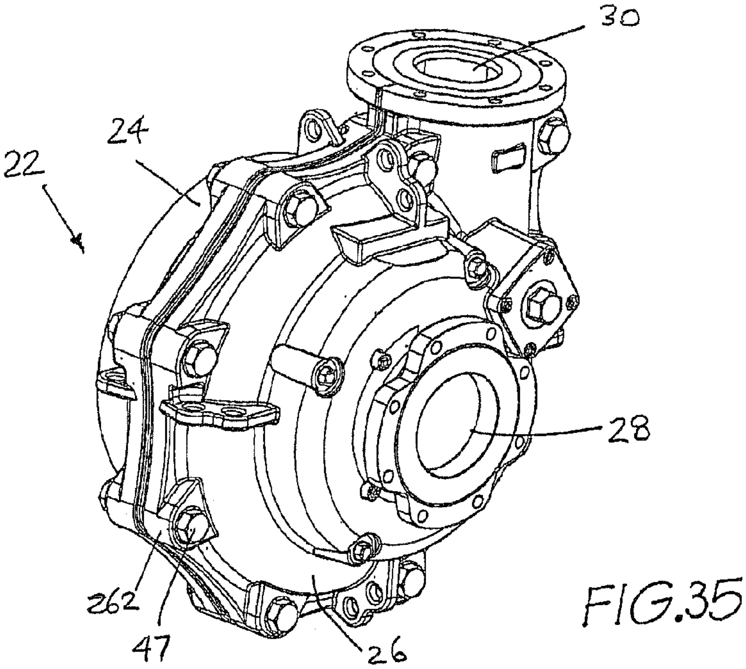
FIG. 35 illustrates a perspective view of the pump housing of the pump assembly shown in FIG. 1 and FIG. 2.

As shown in FIGS. 35 to 38, each of the side casings 24, 26 is formed about the peripheral edge 254, 258 with a plurality of bosses 262 that extend radially outwardly from the peripheral edge 254, 258 of the respective side casing 24, 26. Each of the bosses 262 is formed with an aperture 264 through which a bolt 46 is positioned in use, to securely hold the two side casings 24, 26 together in assembly of the pump casing 22, as depicted in FIG. 35. An enlarged view of cooperating joined bosses is shown in FIG. 39, with the bolt 46 removed from the aperture 264.

Figure 38:
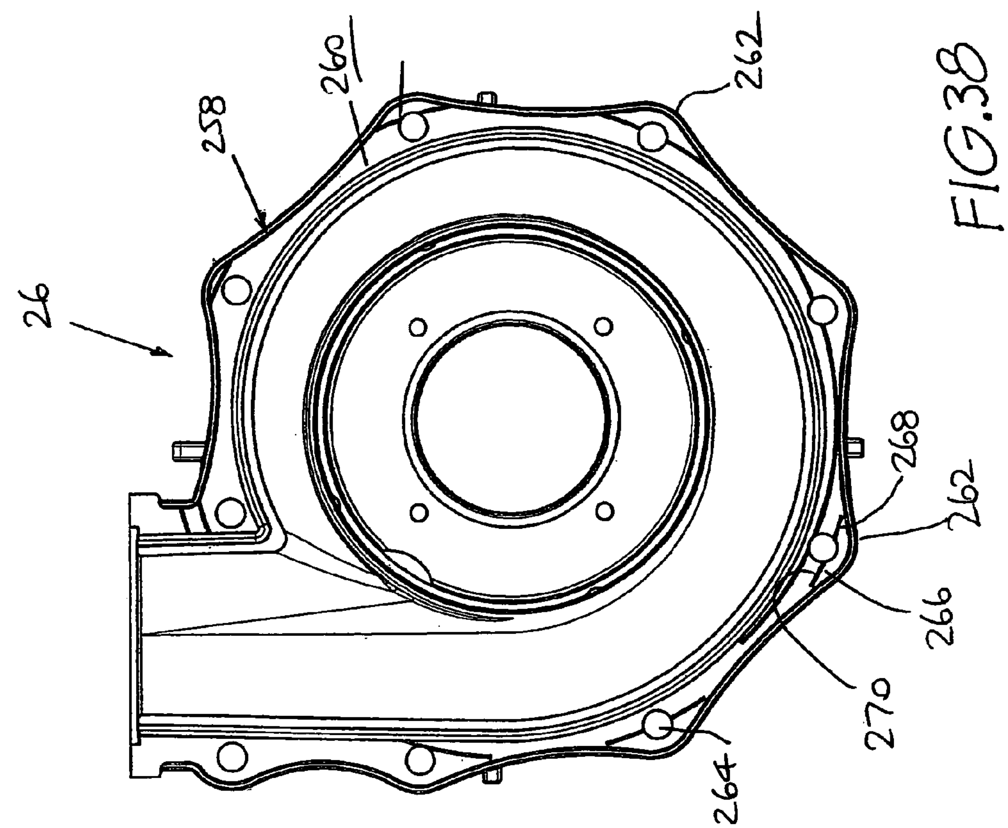
FIG. 38 illustrates a view in elevation of the second half of a housing of the pump.
Figure 37:
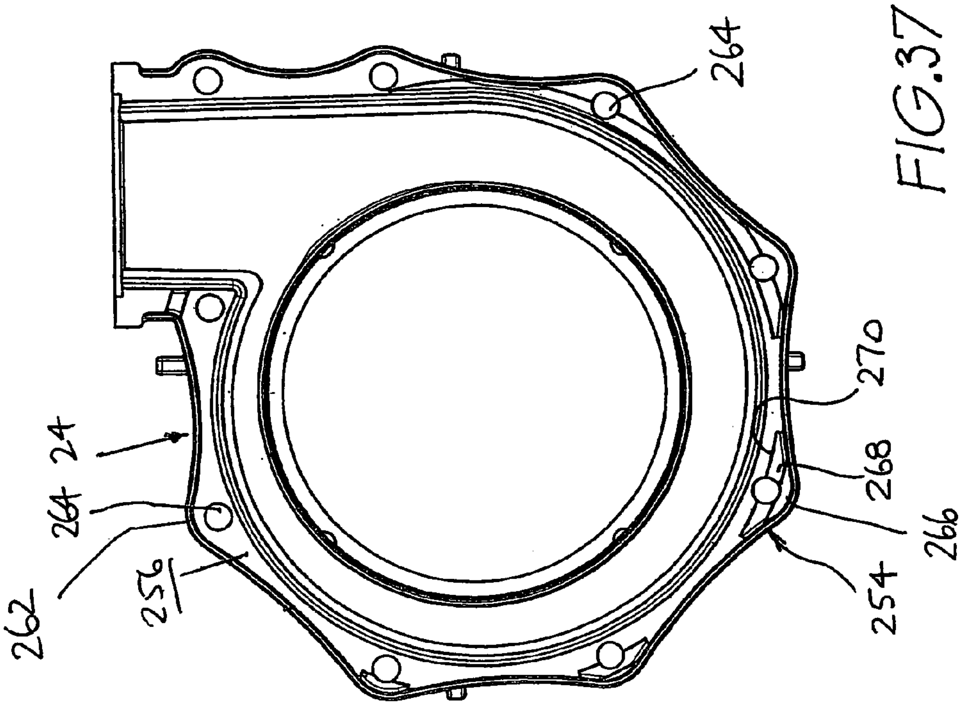
FIG. 37 illustrates a view in elevation of the first half of a housing of the pump.
Figure 39:
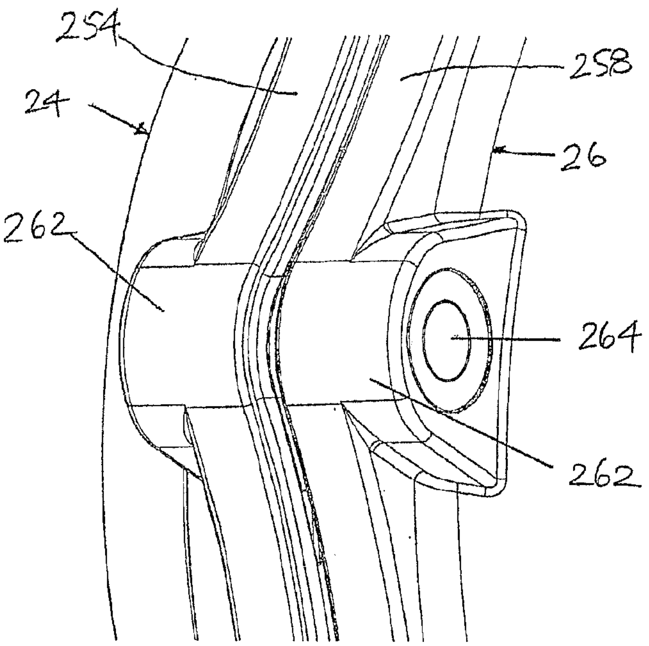
FIG. 39 illustrates an enlarged view of a boss depicting the assemblage of the pump housing when the two housing halves are joined.

The side casings 24, 26 are further structured with locating apparatus 266, as best seen in FIGS. 37 and 38. The locating apparatus 266 are generally located in proximity to the peripheral edge 254, 258 of each side casing 24, 26. The locating apparatus 266 may, in a particularly suitable embodiment, be positioned at the bosses 262 to facilitate alignment of the two side casings 24, 26 and to ensure that the side casings 24, 26 do not move radially relative to each other whilst being connected together during assembly or disassembly of the pump casing 22.

The locating apparatus 266 may comprise any form, design, configuration or element that limits radial movement of the two side casings 24, 26 relative to each other. By way of example, and in a particularly suitable embodiment as shown, the locating apparatus 266 comprise a plurality of alignment members 268 that are positioned at several of the bosses 262, in proximity to the aperture 264 of that boss 262. Each boss 262 may be provided with an alignment member 268, or, as illustrated, less than all of the bosses may have an alignment member 268 associated therewith.

Each alignment member 268 is configured with a contact edge 270 that is oriented in general parallel alignment with the circumference 272 of the peripheral edge 254, 258 such that when the contact edge 270 of cooperating alignment members 268 are registered together at assembly of the pump casing, the two side casings 24, 26 cannot move in a radial plane relative to each other (that is, in a plane perpendicular to the central axis 35-35 of the pump casing 10, shown in FIG. 35). It should be noted that the contact edges 270 may be linear as shown, or may have a curvature of selected radius.

Figure 40A:
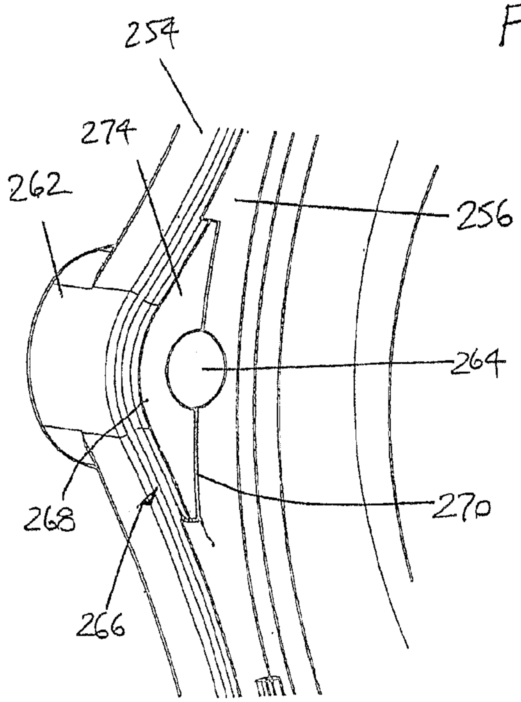
FIG. 40A and FIG. 40B are enlarged views of the boss shown in FIG. 39 where the halves of the pump housing are separated to show the alignment elements of the locating apparatus.
Figure 40B:
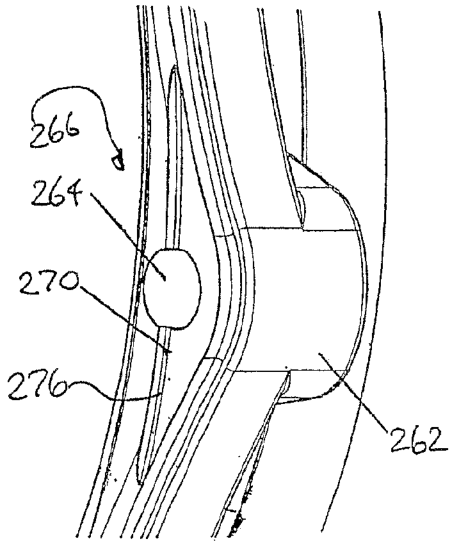

As best seen in FIGS. 40A and 40B, in one exemplary embodiment, the alignment members 268 may be configured as a projecting land 274 that extends axially outwardly from the radial face 256 of the peripheral edge 254. The projecting land 274 is structured with a contact edge 270 that is oriented toward the central axis of the pump casing 22. The projecting land 274 is depicted as being formed on the frame plate casing 24 in FIG. 40A. A projecting ridge 276 that extends axially outwardly from the radial face 254 of the cover plate casing 26 is shown in FIG. 40B and is structured with a contact edge 270 that is oriented away from the central axis of the pump. This contact edge 270 registers against the contact edge 270 of the projecting land 274 on the frame plate casing 24 when the two side casings 24, 26 are brought together at assembly. Notably, the projecting lands 274 and projecting ridges 276 may be located on either of the two side casings and are not limited to being located on the first side casing 24 and second side casing 26 as depicted.

Figure 36:
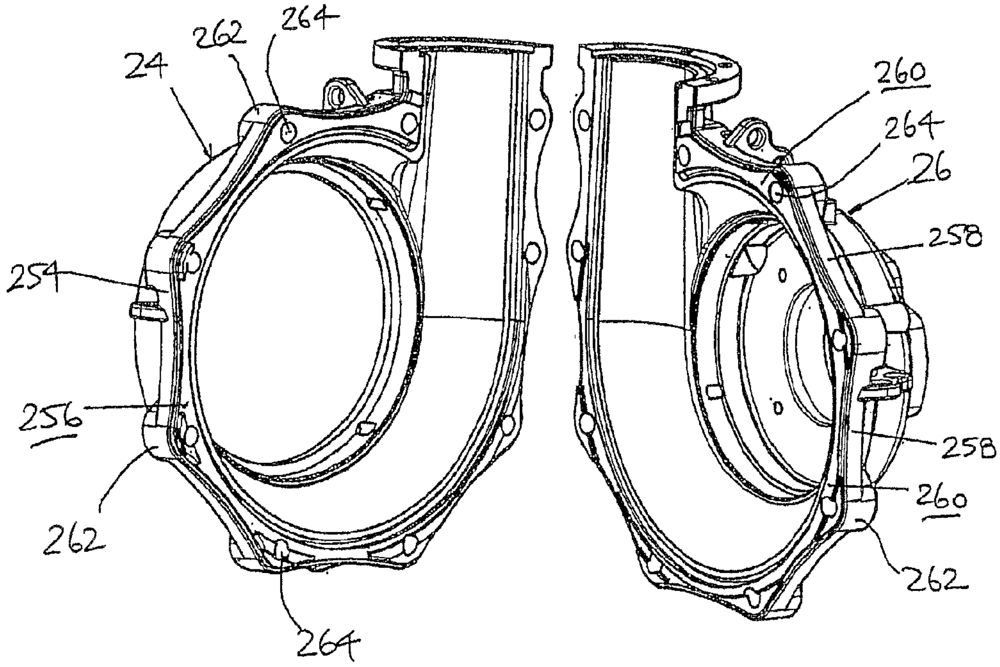
FIG. 36 illustrates a perspective, exploded view of the pump housing shown in FIG. 35 with two halves of the housing separated from each other to show the interior of the pump housing.

It can further be seen from FIGS. 36 and 37 that the shape, size, dimension and orientation of each of the projecting lands 274 located on the first side casing 24 may vary. That is, some of the projecting lands 274 may generally be formed as triangulate forms while other of the projecting lands 274 may be formed as elongated rectangles of projecting material. The variation in the shape, size, dimension and orientation of each of the projecting lands 274 is dictated by the machining process that forms the projecting lands 274. Because of the volute shape of the pump side casings, the machine cutting operation (having its centre of radius at the central axis of the pump housing) cuts a circular groove which forms projections at some of the bosses, the projections being of a different shape from one another because of the manner of manufacture. The variations between the shapes of the projecting lands 274 can facilitates proper alignment of the two side casings 24, 26 at assembly and assures delimited movement relative to each other.

The provision of the co-operating projections and recesses allows for ready alignment of the two side casings 24, 26 and of the mounting apertures 264 which receive the bolts 46. This simplifies the assembly of the pump casing 22. Furthermore the proper alignment of the two casing parts 24, 26 can also ensures that the pump inlet is aligned to the pump shaft access. Alignment of the pump inlet with the shaft access ensures that the gap between the pump impeller 40 and front liner 38 is maintained substantially concentric and parallel thereby resulting in good performance and wear.

Other embodiments of interfitting or cooperating projections and recesses on the inner faces of the side casings which can function to facilitate the proper alignment of the two side casings 24, 26 are envisaged.

The invention is particularly useful when the pump housing includes elastomeric liners because the elastomeric material does not have sufficient strength to align the two side parts (unlike the situation when a single piece metal volute liner is used). The cooperating projections and recesses can also enhance the strength of the outer casing 22 by transferring forces, shock or vibration which may occur in use of the pump directly back to the mounting pedestal or base 10 to which the pump casing 22 is mounted.

Referring to the drawings, further features of the pump liner adjustment will now be described. In one form of this, FIGS. 41 to 52 illustrate various adjustment assemblies for adjusting pump front liners in relation to pump casings.

Figure 41:
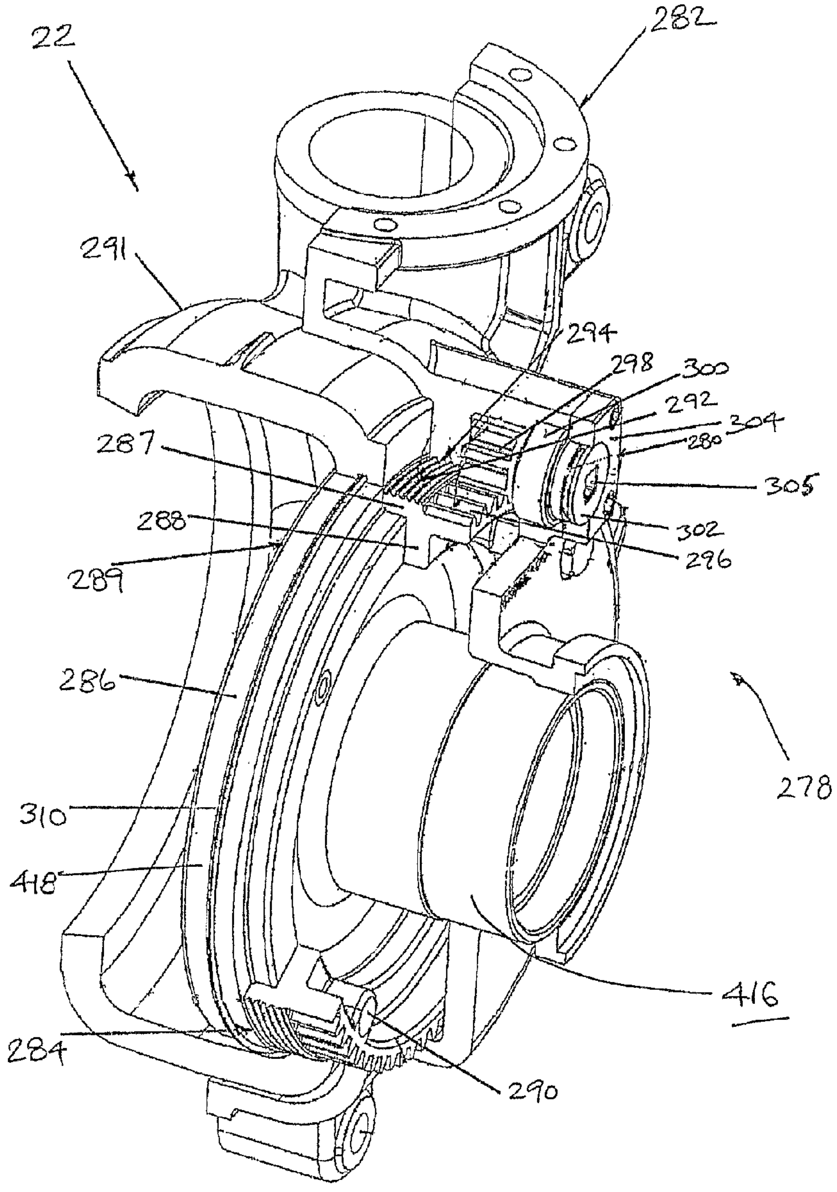
FIG. 41 is an exemplary, perspective, partial cross-sectional view illustrating a pump housing having a side part adjustment assembly according to one embodiment, where the side part is arranged in a first position.
Figure 42:
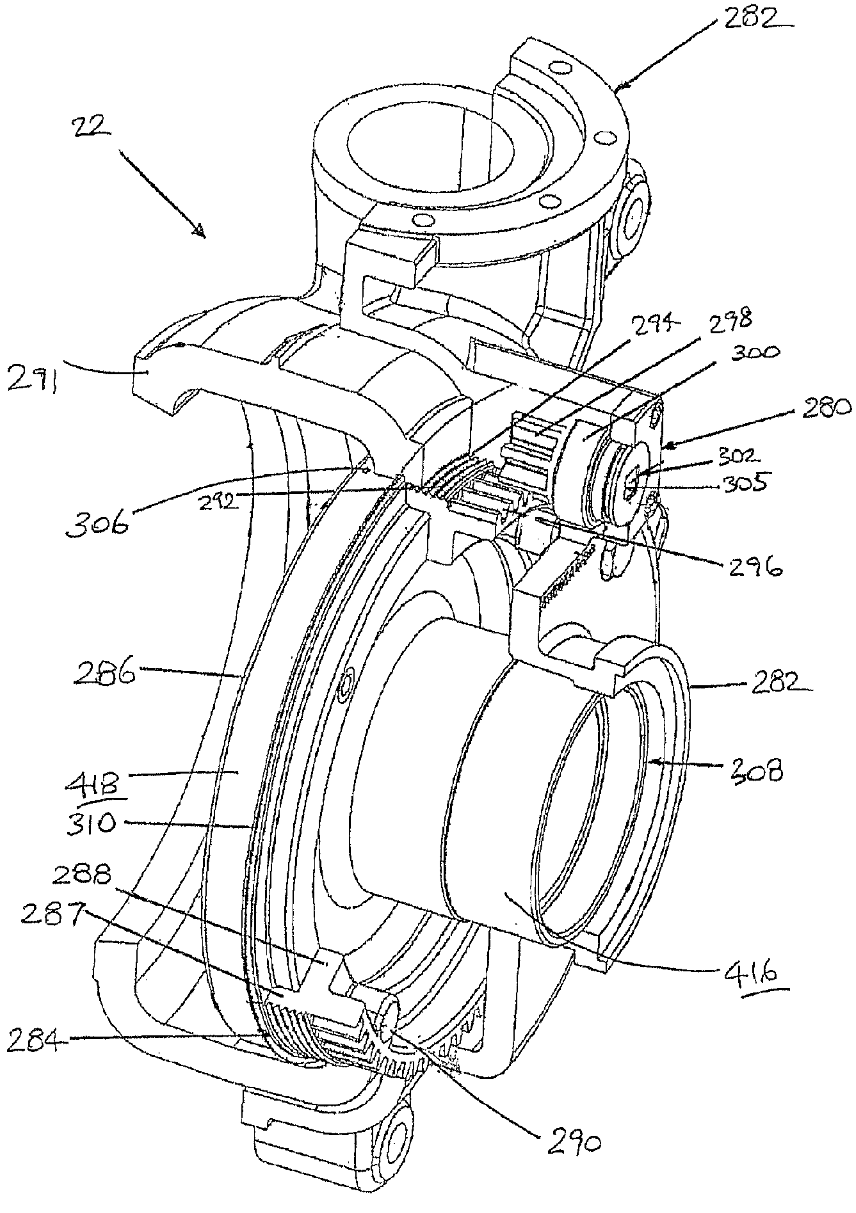
FIG. 42 illustrates a view of the pump housing and side part adjustment assembly similar to that shown in FIG. 41 with the side part arranged in a second position.

In the embodiment shown in FIGS. 41 and 42, an adjustment assembly 278 is shown comprising a housing 280 which forms part of the outer pump casing half 282. The adjustment assembly 278 further includes a drive device having a main body in the form of a ring-shaped member 284 having a rim 287 and a mounting flange 288. A series of bosses 290 are provided for receiving mounting studs which secure the ring-shaped member 284 to the front face of the side wall section 286 of the side liner 289. A main volute liner 291 is also shown positioned within the outer pump casing halves, and which along with the side liners 289 forms a chamber in which an impeller turns.

The adjustment assembly 278 further includes complementary threaded sections 292 and 294 on the ring-shaped member 284 and on the housing 280. The arrangement is such that rotation of the ring-shaped member 284 will cause axial displacement thereof as a result of relative rotation between the two threaded sections 292 and 294. The side liner 289 (which is attached to the mounting flange 288 on the ring-shaped member 284) is therefore caused to be displaced axially as well as rotatably relative to the main casing part 282.

The adjustment assembly 278 further includes a transmission mechanism comprising a gear wheel 296 on the ring-shaped member 284 of the drive device and a pinion 298 rotatably mounted on a pinion shaft. A bearing 300 within the housing 280 supports the pinion shaft. An actuator in the form of a manually operable knob 302 is mounted for rotation in the end cover 304 of the housing 280, and is arranged so that rotation thereof causes rotation of the pinion shaft and thereby rotation of the drive device via gear wheel 296. The knob 302 includes an aperture 304 for receiving a tool such as an alien key type tool or the like for assisting in the rotation of the pinion 298. FIG. 41 shows the side liner 289 in a first position relative to the main casing part 282. Rotation of the actuator knob 302 causes rotation of the pinion 298 which in turn causes rotation of the gear wheel 296. The ring-shaped member 284 is thereby caused to rotate and as a result, the threaded portions 292 and 294 experience relative rotation. The ring-shaped member 284 is therefore axially displaced together with the side liner 289 of the casing.

Figure 43:
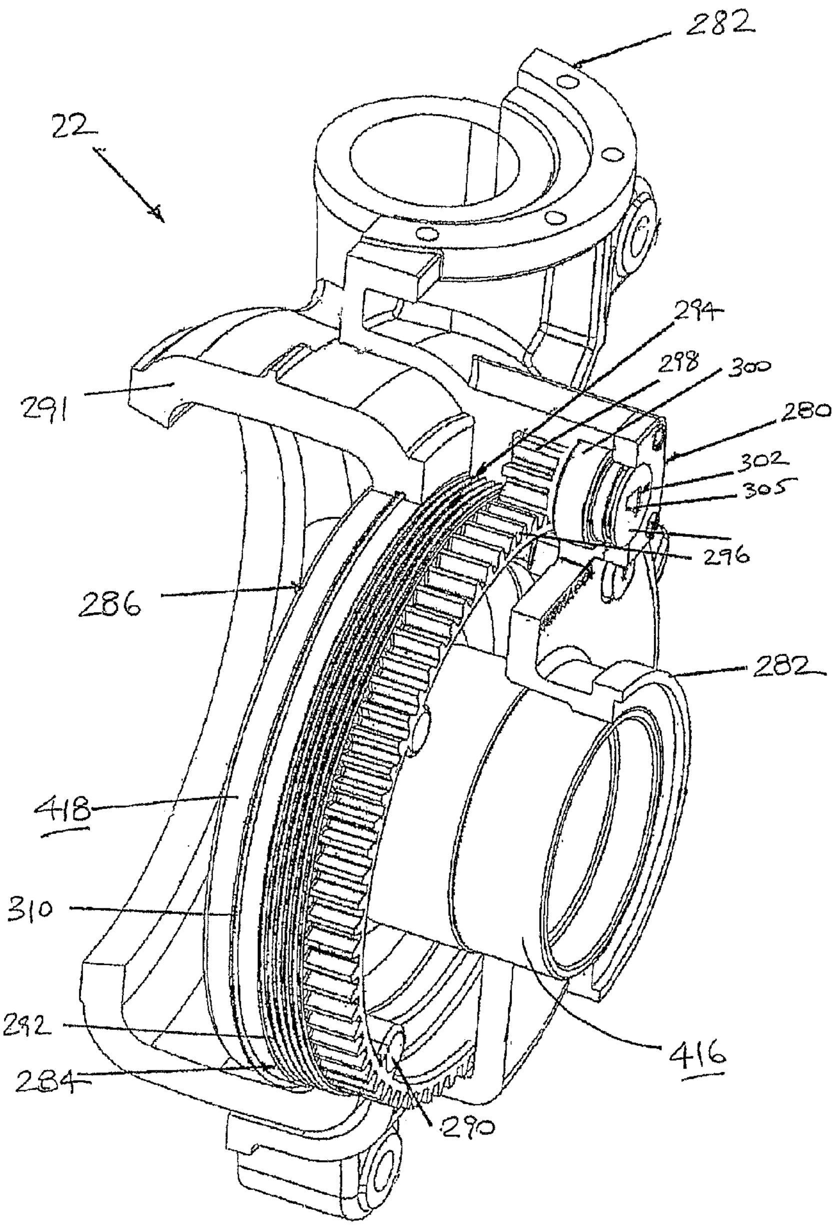
FIG. 43 is an exemplary, perspective, partial cross-sectional view illustrating a pump housing having a side part adjustment assembly according to another embodiment.

FIG. 42 illustrates the same side liner 289 in an axially displaced position compared to the position shown in FIG. 41. As shown in FIG. 42, axial displacement of the side liner 289 produces a step 306 between the outer peripheral wall of the side liner 289 and main volute liner 291. A gap 308 also occurs between the inlet section of the side liner 289 and the front of the housing 282. A suitable elastomer seal 310 which can be anchored between the parts can be provided to stretch and seal therebetween to allow the axial and rotational movement without leakage from the pump chamber interior. This circumferential, continuous seal is located in a groove on the interior surface of the laterally extending side flanges of the main volute liner 291. FIG. 43 is similar to the arrangement shown in FIGS. 41 and 42 except that there is no flange 288 and the bosses 290 are secured or integral with the underside of the rim 286.

Figure 44:
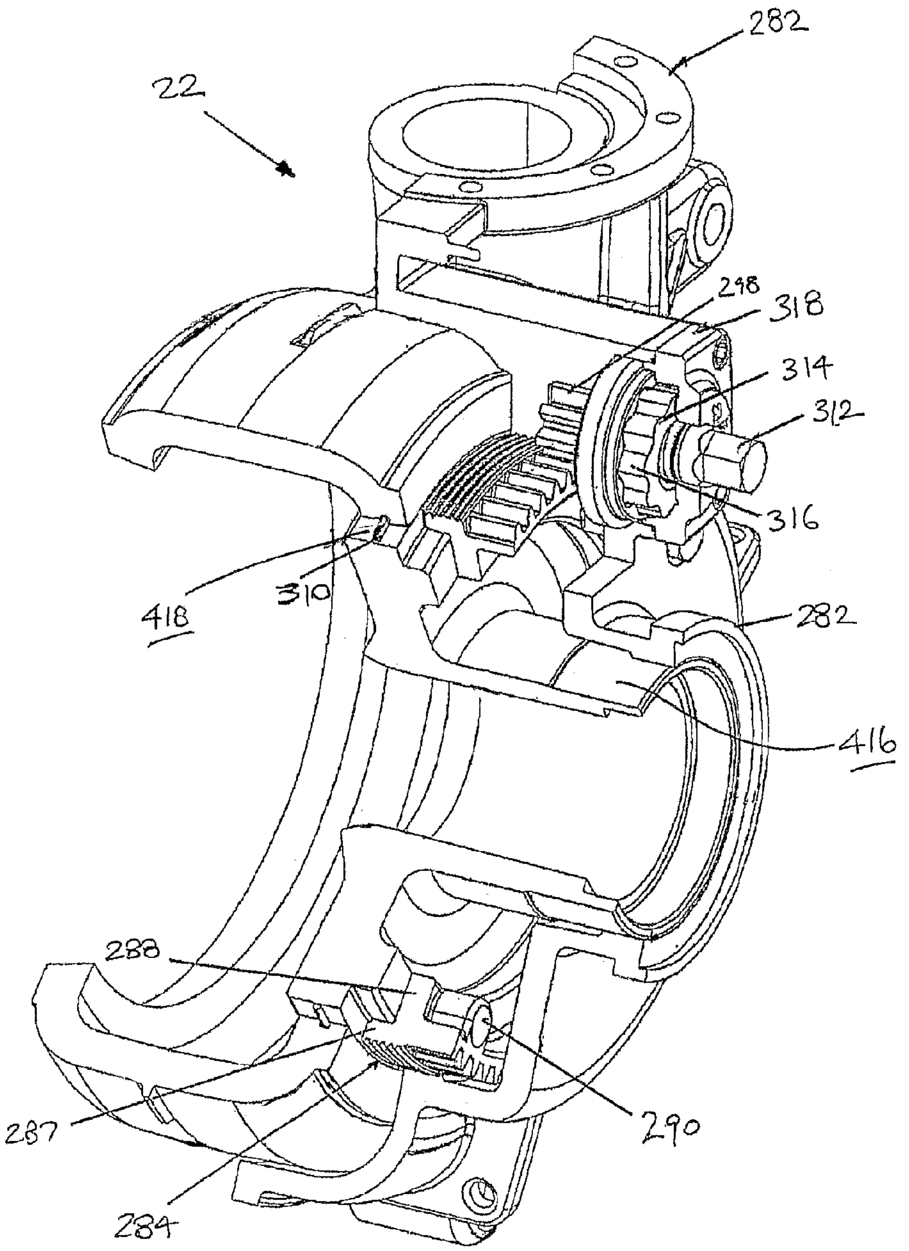
FIG. 44 is an exemplary, perspective, partial cross-sectional view illustrating a pump housing having a side part adjustment assembly according to another embodiment.

Further example embodiments will hereinafter be described and in each case the same reference numerals have been used to identify the same parts as described with reference to FIGS. 41 to 43. FIG. 44 is a modification of that shown in FIGS. 41 to 43. In this embodiment there is an arrangement which provides for an increased reduction ratio through the transmission mechanism. In this example embodiment, the pinion gear shaft is extended outwards from the casing 282 and has an eccentric land 312 formed near its outer end which is offset to its main axis of rotation of the shaft. On the eccentric land 312 is positioned a gear type wheel 314 which has an outer diameter formed with a series of lobes 316 of a suitable wavy profile which cooperates with lobes on the end cover 318. As the pinion gear shaft is turned, the outer diameter of the lobes 316 effectively moves inwards and outwards depending on the position of the eccentric land 312 in relation to the end cover 318. Only the lobes on the gear type wheel that are furthest from the shaft centre line engage with the lobes in the end cover 318. As the shaft is rotated, it causes the gear type wheel to roll and slide in the stationary end cover 318. Depending on the design, one shaft rotation could move the gear type wheel only one lobe, thereby providing a high reduction in ratio. The gear wheel is attached to the gear pinion. Turning the shaft will both reduce the speed of gear pinion but also amplify the torque thereby allowing greater control of the adjustment process.

Figure 45:
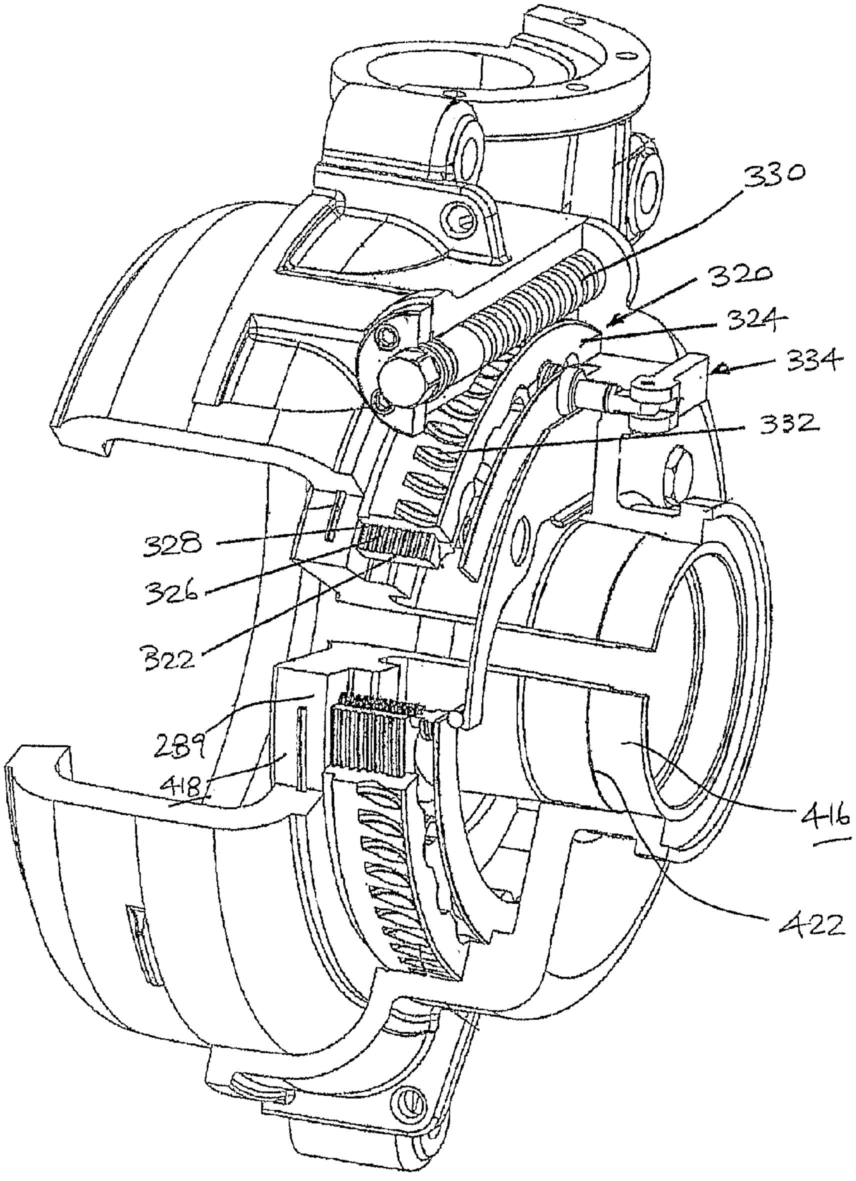
FIG. 45 is an exemplary, perspective, partial cross-sectional view illustrating a pump housing having a side part adjustment assembly according to another embodiment, where the side part is arranged in a first position.
Figure 46:
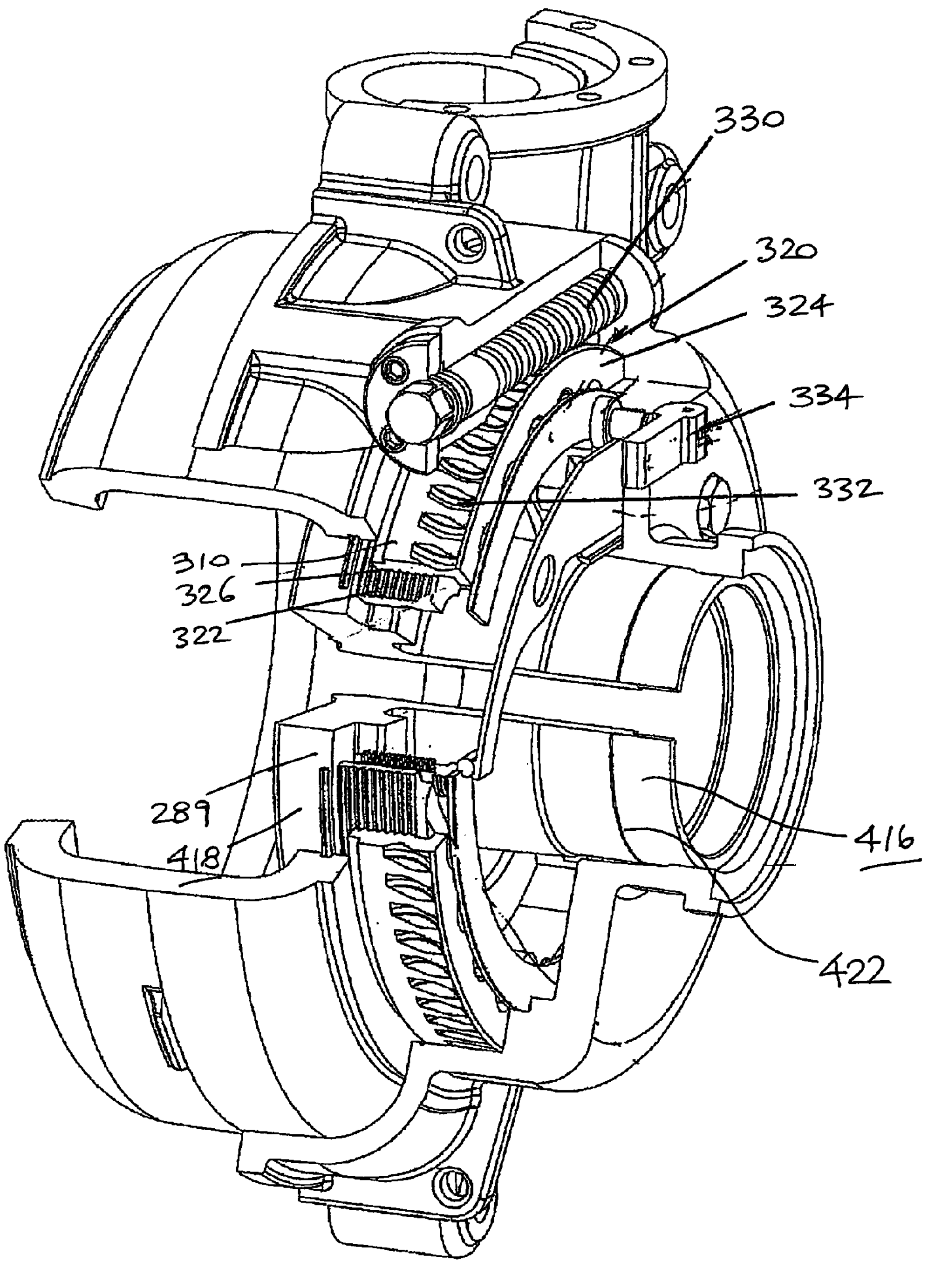
FIG. 46 illustrates a view of the pump housing and side part adjustment assembly similar to that shown in FIG. 45 with the side part arranged in a second position.

FIGS. 45 and 46 illustrate a further example embodiment. In this embodiment the drive device 320 comprises two components 322 and 324 threadably engaged together through threaded sections 326 and 328. The drive device component 322 is secured to the side liner part 289. The transmission mechanism includes a worm gear 330 mounted to the housing 280 and a worm wheel 332 on the outer side of the drive device component 324. The worm transmission can provide a high ratio reduction. As the worm gear is turned, it turns the outer component 324 which in turn causes the inner component 322 to turn via the thread inter-disposed between the inner and outer components. As the outer component 324 is rotated, it causes an axial movement of the inner component 322 thus moving the side liner part 289 either inwards or outwards, thereby changing the gap between the impeller and side line part 289.

This mechanism can also include an arrangement to lock the inner and outer parts of the drive device together, so that they cannot move relative to one another. As shown a lever 334 with a pin 336 configured such that when turned 180 degrees, it permits the force from a spring plate (not shown) to push against a pin plate, urging pins into engagement such that the inner component is locked in relation to the outer component. Turning the worm gear with inner and outer components locked together causes both inner and outer components to turn, thus causing rotational displacement only.

Figure 47:
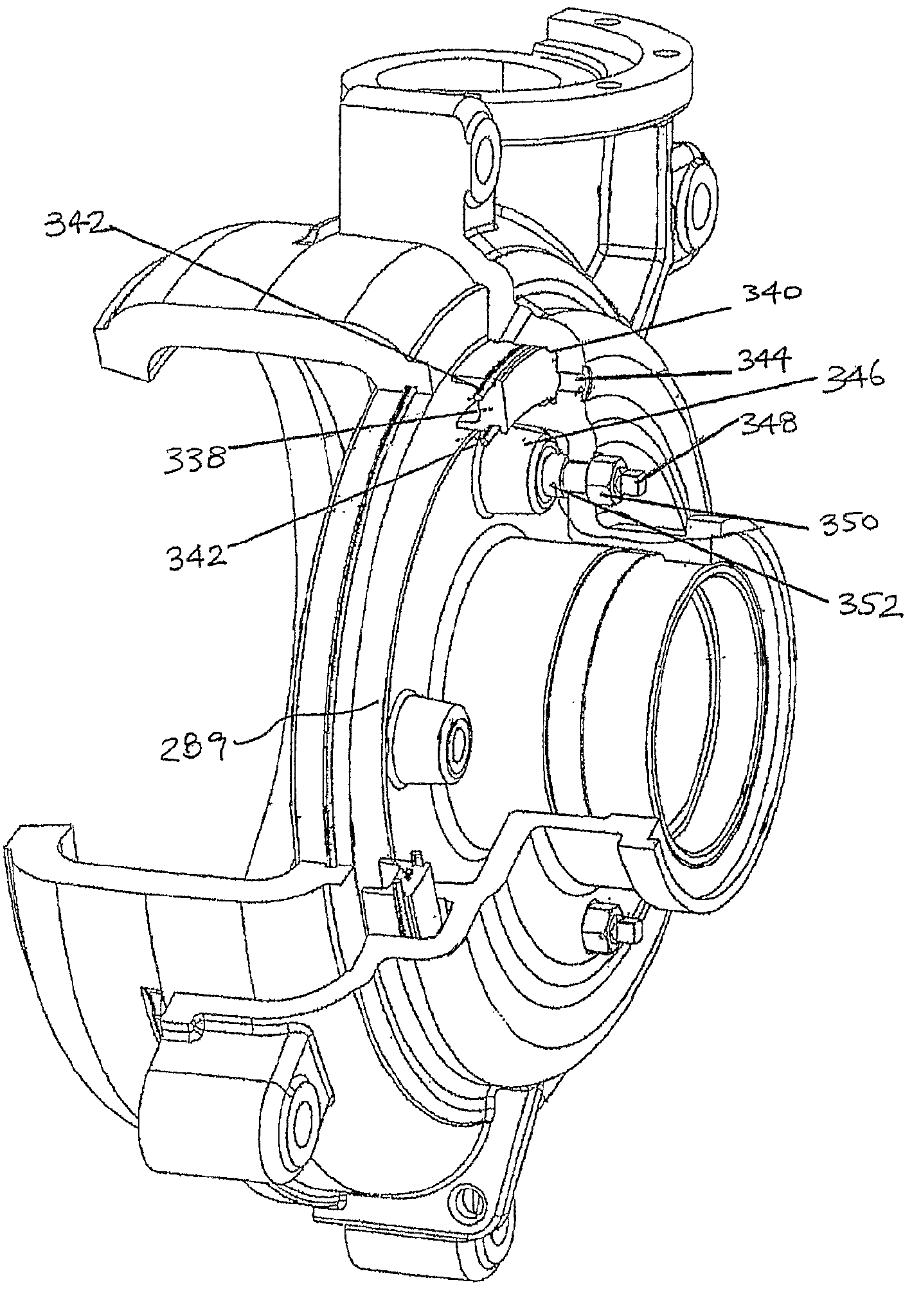
FIG. 47 illustrates a partially cutaway isometric view of an embodiment of an adjustment assembly.

A further example embodiment is illustrated in FIG. 47. In this embodiment the drive device comprises an annular shaped piston 338 disposed within a cavity 340 in the housing. The piston 338 is generally rectangular in cross-section and has O-ring seals 342 on opposite sides thereof. The cavity 340 may be filled with water or other suitable hydraulic fluid or pressure transmitting medium. A pressurising device can be attached to a port 344 to create pressure in cavity 340, thus providing force on the piston 338. The force from the piston 338 is transferred directly to the casing side part 289.

To make the adjustment more controlled a plurality of raised bosses 346 and studs 348 are attached to the casing side part with nuts 350 and a collar 352. To effect adjustment in this case, the nuts 350 are loosened the same set amount, fluid pressure is applied via port 344, thereby pushing the casing side liner part 289 into the pump by the same set amount until the nuts 350 abut against the outer surface of the housing. The travel studs 348 would then be screwed outwards so that the collar 352 abuts against the inner surface of the housing and the nuts 348 are retightened. The fluid pressure would then be released. The above described arrangement provides for axial adjustment of the side liner part 289 only.

Figure 48:
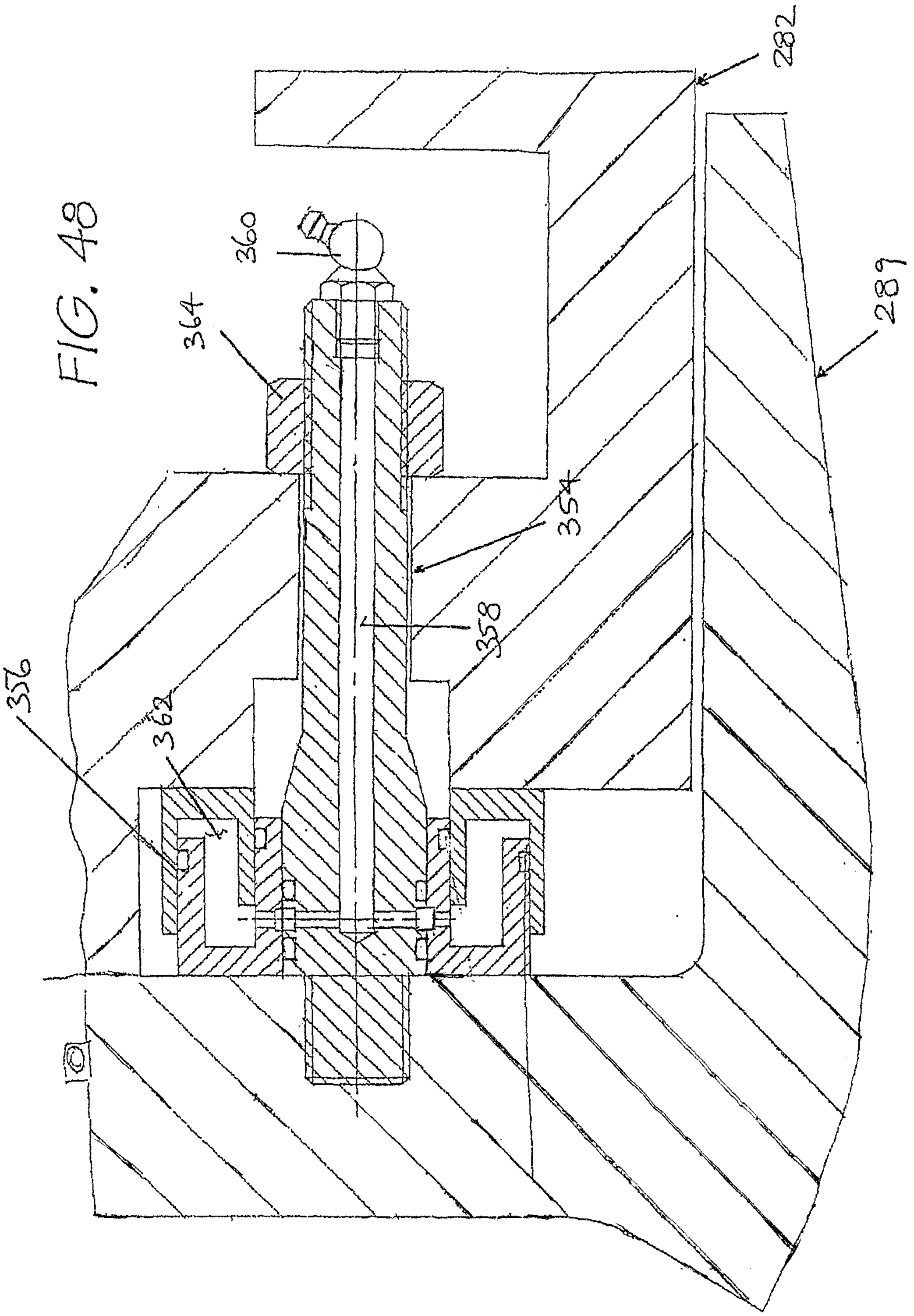
FIG. 48 illustrates a sectional view of another embodiment of an adjustment assembly.

A further example embodiment is illustrated in FIG. 48 which provides for axial adjustment only. In this embodiment a stud 354 is adapted to be screwed into and fixed at 356 to the casing side part and has a central hole 358 and suitable non-return valve 360 at its outer end. In the space between the casing side part and housing, there is a cavity in which is positioned a hydraulic piston device 356 with inner and outer parts sliding within each other and sealed by suitable means such as O-rings between the outer and inner parts and between the stud 354 and its central hole. Pressurised fluid is applied by suitable means to the valve 360, which passes down the central hole 358 and pressurises the cavity 362. The pressure in the cavity 362 applies an axial load to force the casing side part 289 inwards to the impeller.

There would normally be a plurality of studs 354 and associated pressure chambers 362 spaced generally evenly around the casing side part. All chambers could be pressurised evenly at the one time by interconnecting the studs 354 by pressure tubing connected in place of the individual valves 360. The chambers and pressure would be designed such as to overcome the internal pressure loads inside the pump when running. The amount of travel would be set by pressurising all chamber 362 equally, loosening the nuts 364 evenly by a set amount, then applying further pressure to move the casing side part 289 inwards by the set amount. Other arrangements would also be possible to mechanically fix the casing side part in position and not rely on the fluid and pressure in the chambers during extended periods of running without adjustment.

Figure 49:
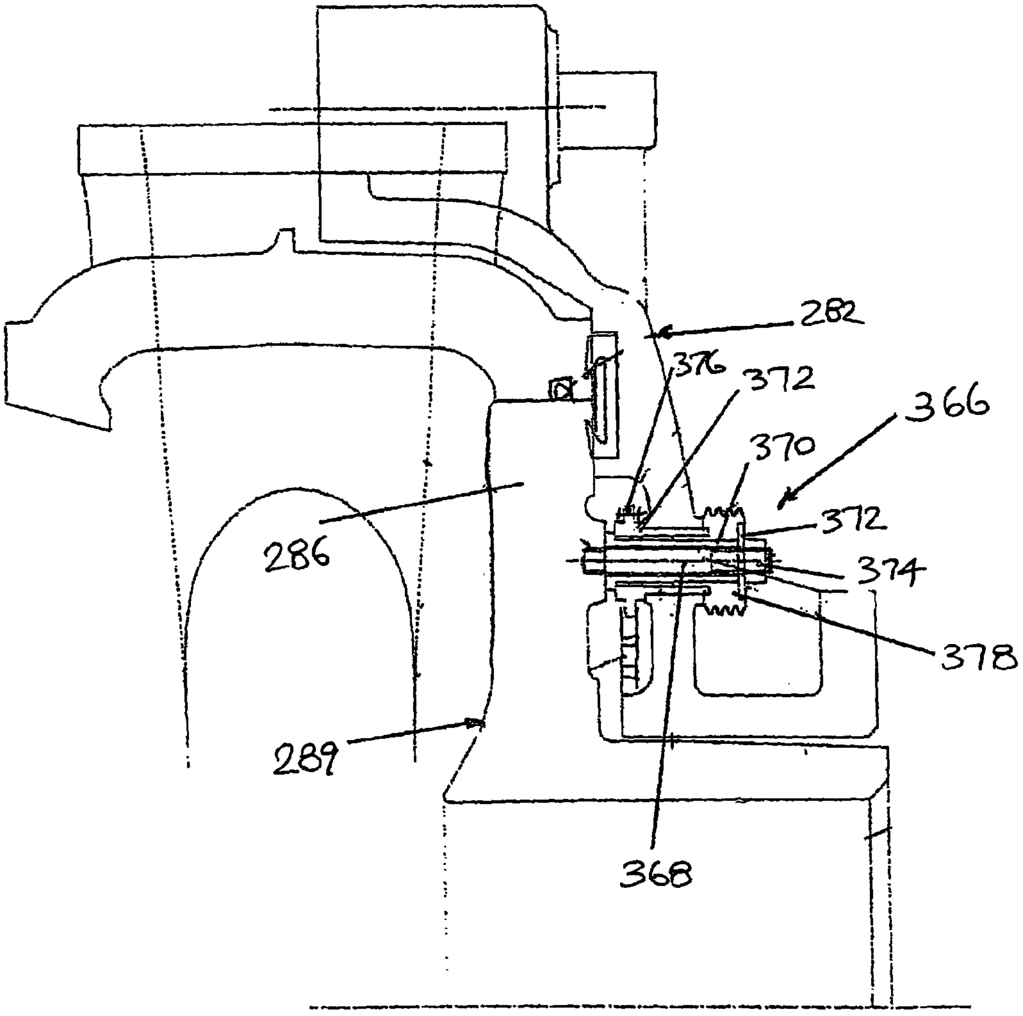
FIG. 49 illustrates a partial sectional view of another embodiment of an adjustment assembly.

A further example embodiment is illustrated in FIG. 49 which provides axial adjustment only. In this embodiment the outer housing 282 is adjustably mounted to the side wall section of casing side part 289 by a plurality adjustment assemblies 366. Each assembly 366 includes a stud 368 threadably or otherwise fixed to the side wall section 286 of side part 289. Each stud 366 has a sleeve 370 fixed in axial position thereon by means of washer 372 and hexagonal nut 374. A portion of the sleeve 370 has a thread thereon.

The assembly further includes a second tube or sleeve 372 having a threaded inner base which is disposed over sleeve 370. A chain sprocket 376 is secured to an inner end of sleeve 372, the sprocket 376 being mounted within a chamber in the housing 282. A protective rubber boot 378 is disposed at the outer end of the assembly. Rotation of outer sleeve 372 will cause rotation of inner sleeve 370 which in turn causes axial displacement of the stud 368 and, as such, the casing side part 289. Desirably a plurality of assemblies are provided with the chain sprockets 376 being driven by a common drive chain ensuring constant displacement of each of the studs.

It is conceivable that any of these axial displacement mechanisms could also be applied sequentially with a mechanism for rotational displacement of the side liner 289 relative to the remainder of the pump casing and the outer housing. That is, the method for rotational and axial displacement of the side liner part could be achieved in a step-wise manner, using a procedure and apparatus which combines the two stages or modes of (a) axial displacement followed by (b) rotational displacement to achieve the desired result of closing the gap between the front of the side liner and the impeller. Of course, the reverse step-wise procedure can also be followed of (a) rotational displacement of the side liner, followed by (b) axial displacement, to achieve the same overall desired result. The embodiments of apparatus already disclosed in FIGS. 41 to 46 offer a combined rotational and axial displacement with a 'one turn' action by an operator or a control system on the pump. In other words, for the embodiments disclosed in FIGS. 41 to 46 the rotational and axial displacement occurs simultaneously, and the act of causing a rotational displacement of the front liner by some mechanism will also result in the axial displacement of the front liner, while the pump is operating or when not running. The 'one turn' action can, in some embodiments, be achieved by an operator turning one actuator at one point to obtain the desired result.

Figure 50:
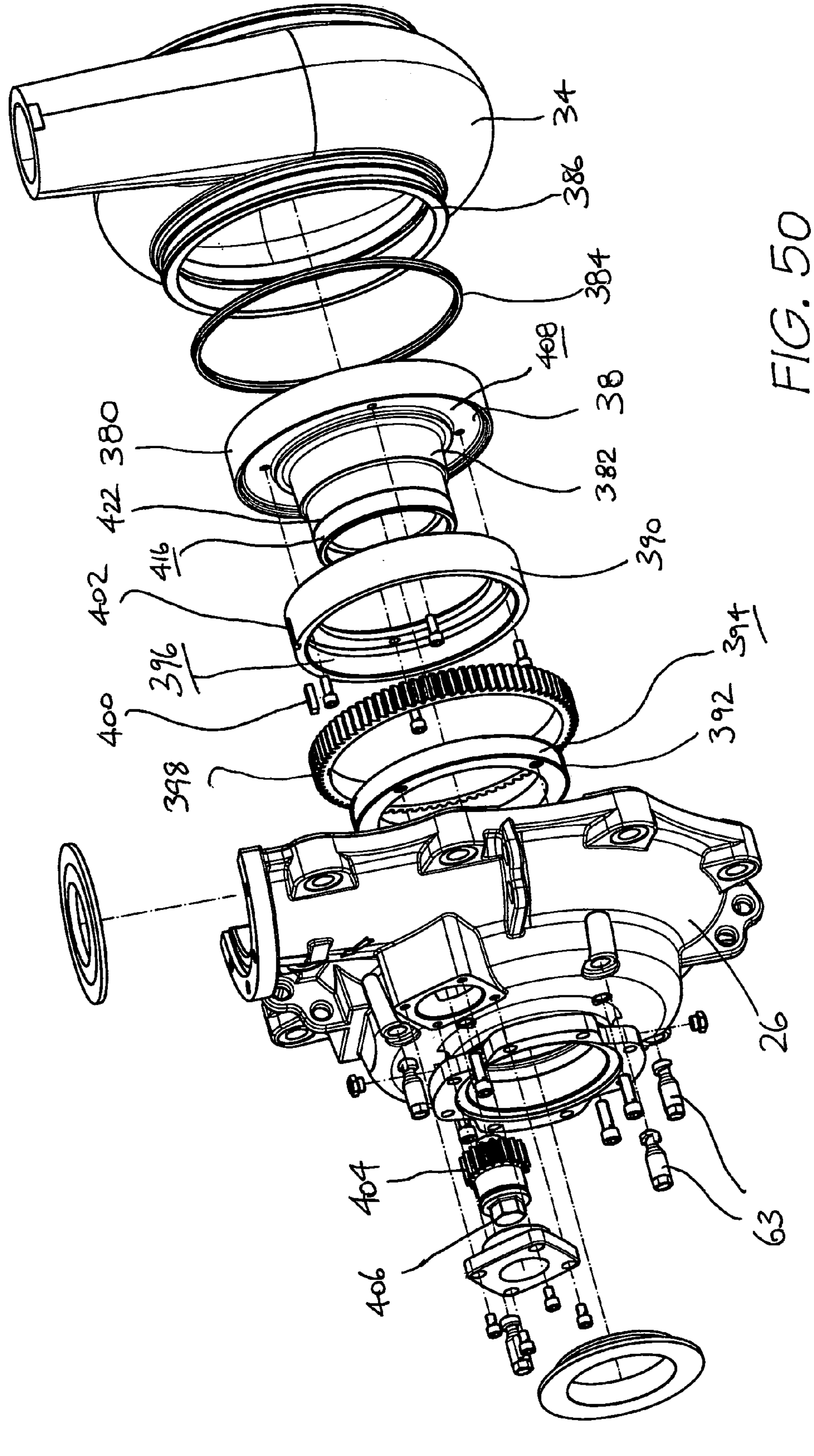
FIG. 50 illustrates a perspective, exploded view of a portion of the pump housing shown in FIG. 4 when viewed from an opposite side of the housing, showing the adjustment assembly for the side part.
Figure 51:
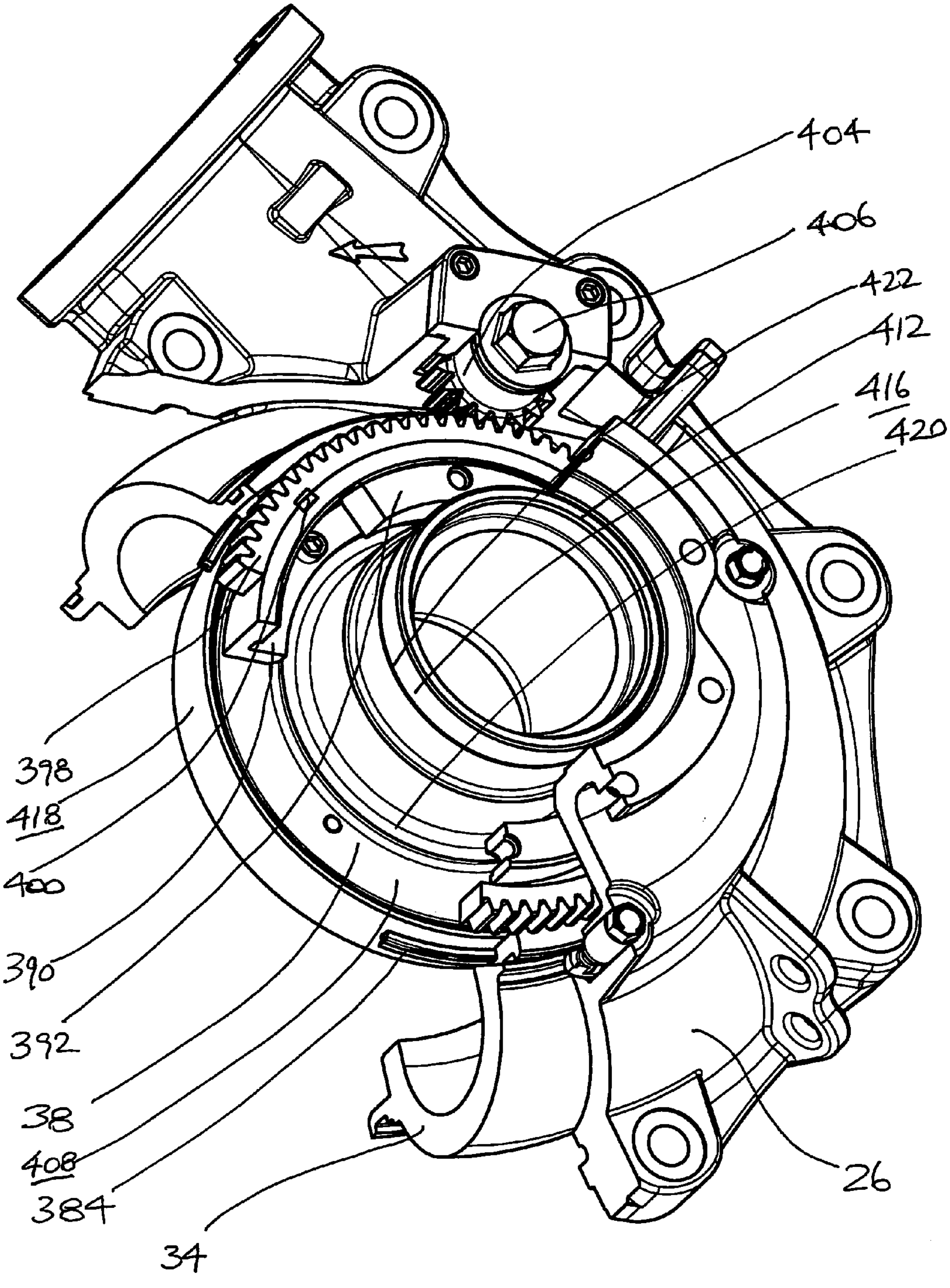
FIG. 51 illustrates a front, perspective, partial cross-sectional view of the pump housing shown in FIGS. 4 and 50.
Figure 52:
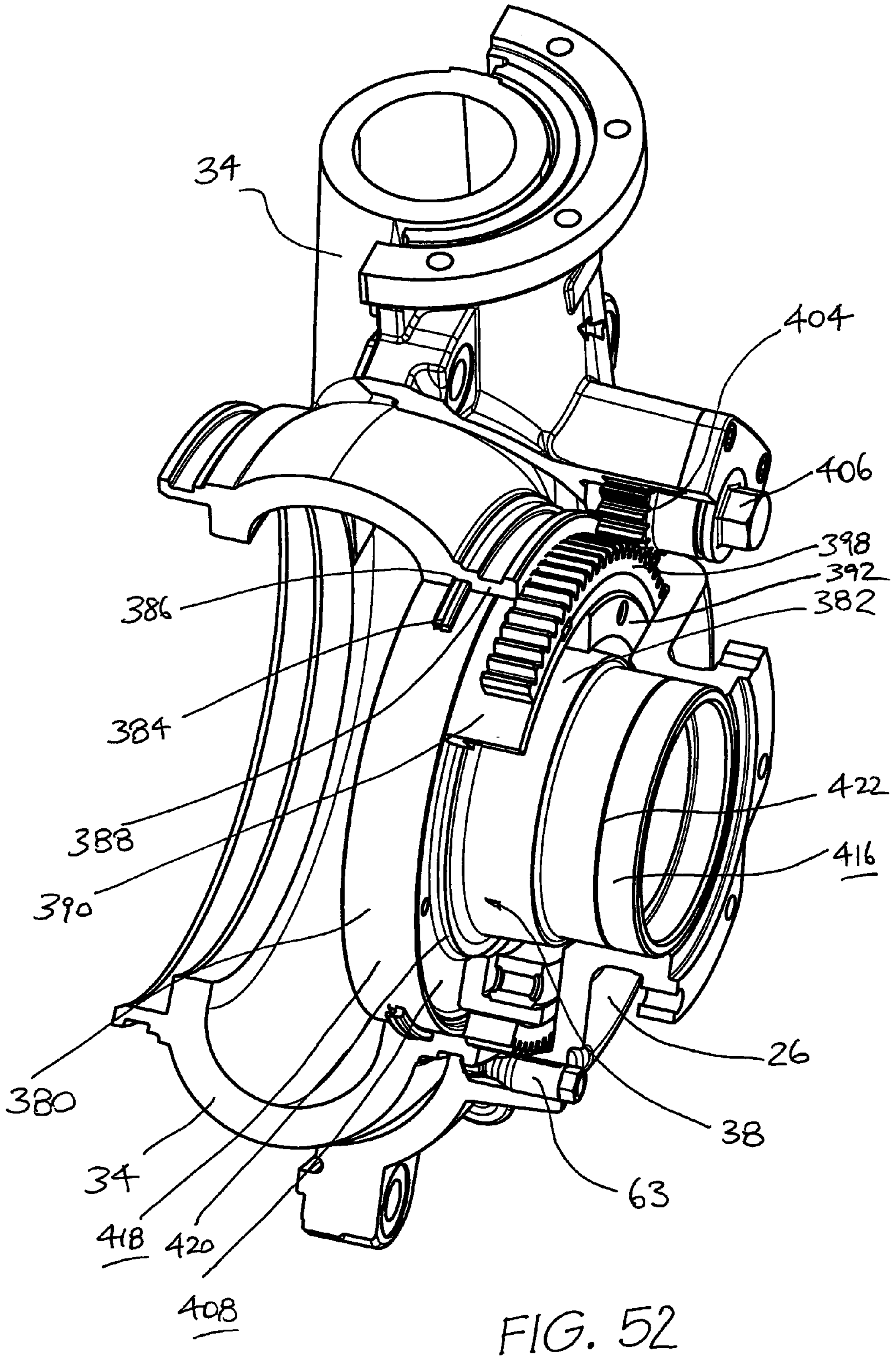
FIG. 52 illustrates a side, perspective, partial cross-sectional view of the pump housing shown in FIGS. 4, 50 and 51.

Referring to FIGS. 50 to 52 there is illustrated a further form of an adjustment assembly of a similar type to that shown in FIGS. 41 to 46. In FIGS. 50 to 52 only one half of the outer housing 12 of the pump 10 is shown. When assembled with another half an outer housing as described with reference to FIGS. 1 to 4 is provided.

The pump casing 20 has a liner arrangement including a main liner (or volute) part 34 and a side liner (front liner) part 38. The side part 38 which in the form shown is a front pump inlet component includes a disc-shaped side wall section 380 and an inlet section or conduit 382. A seal 384 is provided in a groove 386 in a flange 388 of the main volute liner 34.

In this embodiment the adjustment assembly comprises a drive device which includes a ring-shaped coupling member 390 which is securable to the side part 38. The coupling member 390 is adapted to cooperate with support ring 392 which is mounted to the front outer casing housing 26. Support ring 392 has a thread (not shown) on its outer rim surface 394 which cooperates with a thread (not shown) on the inner surface 396 of coupling member 390. The arrangement is such that rotation of the member 390 will cause axial displacement thereof as a result of relative rotation between the two threaded sections. The casing side part 38 is therefore caused to be displaced axially as well as rotatably relative to front casing housing 26.

The adjustment assembly further includes a gear wheel 398 which is keyed to the ring shaped member 390 of the drive device via key 400 and key way 402 and a pinion 404 rotatably mounted on a pinion shaft. An actuator in the form of a manually operable knob 406 mounted for rotation and is arranged so that rotation thereof causes rotation of the pinion 404 and thereby rotation of the drive device via gear wheel 398.

Figure 53:
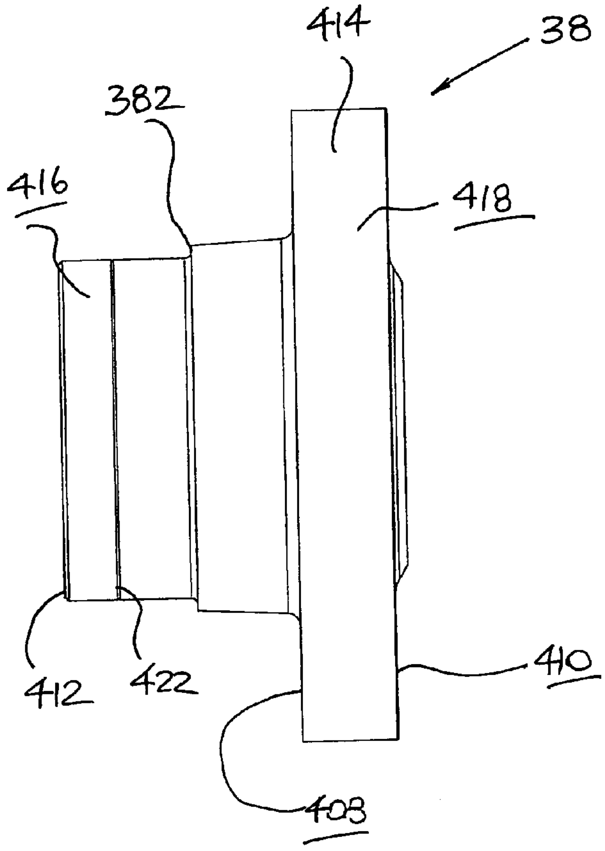
FIG. 53 illustrates a side view in elevation of the side part shown in FIGS. 41 to 46 and in FIGS. 50 to 52.
Figure 54:
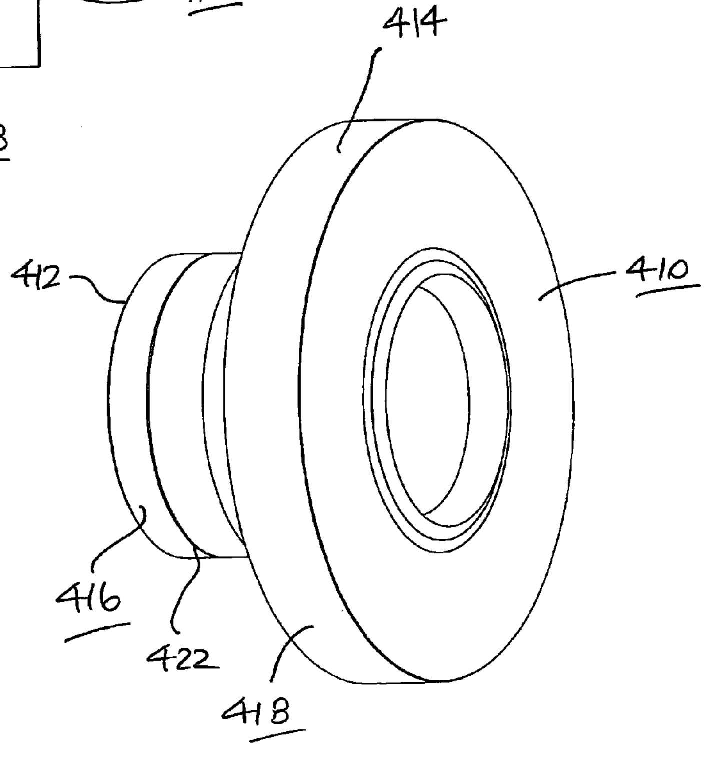
FIG. 54 illustrates a rear, perspective view of the side part shown in FIG. 53.
Figure 55:
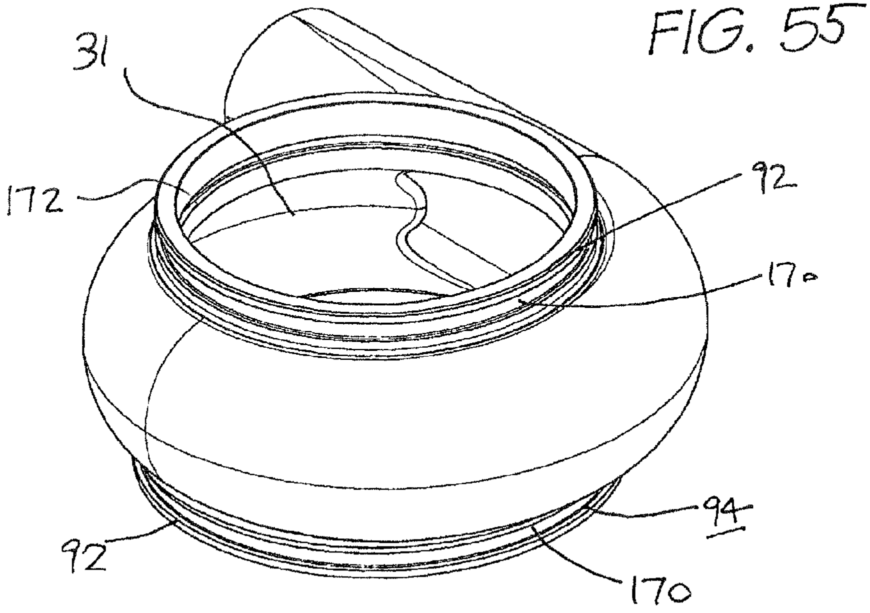
FIG. 55 illustrates a top, perspective view of a pump main liner part shown in FIGS. 3, 16, 17, 50, 51 and 52.
Figure 56:
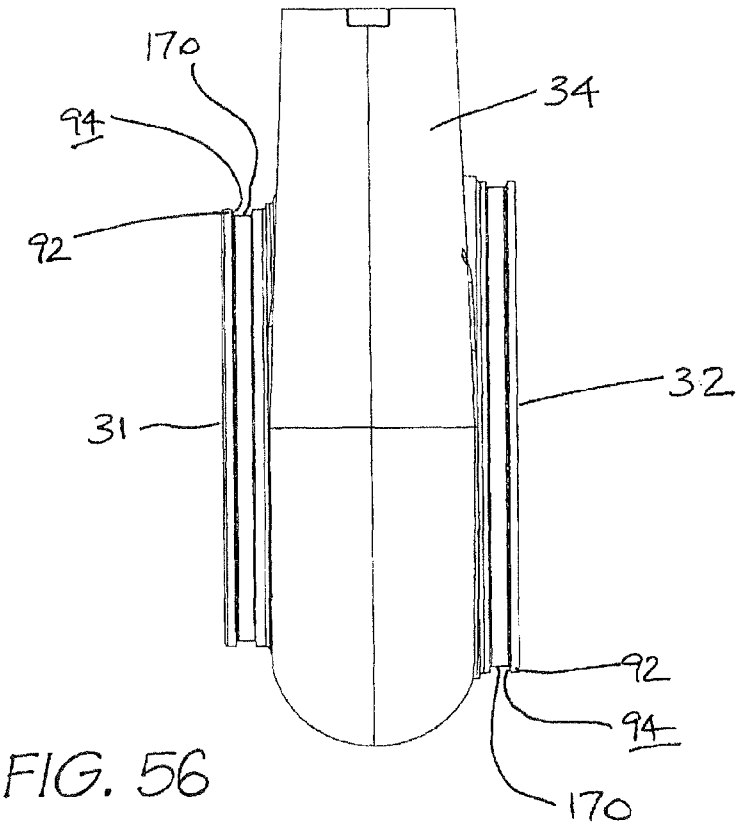
FIG. 56 illustrates a side view in elevation of the pump main liner part shown in FIG. 55.

Referring to FIGS. 53 and 54 there is shown the side liner part 38 (as also shown in FIGS. 50 to 52) which includes a disc-shaped side wall section 380 having a front face 408 and a rear face 410. An inlet section or conduit 382 which is coaxial with the section 380 extends from the front face 408 terminating at a free end portion 412. The disc-shaped side wall section 380 has a peripheral rim 414. The rim 414 extends forwardly of the front face 408. The free end portion 412 and the rim 414 have respective machined surfaces 416, 418 which are parallel to the central axis in order to enable both the axial and rotational sliding movement of the side liner part 38 during its operational adjustment. A locating rib 420 is provided on the front face 408.

The side liner part 38 is shown in a fitted position in the particular embodiments illustrated in FIGS. 51 and 52. In these particular embodiments the position of the side part 38 can be adjusted relative to the pump casing or inner main liner 32. As shown, the side part 38 includes a marker line 422 on the inlet section or conduit 382. The position of this line 422 can be viewed through a viewing port. As the side part 38 wears during operation of the pump, its position can be adjusted so that the part is closer to the impeller. When the line reaches a particular position the operator will know that the side part 38 is fully worn.

Figure 59:
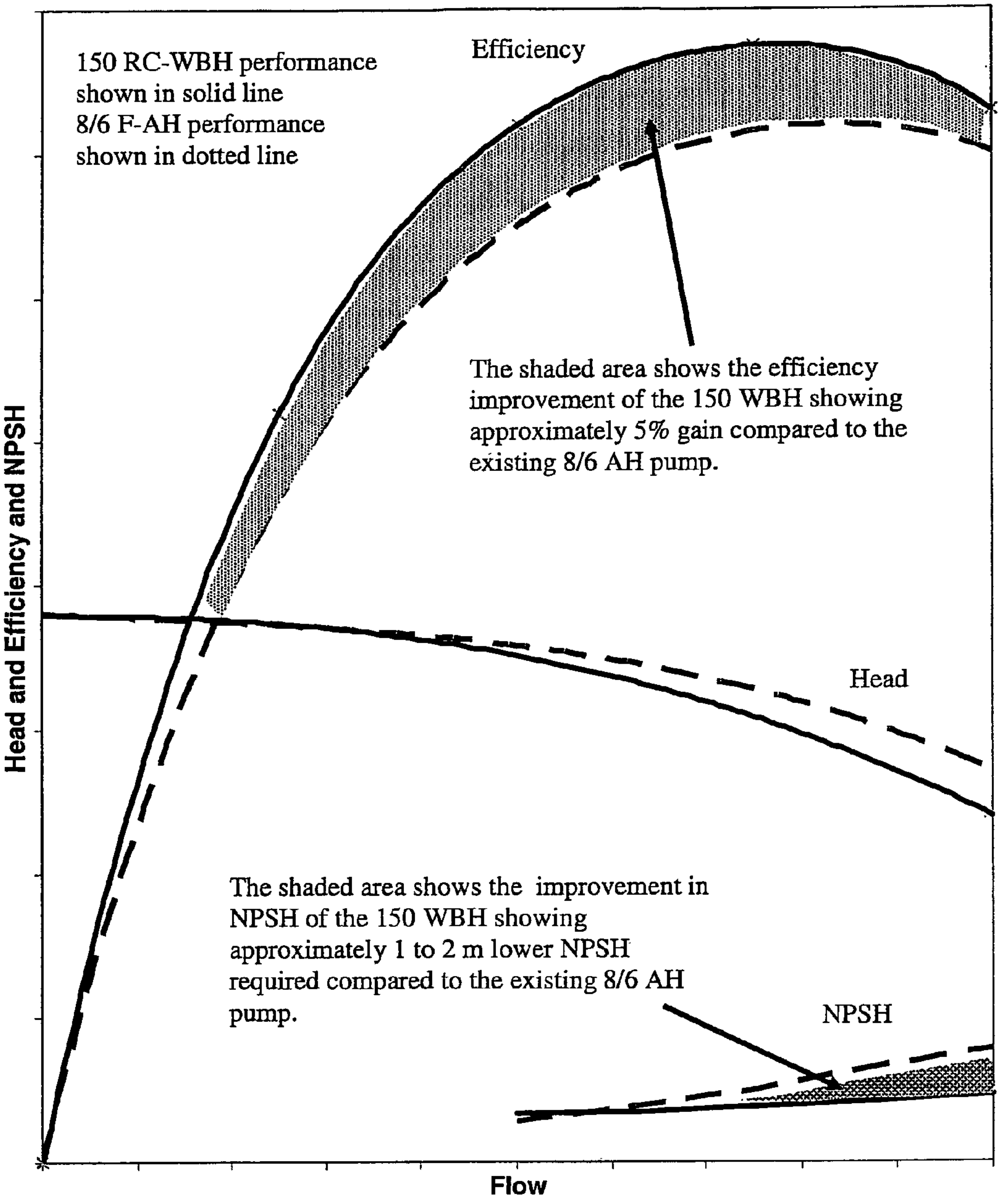
FIG. 59 illustrates some experimental results achieved with the pump assembly shown in FIGS. 1 and 2 when used to pump a fluid.

FIG. 59 illustrates some experimental results achieved with the pump assembly shown in FIGS. 1 and 2 when used to pump a fluid. A centrifugal pump performance is normally plotted with head (that is, pressure), efficiency or Net Positive Suction Head NPSH (a pump characteristic) on the vertical axis and flow on the horizontal axis. This graph show curves for each of head, efficiency and NPSH all plotted on the one graph.

For centrifugal pumps at any one fixed speed, the head normally decreases with flow. Shown on the one graph is the performance of a prior art pump (shown in dashed line) as well as one of the new pumps of the type described in the present disclosure (shown in solid line). The speed of the prior art and new pump is plotted so their head versus flow curves are nearly coincident.

Shown plotted on the same graph is the efficiency curve for a prior art pump and new pump. In each case, the efficiency curve increases to a maximum and then falls away in concave fashion. With both pumps producing approximately the same pressure energy at any flow, the efficiency of the new pump is higher than that of the prior art. The efficiency is a measure of output power (in terms of head and flow) divided by the input power and is always less than 100%. The new pump is more efficient and can produce the same output as the prior art pump but with less input power.

Cavitation in a pump occurs when the inlet pressure reduces to the boiling point of the fluid. The boiling fluid can dramatically impact a pumps performance at any flow. In the worst case, the performance can collapse. The new pump is able to keep operating with a lower inlet pressure than the same capacity prior art pump, which means that it can be applied to a wider range of applications, elevation above sea level and fluid temperatures before its performance becomes impacted by cavitation.

The pump assembly and its various component parts and arrangements as described with reference to the specific embodiments illustrated in the drawings offers many advantages over conventional pump assemblies. The pump assembly has been found to provide an overall improved efficiency which can lead to a reduction in power consumption and a reduction in the wear of some of the components compared with conventional pump assemblies. Furthermore its assembly provides for ease of maintenance, longer maintenance intervals.

Turning now to the various components and arrangements the pump housing support and the manner of attachment of the pump assembly and its various components thereto ensures that the parts are concentrically arranged relative to one another and ensures that the pump shaft and impeller are coaxial with the front liner side part. Conventional pump assemblies are prone to misalignment of these components.

Furthermore the pump bearing assembly and lubricant retainers associated therewith which are secured to or integral with the pump housing support provide a versatility enabling optional use of relatively high and low viscosity lubricants.

Conventional arrangements normally only offer one type of lubrication as the design of the bearing housing depend somewhat on the whether the lubricant is highly viscous such as grease or lower viscous such as oil. To change from one type of lubricant to another normally requires a total replacement of the bearing housing, shaft and seals. The new arrangement allows both types of lubricant to be used in the same bearing housing without any need to change the housing, shaft or seals. Only one component that is required to be changed, that being the lubricant retainer.

When bearings are lubricated with oil, there is normally a sump and the bearings dip in and are lubricated by the oil. The oil is also flung around the housing to generally assist the overall lubrication. A return channel or similar is needed for oil since the oil normally will be trapped between the bearing and the bearing housing end cover and end cover seal and needs a path to allow it to return to the sump. If the oil does not return to the sump, the pressure can build-up and then the oil can breech the seal.

Grease lubrication is different in that it must be keep in close proximity to the bearing to be effective. If flung off the bearing and into the centre void of the bearing housing it is lost, and the bearing could well fail due to lack of lubrication. Therefore it is important to provide side walls around the bearing to keep the grease in close proximity to the bearing. This is achieved in the new arrangement by the lubricant retainers on the inboard side of the bearing to prevent the grease escaping to the central chamber void. The grease is retained on the opposite side to the lubricant retainers by bearing housing end covers and bearing housing seals. The lubricant retainer as well as providing a barrier to the grease that can escape from the side of the bearing, also blocks the oil channel and prevents loss of grease in that region.

The retainers can be fitted when grease is used and then removed if oil lubricant is required. This is the only change to allow both types of lubricants to be used in the same bearing assembly.

Furthermore the new arrangement by which an inner pump liner is secured to the pump housing as described herein offers significant advantages over conventional techniques.

Slurry causes wear in slurry pumps and it is normal to line the pump housing with hard metal or elastomer liners that can be replaced after a period of service. Worn liners affect the pumps performance and wear life but replacing the liners at regular intervals returns the pump performance back to new condition. During assembly it is necessary to fix the pump liners to the outer casing both to provide location as well as fixing so that the parts are held securely. Conventional arrangements use studs or bolts that are screwed into the liners and the stud goes through the pump casing and a nut is used to fix it on the outside of the casing. Studs and bolts attached to the liner have the disadvantage that they reduce the wearing thickness of the liners. Inserts in liners for threaded holes can also cause casting difficulties. Furthermore studs and bolt threads can become blocked or broken in service and are difficult to maintain.

The new arrangement as described uses a coupling pin that does not reduce the wearing thickness of the liner and also avoids the issues with thread maintenance. The coupling pin is easier to use for fixing and locating the pump liners and is applicable for use on some or all liners in any suitable wearing material.

Furthermore the arrangement of the pump seal housing assembly and the lifting device for use therewith also contributes to the advantageous nature of the pump assembly.

Seal assemblies for slurry pumps need to be made from wear resistant and/or corrosion resistant materials. Seal assemblies also need to be strong enough to withstand the pump internal pressure and generally require a smooth inside shape and contour to prevent wear. Wear will reduce the seal assemblies pressure capability. Seal assemblies are normally installed and removed with a lifting tool and during lifting the seal assemblies must be securely attached to the lifting tool. Prior art was to provide an insert and/or a tapped hole to enable the seal assembly to the bolted to the lifting tool to secure it. However, the tapped hole is a weakness for pressure rating and also is a corrosion and wear point.

The new arrangement provides a holder that can be positively located and locked into the adjustable jaws of a lifting device. This holder can be smooth so does not compromise the wear or the pressure capability of the seal assembly.

Furthermore the new pump housing and manner of connection of the two parts thereof offer significant advantages over conventional arrangements.

Conventional arrangements typically have a smooth joint on the two mating vertical faces of the pump casing halves. The only alignment is therefore via casing bolts and with the clearance between the casing bolts and their respective holes, it is likely that the front casing half can be shifted relative to the back casing half. Misalignment of the two casing halves causes the pump intake axis to move off centre relative to the back casing half. The off-centre inlet will result in the front or inlet side liner being eccentric to the running centre of the rotating impeller. An eccentric liner will impact the gap between the impeller and the front liner causing increased recirculation and higher than normal internal losses.

Misalignment of the two casing halves will also affect the matching of the internal liner joints between two elastomer liners, such that there will be a step created between the two liners which otherwise would be smooth. Steps in the liner joints will cause extra turbulence and higher wear than if the joint line was smooth without steps. Misalignment of the two casing halves will also cause a step in the discharge flange which can affect the alignment of internal components inside the casing as well as any sealing components on the discharge side.

By locating the casing halves with precisely machined alignment sections, alleviates the issues due to the misalignment when using loose fitting casing bolts.

Finally the new adjustment devices as described offer significant advantages over conventional arrangements.

A pumps performance and wear life relates directly to the gap that exists between the rotating impeller and the front side liner. The larger the gap, the higher the recirculating flow from the high pressure region in the pump casing back to the pump inlet. This recirculating flow reduces the pump efficiency and also increases the wear rate on the pump impeller and the front side liner. With time, as the front gap becomes wider, the greater the fall off in performance and the higher the wear rate. Some conventional side liners can be adjusted axially, but if the wear is localised, this does not assist a lot. Localised wear pockets will just become larger.

The new arrangements allow for both axial and rotational movement of the pumps front liner. The axial movement minimises the gap width and the rotation spreads the wear more evenly on the front liner. A consequence is that the minimum gap geometry can be maintained over a longer time causing far less performance fall-off and wear. The axial movement and/or rotation movement can be arranged to best suit the pumps application as well as the materials of construction to minimise the local wear. Ideally, the side liner adjustment needs to be carried out whilst the pump is running to avoid loss of production.

The apparatus referred to herein can be made of any material suitable for being shaped, formed or fitted as described, such as an elastomeric material; or hard metals that are high in chromium content or metals that have been treated (for example, tempered) in such a way to include a hardened metal microstructure; or a hard-wearing ceramic material, which can provide suitable wear resistance characteristics when exposed to a flow of particulate materials. For example, the outer casing 22 can be formed from cast or ductile iron. A seal 28 which may be in the form of a rubber o-ring is provided between the peripheral edge of side liners 36, 38 and the main liner 34. The main liner 34 and side liners 36, 38 can be made of high-chromium alloy material.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as “front” and “rear”, “above” and “below” and the like are used as words of convenience to provide reference points and are not to be construed as limiting terms.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Finally, it is to be understood that various alterations, modifications and/or additional may be incorporated into the various constructions and arrangements of parts without departing from the spirit or ambit of the invention.

The invention claimed is:

1. A pump bearing assembly which in a first operating configuration is lubricated by a first lubricant having a first viscosity, and which in a second operating configuration is lubricated by a second lubricant having a second viscosity, wherein the first viscosity is greater than the second viscosity, the bearing assembly comprising a bearing housing having a bore extending therethrough for receiving a pump drive shaft, spaced-apart bearing mounting zones within said bore with a chamber therebetween, each bearing mounting zone arranged for receipt of a bearing therein, a sump arranged in the chamber, a drainage slot in each bearing mounting zone, and a drainage channel between each drainage slot and the sump, each zone having associated therewith a lubricant retainer having an annular barrier wall, which abuts in use against an inner surface of the bore to form a barrier between the bearing mounting zone and the chamber, and a barrier flange, each lubricant retainer being mounted within said bore adjacent its respective bearing mounting zone with which it is associated, the annular barrier wall forming a barrier between the bearing mounting zone and the chamber and the barrier flange forming a barrier between the drainage slot and the drainage channel when the pump bearing assembly is in the first operating configuration, the lubricant retainer being removable when the pump bearing assembly is in the second operating configuration.

2. The pump bearing assembly according to claim 1, wherein said annular barrier wall is ring-shaped having a flattened wall portion.

3. The pump bearing assembly according to claim 2, wherein said ring-shaped barrier wall has an outer peripheral edge which is securable within a slot in the bore of the bearing housing.

4. The pump bearing assembly according to claim 3, wherein the barrier flange has a free edge which abuts against the bearing when fitted.

5. The pump bearing assembly according to claim 3, wherein the annular barrier wall is deformable so that it can be snap-fitted into the slot.

6. The pump bearing assembly according to claim 1, wherein the barrier flange extends laterally from each side of the annular barrier wall.

7. The pump bearing assembly according to claim 1, wherein the bearing assembly is secured to or integral with a pump housing support.

* * * * *